United States Patent
Kim et al.

(10) Patent No.: US 9,455,809 B2
(45) Date of Patent: Sep. 27, 2016

(54) METHOD FOR TRANSCEIVING DOWNLINK CONTROL INFORMATION IN A WIRELESS ACCESS SYSTEM AND APPARATUS THEREFOR

(75) Inventors: Jinmin Kim, Anyang-si (KR);
Seunghee Han, Anyang-si (KR);
Hyunwoo Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 178 days.

(21) Appl. No.: 14/118,157

(22) PCT Filed: May 25, 2012

(86) PCT No.: PCT/KR2012/004164
§ 371 (c)(1),
(2), (4) Date: Nov. 15, 2013

(87) PCT Pub. No.: WO2012/161550
PCT Pub. Date: Nov. 29, 2012

(65) Prior Publication Data
US 2014/0071952 A1     Mar. 13, 2014

Related U.S. Application Data

(60) Provisional application No. 61/490,036, filed on May 25, 2011.

(51) Int. Cl.
*H04L 5/00* (2006.01)
*H04L 1/00* (2006.01)
*H04L 1/16* (2006.01)
*H04B 7/04* (2006.01)

(52) U.S. Cl.
CPC ............ *H04L 5/0037* (2013.01); *H04L 5/001* (2013.01); *H04L 5/0053* (2013.01); *H04B 7/0417* (2013.01); *H04L 1/0027* (2013.01); *H04L 1/0041* (2013.01); *H04L 1/0067* (2013.01); *H04L 1/1607* (2013.01)

(58) Field of Classification Search
None
See application file for complete search history.

(56) References Cited

U.S. PATENT DOCUMENTS

| | | | |
|---|---|---|---|
| 2007/0101232 A1* | 5/2007 | Kim | H03M 13/2957 714/755 |
| 2009/0219878 A1* | 9/2009 | Oh | H04L 5/0053 370/329 |
| 2010/0034303 A1* | 2/2010 | Damnjanovic | H04L 5/003 375/260 |
| 2010/0142455 A1* | 6/2010 | Imamura | H04W 52/146 370/329 |
| 2010/0239035 A1* | 9/2010 | Blankenship | H04L 1/0656 375/260 |
| 2011/0075624 A1* | 3/2011 | Papasakellariou | H04L 5/0053 370/329 |

(Continued)

FOREIGN PATENT DOCUMENTS

| | | |
|---|---|---|
| KR | 10-2009-0016386 A | 2/2009 |
| KR | 10-2009-0042949 A | 5/2009 |

(Continued)

*Primary Examiner* — Ian N Moore
*Assistant Examiner* — Justin T Van Roie
(74) *Attorney, Agent, or Firm* — Dentons US LLP

(57) ABSTRACT

The present invention relates to a method for transceiving downlink control information in a wireless access system that supports an enhanced physical downlink control channel (e-PDCCH), and to an apparatus for the method. More particularly, the method comprises the steps of: precoding downlink control information using a precoding matrix set in a terminal; and transmitting the precoded downlink control information to the terminal via the e-PDCCH using multiple antennas, wherein the e-PDCCH is multiplexed with a PDSCH in a first slot of a subframe in which the downlink control information is transmitted.

9 Claims, 20 Drawing Sheets

(56) References Cited

U.S. PATENT DOCUMENTS

2011/0268065 A1\* 11/2011 Park .................. H04L 1/0003
370/329
2012/0106465 A1\* 5/2012 Haghighat ........ H04W 72/1289
370/329

FOREIGN PATENT DOCUMENTS

| KR | 10-2009-0083269 A | 8/2009 |
|---|---|---|
| KR | 10-2009-0111250 A | 10/2009 |
| KR | 10-2010-0081693 A | 7/2010 |

\* cited by examiner

METHOD FOR TRANSCEIVING DOWNLINK CONTROL INFORMATION IN A WIRELESS ACCESS SYSTEM AND APPARATUS THEREFOR

This application is a 35 U.S.C. §371 National Stage Entry of International Application No. PCT/KR2012/004164, filed May 25, 2012 and claims the benefit of U.S. Provisional Application No. 61/490,036, filed May 25, 2011, all of which are incorporated by reference in their entirety herein.

TECHNICAL FIELD

The present invention relates to a radio access system, and more particularly, to a method and apparatus for transmitting and receiving downlink control information in a radio access system supporting an enhanced physical downlink control channel.

BACKGROUND ART

A mobile communication system has developed in order to provide a voice service while ensuring user activity. The mobile communication system has gradually extended to a data service in addition to the voice service and has currently developed to the extent of providing a high-speed data service. However, in a mobile communication system which currently provides a service, an improved mobile communication system has been required due to resource lack or user demand for higher-speed service.

One of most important requirements of a next-generation radio access system is to support requirement of a data transfer rate. In order to support requirement of a data transfer rate, various techniques such as multiple input multiple output (MIMO), cooperative multipoint transmission (CoMP), carrier aggregation (CA)/multiple cells, relay, etc. have been studied.

Such techniques have a difficulty in equally utilizing a downlink control channel used in an existing system, in order to obtain maximum performance. In a 3GPP LTE-A system, an enhanced physical downlink control channel (e-PDCCH) has been introduced in order to increase capacity of a PDCCH in an existing 3GPP LTE system.

DISCLOSURE

Technical Problem

An object of the present invention devised to solve the problem lies in a method and apparatus for transmitting and receiving downlink control information between a user equipment (UE) and a base station (BS) in a radio access system supporting an enhanced physical downlink control channel (e-PDCCH).

Another object of the present invention devised to solve the problem lies in a method and apparatus for increasing reliability of downlink control information in a radio access system supporting an enhanced physical downlink control channel (e-PDCCH).

A further object of the present invention devised to solve the problem lies in a method and apparatus for providing fast decoding of downlink control information in a radio access system supporting an enhanced physical downlink control channel (e-PDCCH).

The technical problems solved by the present invention are not limited to the above technical problems and other technical problems which are not described herein will become apparent to those skilled in the art from the following description.

Technical Solution

The object of the present invention can be achieved by providing a method of transmitting downlink control information in a radio access system supporting an enhanced physical downlink control channel (e-PDCCH) transmitted in a state of being multiplexed with a physical downlink shared channel (PDSCH) including precoding the downlink control information using a precoding matrix set in a user equipment (UE), and transmitting the precoded downlink control information to the UE via the e-PDCCH using multiple antennas, wherein the e-PDCCH is multiplexed with the PDSCH in a first slot of a subframe in which the downlink control information is transmitted.

In another aspect of the present invention, provided herein is a base station for transmitting downlink control information in a radio access system supporting an enhanced physical downlink control channel (e-PDCCH) transmitted in a state of being multiplexed with a physical downlink shared channel (PDSCH) including a radio frequency (RF) unit configured to transmit and receive a radio signal, and a processor configured to precode the downlink control information using a precoding matrix set in a user equipment (UE) and to transmit the precoded downlink control information to the UE via the e-PDCCH using multiple antennas, wherein the e-PDCCH is multiplexed with the PDSCH in a first slot of a subframe in which the downlink control information is transmitted.

The method may further include dividing a plurality of pieces of downlink control information into information related to uplink and information related to downlink or information transmitted in a common search space and information transmitted in a UE-specific search space and allocating the information to different codewords.

The method may further include performing joint channel coding with respect to a plurality of pieces of downlink control information to generate one coded bit.

The method may further include, if a plurality of pieces of downlink control information is respectively allocated to different codewords, a bit having a value of 0 or 1 is padded to a codeword having a smaller bit size such that the bit sizes of the different codewords match.

The method may further include, if a plurality of pieces of downlink control information is respectively allocated to different codewords, changing a channel coding rate applied to the different codewords or performing rate matching such that the bit sizes of the different codewords match.

The method may further include, if a plurality of pieces of downlink control information is respectively allocated to different codewords, inserting a null symbol or a predetermined reference modulation symbol into a modulation symbol having a smaller symbol length among modulation symbols generated by modulating the different codewords such that the bit sizes of the different codewords match.

The downlink control information may be precoded based on a cell-specific reference signal (CRS) or a demodulation reference signal (DMRS).

The method may further include transmitting the information about the precoding matrix to the UE if the downlink control information is precoded based on the CRS.

If the downlink control information is precoded based on the DMRS, the downlink control information may be precoded using a precoding matrix used in a most recent PDSCH or physical downlink control channel (PDCCH) transmitted to the UE.

The method may further include controlling a size of a transport block such that a size of a transport block according to downlink data is reduced by a bit size of the downlink control information in order to allocate downlink data to a second slot of a subframe corresponding to a frequency region in which the downlink control information is transmitted.

The method may further include controlling a size of a transport block such that a size of a transport block is controlled by changing a modulation and coding scheme (MCS) level applied to the transport block according to downlink data in order to allocate the downlink data to a second slot of a subframe corresponding to a frequency region in which the downlink control information is transmitted.

In a further aspect of the present invention, provided herein is method of receiving downlink control information in a radio access system supporting an enhanced physical downlink control channel (e-PDCCH) transmitted in a state of being multiplexed with a physical downlink shared channel (PDSCH) including receiving downlink control information precoded using a precoding matrix set in a user equipment (UE) from a base station via the e-PDCCH, and performing decoding in order to detect the downlink control information, wherein the downlink control information is transmitted using multiple antennas and the e-PDCCH is multiplexed with the PDSCH in a first slot of a subframe in which the downlink control information is transmitted.

In a further aspect of the present invention, provided herein is a base station for transmitting downlink control information in a radio access system supporting an enhanced physical downlink control channel (e-PDCCH) transmitted in a state of being multiplexed with a physical downlink shared channel (PDSCH) including a radio frequency (RF) unit configured to transmit and receive a radio signal, and a processor configured to precode the downlink control information using a precoding matrix set in a user equipment (UE) and to transmit the precoded downlink control information to the UE via the e-PDCCH using multiple antennas, wherein the e-PDCCH is multiplexed with the PDSCH in a first slot of a subframe in which the downlink control information is transmitted.

The downlink control information may be precoded based on a cell-specific reference signal (CRS) or a demodulation reference signal (DMRS).

The method may further include receiving the information about the precoding matrix from the base station if the downlink control information is precoded based on the CRS, and the decoding may be performed using the information about the precoding matrix.

If the downlink control information is precoded based on the DMRS, the decoding may be performed using a precoding matrix used in a most recent PDSCH or physical downlink control channel (PDCCH) transmitted from the base station.

Advantageous Effects

According to the embodiment of the present invention, it is possible to transmit and receive downlink control information between a user equipment (UE) and a base station (BS) in a radio access system supporting an enhanced physical downlink control channel (e-PDCCH).

According to the embodiment of the present invention, it is possible to increase reliability of reception of downlink control information by a UE.

According to the embodiment of the present invention, it is possible to achieve fast decoding of downlink control information in a UE and thus to achieve efficient cell deployment and throughput improvement.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Figure 1:
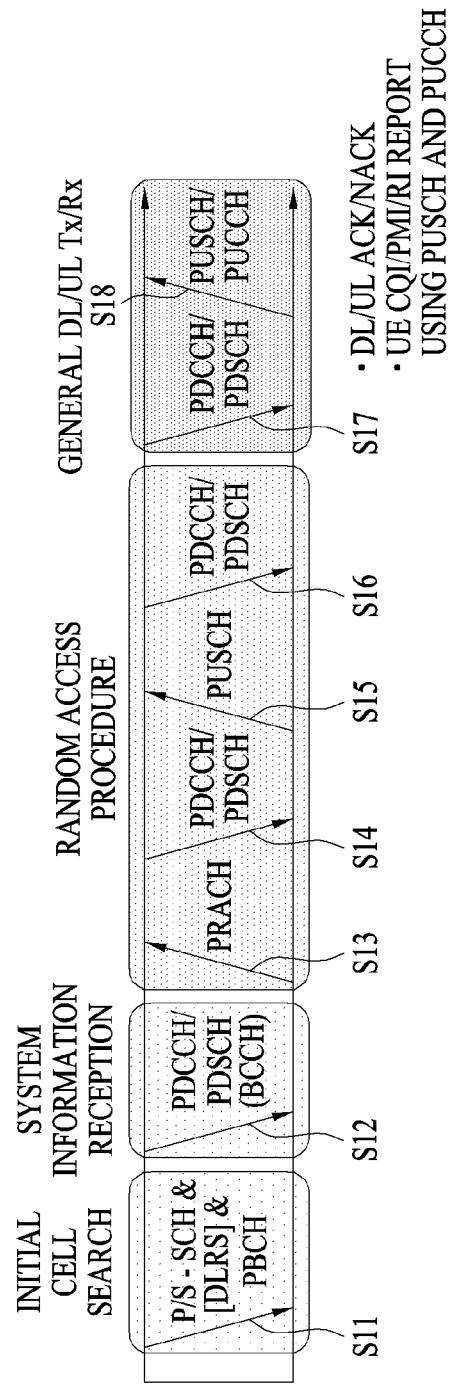
FIG. 1 is a view showing physical channels used for a $3^{rd}$ Generation Partnership Project (3GPP) Long Term Evolution (LTE) system and a general signal transmission method using the same.

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment through which the present invention can be carried out. Hereinafter, the detailed description includes detailed matters to provide full understanding of the present invention. However, it will be apparent to those skilled in the art that the present invention can be carried out without the detailed matters.

In some instances, well-known structures and devices are omitted in order to avoid obscuring the concepts of the present invention and the important functions of the structures and devices are shown in block diagram form.

The embodiments of the present invention are disclosed on the basis of a data communication relationship between a base station and a user equipment. In this case, the base station is used as a terminal node of a network via which the base station can directly communicate with the mobile station. Specific operations to be conducted by the base station in the present invention may also be conducted by an upper node of the base station as necessary. In other words, it will be obvious to those skilled in the art that various operations for enabling the base station to communicate with the mobile station in a network composed of several network nodes including the base station will be conducted by the base station or network nodes other than the base station. The term "Base Station (BS)" may be replaced with the terms fixed station, Node-B, eNode-B (eNB), or access point (AP) as necessary. The term "relay" may be replaced with the term relay node (RN) or relay station (RS). The term "terminal" may also be replaced with the term user equipment (UE), mobile station (MS), mobile subscriber station (MSS) or subscriber station (SS) as necessary.

It should be noted that specific terms disclosed in the present invention are proposed for convenience of description and better understanding of the present invention, and the use of these specific terms may be changed to another format within the technical scope or spirit of the present invention.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) and LTE-A (Advanced) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following technologies can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied as wireless (or radio) technology such as UTRA (Universal Terrestrial Radio Access) or CDMA2000. TDMA may be embodied with wireless (or radio) technology such as GSM (Global System for Mobile communications)/GPRS (General Packet Radio Service)/EDGE (Enhanced Data Rates for GSM Evolution). OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of the UMTS (Universal Mobile Telecommunications System). 3GPP (3rd Generation Partnership Project) LTE (long term evolution) is a part of the E-UMTS (Evolved UMTS), which uses E-UTRA. 3GPP LTE employs the OFDMA in downlink and employs the SC-FDMA in uplink. LTE-Advanced (LTE-A) is an evolved version of 3GPP LTE.

For clarity, the following description focuses on 3GPP LTE and LTE-A. However, the technical spirit of the present invention is not limited thereto.

1. General 3GPP LTE/LTE-A system to which the present invention may be applied 1.1. General System FIG. 1 is a diagram showing physical channels used for a $3^{rd}$ Generation Partnership Project (3GPP) Long Term Evolution (LTE) system and a general signal transmission method using the same.

When a UE is powered on or when the UE newly enters a cell, the UE performs an initial cell search operation such as synchronization with a BS in step S11. For the initial cell search operation, the UE may receive a Primary Synchronization Channel (P-SCH) and a Secondary Synchronization Channel (S-SCH) from the BS so as to perform synchronization with the BS, and acquire information such as a cell ID.

Thereafter, the UE may receive a physical broadcast channel (PBCH) signal from the BS and acquire broadcast information in the cell. Meanwhile, the UE may receive a Downlink Reference Signal (DL RS) in the initial cell search step and confirm a downlink channel state.

The UE which has completed the initial cell search may receive a Physical Downlink Control Channel (PDCCH) and a Physical Downlink Shared Channel (PDSCH) corresponding to the PDCCH, and acquire more detailed system information in step S12.

Thereafter, the UE may perform a random access procedure in steps S13 to S16, in order to complete the access to the BS. For the random access procedure, the UE may transmit a preamble via a Physical Random Access Channel (PRACH) (S13), and may receive a message in response to the preamble via the PDCCH and the PDSCH corresponding thereto (S14). In contention-based random access, a contention resolution procedure including transmission of an additional PRACH (S15) and reception of the PDCCH and the PDSCH corresponding thereto (S16) may be performed.

The UE which has performed the above-described procedure may then receive the PDCCH and/or the PDSCH (S17) and transmit a Physical Uplink Shared Channel (PUSCH) and/or the Physical Uplink Control Channel (PUCCH) (S18), as a general uplink/downlink signal transmission procedure.

Control information transmitted from the UE to the BS is collectively referred to as uplink control information (UCI). The UCI includes hybrid automatic repeat and request acknowledgement/negative-acknowledgement (HARQ ACK/NACK), scheduling request (SR), channel quality information (CQI), precoding matrix indicator (PMI), rank indicator (RI), etc.

In general, although a UCI is periodically transmitted via a PUCCH in the LTE system, this may be transmitted through a PUSCH if control information and traffic data are simultaneously transmitted. In addition, a UCI may be aperiodically transmitted via a PUSCH according to a network request/instruction.

Figure 2:
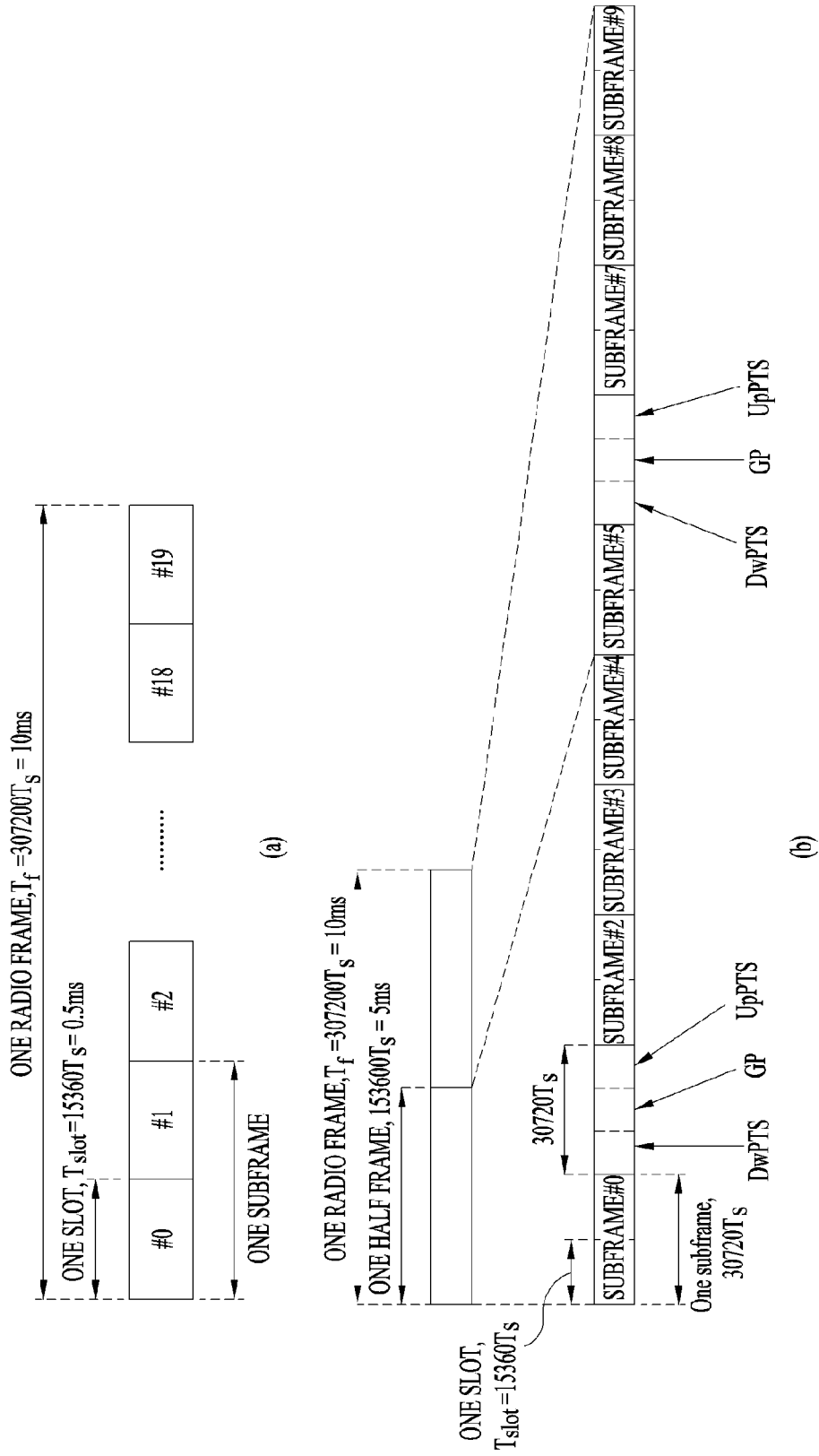
FIG. 2 is a diagram showing the structure of a radio frame used in a 3GPP LTE system.

FIG. 2 is a diagram showing the structure of a radio frame used in a 3GPP LTE system.

FIG. 2(a) shows frame structure type 1. Frame structure type 1 is applicable to both a full duplex frequency division duplexing (FDD) system and a half duplex FDD system.

One radio frame has a length of $T_f=307200 \cdot T_s=10$ ms and includes 20 slots having a uniform length of $T_{slot}=15360 \cdot T_s=0.5$ ms and having indices of 0 to 19. One subframe is defined by two consecutive slots and an i-th subframe includes slots corresponding to 2i and 2i+1. That is, the radio frame includes ten subframes. A time required to transmit one subframe is referred to as a transmission time interval (TTI). Here, Ts denotes a sampling time and is expressed by $Ts=1/(15 \text{ kHz} \times 2048)=3.2552 \times 10^{-8}$ (about 33 ns). The slot includes a plurality of OFDM symbols or SC-FDMA symbols in the time region and includes a plurality of resource blocks (RBs) in the frequency region.

One slot includes a plurality of orthogonal frequency division multiplexing (OFDM) symbols in the time region. Since 3GPP LTE uses OFDMA in downlink, an OFDM symbol indicates one symbol period. The OFDM symbol may be referred to as an SC-FDMA symbol or symbol period. A RB is a resource allocation unit and may include a plurality of consecutive subcarriers per slot.

In a full duplex FDD system, 10 subframes may be simultaneously used for downlink transmission and uplink transmission during a period of 10 ms. At this time, uplink and downlink transmission are divided in the frequency region. In contrast, in a half duplex FDD system, a UE may not simultaneously perform transmission and reception.

The above-described structure of the radio frame is only exemplary and the number of subframes included in the radio frame, the number of slots included in the subframe or the number of OFDM symbols included in the slot may vary.

FIG. 2(b) shows the structure of the frame structure type 2. The frame structure type 2 is applicable to a TDD system. One radio frame has a length of $T_f=307200 \cdot T_s=10$ ms and includes two half frames each having a length of $153600 \cdot T_s=5$ ms. Each half frame includes five subframes each having a length of $30720 \cdot T_s=1$ ms. The i-th subframe includes two slots each having a length of $T_{slot}=15360 \cdot T_s=0.5$ ms corresponding to 2i and 2i+1. Here, $T_s$ denotes a sampling time, which is expressed by $Ts=1/(15 \text{ kHz} \times 2048)=3.2552 \times 10^{-8}$ (about 33 ns).

The frame type 2 includes special subframes including three fields such as a downlink pilot time slot (DwPTS), a guard period (GP) and an uplink pilot time slot (UpPTS). Here, the DwPTS is used for initial cell search, synchronization or channel estimation of a UE. The UpPTS is used for channel estimation of a BS and uplink transmission synchronization of a UE. The GP is used to eliminate interference generated in uplink due to multi-path delay of a downlink signal between uplink and downlink.

Table 1 shows the configuration of the special frame (length of DwPTS/GP/UpPTS).

TABLE 1

| | Normal cyclic prefix in downlink | | | Extended cyclic prefix in downlink | | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Figure 3:
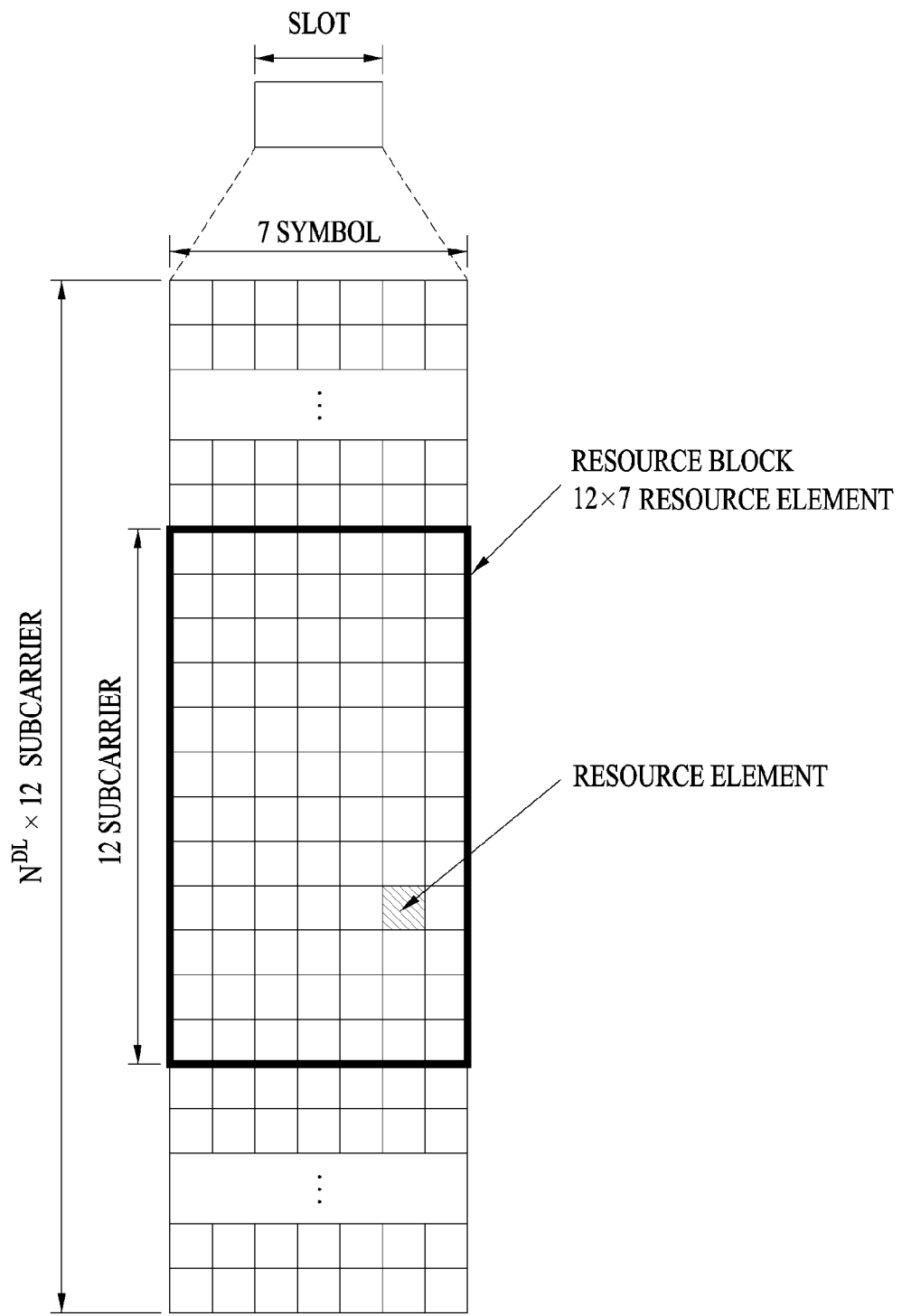
FIG. 3 is a diagram showing a resource grid of one downlink slot.

FIG. 3 is a diagram showing a resource grid of one downlink slot.

Referring to FIG. 3, one downlink slot includes a plurality of OFDM symbols in the time region. Here, although an example in which one downlink slot includes seven OFDM symbols and one resource block includes 12 subcarriers in the frequency region is described, the present invention is limited thereto.

Each element on the resource grid is referred to as a resource element (RE) and one resource block includes 12×7 resource elements. The number NDL of resource blocks included in a downlink slot depends on downlink transmission bandwidth. The structure of the uplink slot may be equal to the structure of the downlink slot.

Figure 4:
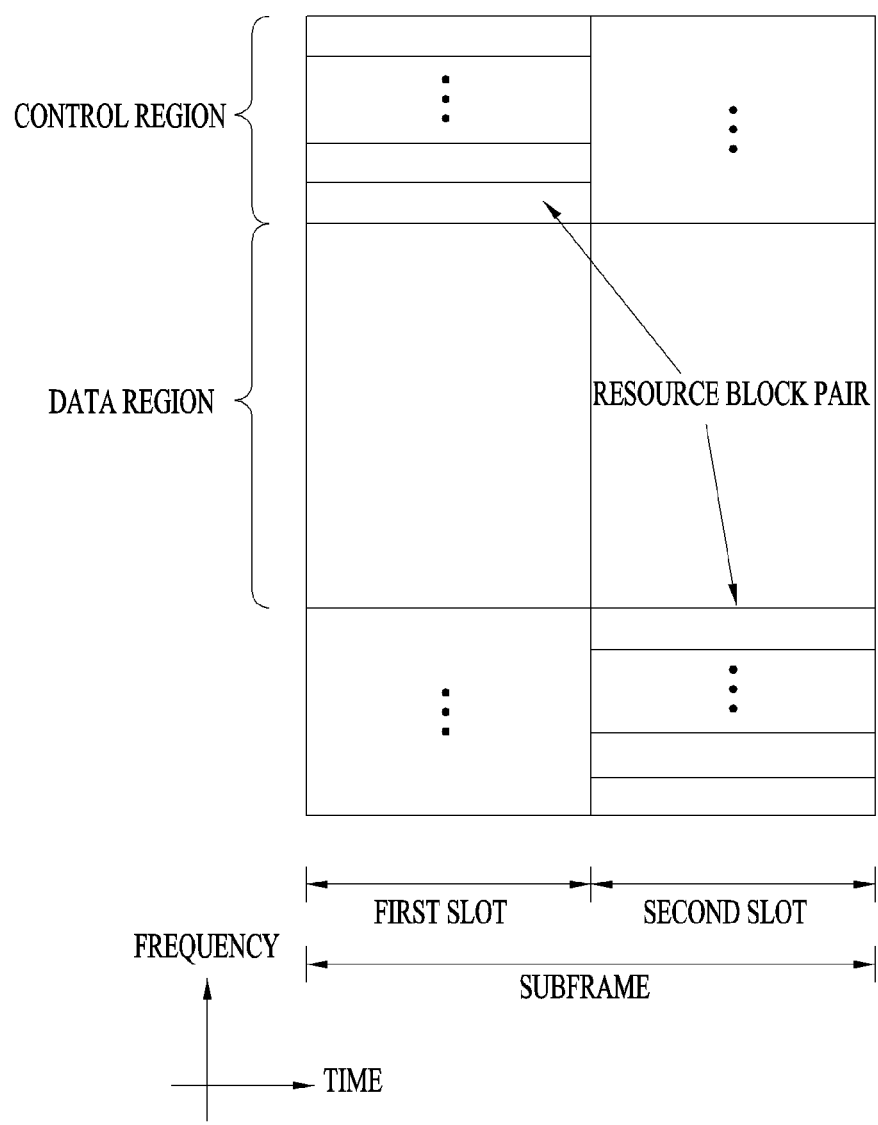
FIG. 4 is a diagram showing the structure of an uplink subframe.

FIG. 4 is a diagram showing the structure of an uplink subframe.

Referring to FIG. 4, an uplink subframe may be divided into a control region and a data region in the frequency region. A Physical Uplink Control Channel (PUCCH) carrying uplink control information is allocated to the control region. A Physical uplink Shared Channel (PUSCH) carrying user data is allocated to the data region. In order to maintain single carrier characteristics, one UE does not simultaneously transmit the PUCCH and the PUSCH. The PUCCH for one UE is allocated an RB pair in a subframe. RBs belonging to the RB pair occupy different subcarriers with respect to two slots. Thus, the RB pair allocated to the PUCCH is "frequency-hopped" at a slot boundary.

Figure 5:
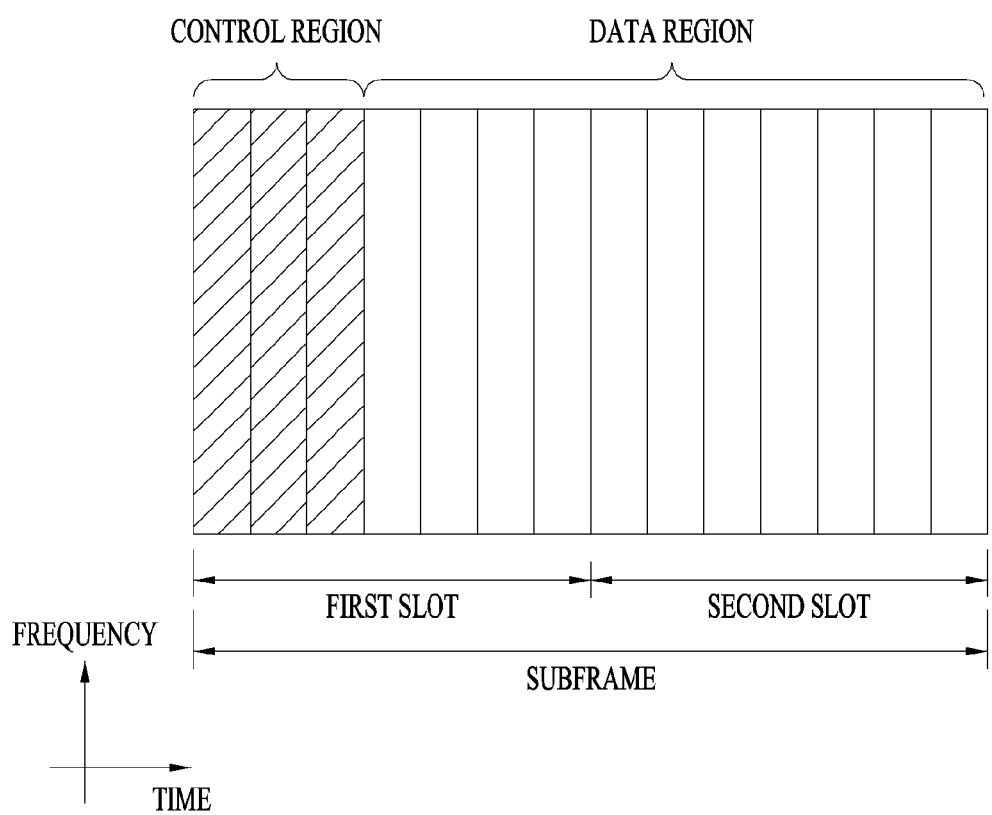
FIG. 5 is a diagram showing the structure of a downlink subframe.

FIG. 5 is a diagram showing the structure of a downlink subframe.

Referring to FIG. 5, at most three OFDM symbols located in a front portion of a first slot of the subframe are used as a control region, to which control channels are allocated, and the remaining OFDM symbols are used as a data region, to which PDSCHs are allocated. Examples of a downlink control channel used in 3GPP LTE include a Physical Control Format Indicator Channel (PCFICH), a PDCCH, a Physical Hybrid automatic repeat request (ARQ) Indicator Channel (PHICH), etc.

The PCFICH is transmitted in a first OFDM symbol of the subframe and carries information about the number of OFDM symbols (that is, the size of the control region) used to transmit the control channels in the subframe. The PHICH is an uplink response channel and carries an acknowledgement (ACK)/negative-acknowledgement (NACK) signal for HARQ. Control information transmitted through a PDCCH is referred to as downlink control information (DCI). The DCI indicates uplink resource allocation information (UL grant), downlink resource allocation information (DL grant) and an uplink transmit (Tx) power control command for arbitrary UE groups.

1.2. PDCCH (Physical Downlink Control Channel)

1.2.1. General PDCCH

The PDCCH may carry resource allocation and transmission format of a downlink shared channel (DL-SCH) (referred to as downlink grant), resource allocation information of an uplink shared channel (UL-SCH) (referred to as uplink grant), paging information in a paging channel (PCH), system information in a DL-SCH, resource allocation of an upper layer control message such as a random access response transmitted via a PDSCH, a set of transmit power control commands of individual UEs within an arbitrary UE group, activation of voice over IP (VoIP), etc. A plurality of PDCCHs may be transmitted in the control region and the UE may monitor the plurality of PDCCHs. The PDCCH is composed of an aggregate of one or several consecutive control channel elements (CCEs). The PDCCH composed of an aggregate of one or several consecutive CCEs may be transmitted in the control region after being subjected to subblock interleaving. The CCE is a logical allocation unit used to provide an encoding rate according to the state of the radio channel to a PDCCH. The CCE corresponds to a plurality of resource element groups (REGs). The format of the PDCCH and the possible number of PDCCH bits are determined according to a relationship between the number of CCEs and an encoding rate provided by CCEs.

1.2.2. PDCCH Structure

A plurality of PDCCHs multiplexed for a plurality of UEs may be transmitted in the control region. The PDCCH is composed of an aggregate of one or more consecutive CCEs. The CCE refers to a unit corresponding to nine sets of REGs each including four resource elements. Four quadrature phase shift keying (QPSK) symbols are mapped to each REG. Resource elements occupied by a reference signal (RS) are not included in the REG. That is, the total number of REGs in the OFDM symbol may be changed depending upon whether a cell-specific RS is present. The concept of the REG for mapping four resource elements to one group is applicable to other downlink control channels (e.g., PCFICH or PHICH). If the REG, which is not allocated to the PCFICH or PHICH, is $N_{REG}$, the number of CCEs available in the system is $N_{CCE} = \lfloor N_{REG}/9 \rfloor$ and the CCEs have indices of 0 to $N_{CCE}-1$.

In order to simplify the decoding process of the UE, a PDCCH with a format including n CCEs may start from a CCE having an index equal to a multiple of n. That is, in case of a CCE index i, a PDCCH may start from a CCE satisfying i mod n=0

The BS may use {1, 2, 4, 8} CCEs in order to configure one PDCCH signal. At this time, {1, 2, 4, 8} is referred to as a CCE aggregation level. The number of CCEs used to transmit a specific PDCCH is determined by a base station according to a channel state. For example, only one CCE may be required for a PDCCH for a UE having a good downlink channel state (close to the base station). In contrast, in case of a UE having a bad channel state (located at a cell edge), 8 CCEs may be required for sufficient robustness. In addition, power level of a PDCCH may be adjusted according to channel state.

Table 2 shows a PDCCH format and four PDCCH formats are supported according to the CCE aggregation level.

TABLE 2

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

The reason why CCE aggregation levels differ between UEs is because the format or modulation and coding scheme (MCS) level of control information carried in the PDCCH differs. The MCS level means a coding rate and modulation order used for data coding. An adaptive MCS level is used for link adaptation. In general, three to four MCS levels may be considered in a control channel for transmitting control information.

In the format of the control information, control information transmitted via a PDCCH is referred to as downlink control information (DCI). The configuration of information carried in a PDCCH payload may be changed according to the DCI format. The PDCCH payload means an information bit. Table 3 shows DCI according to DCI format.

TABLE 3

| DCI Format | Description |
|---|---|
| Format 0 | Resource grants for the PUSCH transmissions (uplink) |
| Format 1 | Resource assignments for single codeword PDSCH transmissions (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g. paging/broadcast system information) |
| Format 1D | Compact resource assignments for PDSCH using multi-user MIMO (mode 5) |
| Format 2 | Resource assignments for PDSCH for closed-loop MIMO operation (mode 4) |
| Format 2A | Resource assignments for PDSCH for open-loop MIMO operation (mode 3) |

TABLE 3-continued

| DCI Format | Description |
| --- | --- |
| Format 3/3A | Power control commands for PUCCH and PUSCH with 2-bit/ 1-bit power adjustment |

Referring to Table 3, the DCI format includes format 0 for PUSCH scheduling, format 1 for scheduling of one PDSCH codeword, format 1a for compact scheduling of one PDSCH codeword, format 1c for very compact scheduling of a DL-SCH, format 2 for PDSCH scheduling in a closed-loop spatial multiplexing mode, format 2A for PDSCH scheduling in an open-loop spatial multiplexing mode, formats 3 and 3A for transmission of a transmission power control (TPC) command for an uplink channel. DCI format 1A may be used for PDSCH scheduling regardless of the transmission mode of the UE. A detailed description of information transmitted via each DCI format will be given below.

The length of the PDCCH payload may be changed according to the DCI format. In addition, the type and length of the PDCCH payload may be changed according to compact scheduling or a transmission mode set in a UE.

The transmission mode may be configured to receive downlink data signaled via a PDSCH. For example, downlink data signaled via a PDSCH includes scheduled data of a UE, a random access response or broadcast information signaled via a BCCH. Downlink data signaled via a PDSCH is related to DCI format signaled via a PDCCH. The transmission mode may be semi-statically configured with respect to the UE via higher layer signaling (e.g., radio resource control (RRC) signaling). The transmission mode may be divided into single antenna transmission or multi-antenna transmission. The transmission mode of the UE is semi-statically configured via higher layer signaling. For example, multi-antenna transmission includes transmit diversity, open-loop or closed-loop spatial multiplexing, multi-user-multiple input multiple output (MU-MIMO) or beamforming. Transmit diversity is technology for transmitting the same data via multiple transmit antennas to increase transmission reliability. Spatial multiplexing is technology for simultaneously transmitting different data via multiple transmit antennas to transmit data at a high speed without increasing system bandwidth. Beamforming is technology for applying a weight according to channel states of multiple antennas to increase a signal to interference plus noise ratio (SINR).

The DCI format depends on the transmission mode set in the UE. There is a reference DCI format monitored according to the transmission mode set in the UE. The number of transmission modes set in the UE may be 7 as follows.

(1) Single antenna port; port 0
(2) Transmit diversity
(3) Open-loop spatial multiplexing
(4) Closed-loop spatial multiplexing
(5) MU-MIMO
(6) Closed-loop rank=1 precoding
(7) Single antenna port; port 5

1.2.3. PDCCH Transmission

The base station determines a PDCCH format according to DCI to be transmitted to the UE and attaches cyclic redundancy check (CRC) to control information. The CRC is masked with a Radio Network Temporary Identifier (RNTI) according to an owner or usage of the PDCCH. If the PDCCH is for a specific terminal, a cell-RNTI (C-RNTI) of the terminal may be masked to the CRC. Alternatively, if the PDCCH is for a paging message, a paging indicator identifier (P-RNTI) may be masked to the CRC. If the PDCCH is for system information (more specifically, a system information block (SIB)), a system information identifier and a system information RNTI (SI-RNTI) may be masked to the CRC. To indicate a random access response that is a response to transmission of a random access preamble of the terminal, a random access-RNTI (RA-RNTI) may be masked to the CRC.

Subsequently, the base station performs channel coding with respect to the control information attached with CRC and generates coded data. At this time, channel coding may be performed at the coding rate according to the MCS level. The base station performs rate matching according to the CCE aggregation level allocated to the PDCCH format, modulates the coded data, and generates modulation symbols. At this time, a modulation order according to the MCS level may be used. The CCE aggregation level of each of the modulation symbols configuring one PDCCH may be one of 1, 2, 4 and 8. Thereafter, the base station maps the modulation symbols to physical resource elements (CCE to RE mapping).

1.2.4. Blind Decoding.

A plurality of PDCCHs may be transmitted within one subframe. That is, the control region of one subframe is composed of a plurality of CCEs having indices 0 to $N_{CCE,k}-1$. Here, $N_{CCE,k}$ means the total number of CCEs in the control region of a k-th subframe. The UE monitors a plurality of PDCCHs in every subframe. Here, monitoring means that the UE attempts to decode PDCCHs according to the monitored PDCCH format. In the control region allocated within the subframe, the base station does not provide information about where the PDCCH of the UE is located. Since the UE does not know the location of the PDCCH thereof and at which CCE aggregation level or with which DCI format the PDCCH thereof is transmitted, the UE monitors a set of PDCCH candidates within the subframe to detect the PDCCH thereof, in order to receive the control channel from the base station. This is referred to as blind decoding/detection (BD). The BD refers to a method of, at a UE, de-masking a UE ID thereof in a CRC portion, checking CRC errors, and determining whether a PDCCH is a control channel thereof.

In an active mode, the UE monitors the PDCCH of every subframe in order to receive data transmitted thereto. In a DRX mode, the UE wakes up in a monitoring portion of every DRX period and monitors a PDCCH in a subframe corresponding to the monitoring portion. A subframe in which monitoring of the PDCCH is performed is referred to as a non-DRX subframe.

The UE should perform blind decoding with respect to all CCEs which are present in the control region of the non-DRX subframe, in order to receive the PDCCH transmitted thereto. Since the UE does not know which PDCCH format is transmitted, all PDCCHs should be decoded at all possible CCE aggregation levels until blind decoding of the PDCCH is successful within every non-DRX subframe. Since the UE does not know how many CCEs are used for the PDCCH thereof, detection should be attempted at all possible CCE aggregation levels until blind decoding of the PDCCH is successful.

In the LTE system, the concept of a search space is defined for blind decoding of the UE. The search space means a PDCCH candidate set for monitoring and the size thereof may be changed according to PDCCH format. The search space may be composed of a common search space (CSS) and a UE-specific/dedicated search space (USS). In case of CSS, all UEs may know the size of the CSS. The USS may be individually set with respect to each UE. Accordingly, the UE should monitor both the CSS and the USS in order to decode the PDCCH. Accordingly, blind decoding is performed in one subframe a maximum of 44 times. Blind decoding performed according to different CRC values (e.g., C-RNTI, P-RNTI, SI-RNTI and RA-RNTI) is not included.

Due to a small search space, the base station may not secure CCE resources for transmitting PDCCHs to all UEs within a given subframe because resources remaining after allocation of CCE locations are included in the search space of a specific UE. In order to minimize such a problem which may continuously occur in subsequent subframes, a UE-specific hopping sequence is applicable to a start point of the USS.

Table 4 shows the size of the CSS and the USS.

| PDCCH format | Number of CCEs (n) | Number of candidates in common search space | Number of candidates in dedicated search space |
| --- | --- | --- | --- |
| 0 | 1 | — | 6 |
| 1 | 2 | — | 6 |
| 2 | 4 | 4 | 2 |
| 3 | 8 | 2 | 2 |

In order to reduce computational load of the UE according to the number of times of blind decoding, the UE does not simultaneously perform search according to all defined DCI formats. More specifically, the UE always performs search for DCI formats 0 and 1A in the USS. At this time, DCI formats 0 and 1A have the same size but the UE may differentiate between DCI formats using a flag for format 0/format 1a differentiation. In addition, DCI formats other than DCI formats 0 and 1 may be required with respect to the UE and, for example, DCI formats 1, 1B and 2 may be used.

In the CSS, the UE may search for DCI formats 1A and 1C. In addition, the UE may be configured to search for DCI format 3 or 3A. DCI formats 3 and 3A may have the same size as DCI formats 0 and 1A. The UE may differentiate between DCI formats using CRC scrambled by an identifier other than a UE-specific identifier.

The search space means a PDCCH candidate set according to an aggregation level $L \in \{1,2,4,8\}$. The CCE according to the PDCCH candidate set m of the search space may be determined by Equation 1 below.

$$L \cdot \{(Y_k + m) \bmod \lfloor N_{CCE,k}/L \rfloor\} + i \qquad \text{Equation 1}$$

where, $M^{(L)}$ denotes the number of PDCCH candidates according to the CCE aggregation level L for monitoring in the search space and $m = 0, \ldots, M^{(L)}$. i is an index for specifying an individual CCE in each PDCCH candidate in a PDCCH and $i = 0, \ldots, L-1$. $k = \lfloor n_s/2 \rfloor$ and $n_s$ denotes a slot index within a radio frame.

As described above, the UE monitors both the USS and the CSS in order to decode the PDCCH. Here, the CSS supports PDCCHs having aggregation levels of {4, 8} and the USS supports PDCCHs having aggregation levels of {1, 2, 4, 8}. Table 5 shows PDCCH candidates monitored by the UE.

TABLE 5

| Type | Search space $S_k^{(L)}$ | | Number of PDCCH candidates $M^{(L)}$ |
| --- | --- | --- | --- |
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to Equation 1, in case of the CSS, $Y_k$ is set to 0 with respect to two aggregation levels, that is, L=4 and L=8. In contrast, with respect to the aggregation level L, in case of USS, $Y_k$ is defined as shown in Equation 2.

$$Y_k = (A \cdot Y_{k-1}) \bmod D \qquad \text{Equation 2}$$

where, $Y_{-1} = n_{RNTI} \neq 0$, which indicates $n_{RNTI}$ RNTI. In addition, A=39827 and D=65537.

1.3. Downlink Control Information (DCI)

1.3.1. Downlink Control Information Format

Fields within a DCI format are mapped to information bits $a_0, \ldots, a_{A-1}$. The fields are mapped in the following order and include zero padding. A first field is mapped to an information bit $a_0$ having a smallest order and the fields are consecutively mapped to the information bits in ascending order. A most significant bit (MSB) of each field is mapped to an information bit having a smallest order for the field. For example, an MSB of a first field is mapped to $a_0$.

Here, for a serving cell configured for a UE, DCI formats 0, 1A, 3 and 3A may have the same payload size within the CSS and DCI formats 0 and 1A may have the same payload size within the USS.

1.3.1.1. DCI Format 0

DCI format 0 is used to schedule a PUSCH in one uplink cell.

Hereinafter, information transmitted via DCI format 0 will be described.

1) Carrier indicator—Includes 0 or 3 bits.

2) Flag for DCI format 0/1A differentiation—Includes 1 bit, wherein a value of 0 indicates DCI format 0 and a value of 1 indicates DCI format 1A.

3) Frequency hopping flag—Includes 1 bit. In this field, an MSB of resource allocation may be used for multi-cluster allocation.

4) Resource block assignment and hopping resource assignment—Includes $\lceil \log_2(N_{RB}^{DL}(N_{RB}^{DL}+1)/2) \rceil$ bits.

Here, in case of PUSCH hopping in single-cluster allocation, in order to acquire a value of $\tilde{n}_{PRB}(i)$, $N_{UL\_hop}$ MSBs are used. $(\lceil \log_2(N_{RB}^{UL}(N_{RB}^{UL}+1)/2) \rceil) - N_{UL\_hop})$ bits provide resource allocation of a first slot within an uplink subframe. In addition, if PUSCH hopping is not present in single-cluster allocation, $(\lceil \log_2(N_{RB}^{UL}(N_{RB}^{UL}+1)/2) \rceil)$ bits provide resource allocation within an uplink subframe. In addition, if PUSCH hopping is not present in multi-cluster allocation, resource allocation information is obtained from concatenation between the frequency hopping flag field and resource block assignment and hopping resource assignment field and $$\left\lceil \log_2 \left( \binom{\lceil N_{RB}^{UL}/P + 1 \rceil}{4} \right) \right\rceil$$

bits provide resource allocation within an uplink subframe. At this time, the P value is determined by the number of downlink resource blocks.

5) Modulation and coding scheme (MCS)—Includes 5 bits.

6) New data indicator—Includes 1 bit.

7) Transmit power control (TPC) command for PUSCH—Includes 2 bits.

8) Index of orthogonal cover/orthogonal cover code (OC/OCC) and cyclic shift for demodulation reference signal (DMRS)—Includes 3 bits.

9) Uplink Index—Includes 2 bits. This field is present only in TDD operation according to uplink-downlink configuration 0.

10) Downlink assignment index (DAI)—Includes 2 bits. This field is present only in TDD operation according to uplink-downlink configurations 1 to 6.

11) Channel state information (CSI) request—Includes 1 or 2 bits. Here, a 2-bit field is only applied to the case in which the DCI is mapped to the UE, for which one or more downlink cells are configured, by the C-RNTI in a UE-specific manner.

12) Sounding reference signal (SRS) request—Includes 0 or 1 bit. This field is present only in the case in which a scheduled PUSCH is mapped in a UE-specific manner by the C-RNTI.

13) Multi-cluster flag—Includes 1 bit.

If the number of information bits in DCI format 0 is less than the payload size (including added padding bits) of DCI format 1A, 0 is appended to DCI format 0 such that the number of information bits becomes equal to the payload size of DCI format 1A.

1.3.1.2. DCI Format 1

DCI format 1 is used to schedule one PDSCH codeword in one cell.

Hereinafter, information transmitted via DCI format 1 will be described.

1) Carrier indicator—Includes 0 or 3 bits.

2) Resource allocation header—Indicates resource allocation type 0 or 1 and include 1 bit. If a downlink frequency bandwidth is equal to or less than 10 physical resource blocks (PRBs), the resource allocation header is not present and resource allocation type 0 is assumed.

3) Resource block assignment—if the resource assignment type is 0, $\lceil N_{RB}^{DL}/P \rceil$ bits are provided for resource assignment. If the resource assignment type is 1, $\lceil \log_2(P) \rceil$ bits of this field are used as a header specific to the resource assignment type indicating a selected resource block subset. 1 bit is used to indicate shift of resource assignment span. As a result, $(\lceil N_{RB}^{DL}/P \rceil - \lceil \log_2(P) \rceil - 1)$ bits provide resource assignment. At this time, the P value is determined by the number of downlink resource blocks.

4) Modulation and coding scheme (MCS)—Includes 5 bits.

5) HARQ process number—Includes 3 bits in an FDD system and include four bits in a TDD system.

6) New data indicator—Includes 1 bit.

7) Redundancy version—Includes 2 bits.

8) TPC command for PUCCH—Includes 2 bits.

9) Downlink Assignment index—Includes 2 bits. The downlink assignment index is present in a TDD system for all uplink-downlink configurations but is only applied to TDD operation having uplink-downlink configurations 1 to 6. In an FDD system, this field is not present.

If the number of information bits in DCI format 1 is equal to that of DCI format 0/1A, 1 bit having a value of 0 is appended to DCI format 1. In contrast, if the number of information bits in DCI format 1 belongs to a size set in Table 6 below, one or more 0-bits may be appended to DCI format 1 until the payload size of DCI format 1 does not belong to Table 6 and does not become equal to that of DCI format 0/1A.

Table 6 shows the size set of information bits.

TABLE 6

{12, 14, 16 ,20, 24, 26, 32, 40, 44, 56}

1.3.1.3. DCI Format 1A

DCI format 1A is used for compact scheduling of one PDSCH codeword in one cell and is used for a random access procedure started by the PDCCH.

Hereinafter, information transmitted via DCI format 1A will be described.

1) Carrier indicator—Includes 0 or 3 bits.

2) Flag for DCI format 0/1A differentiation—Includes 1 bit, wherein a value of 0 indicates DCI format 0 and a value of 1 indicates DCI format 1A.

3) Localized/Distributed virtual resource block (VRB) assignment flag—Includes 1 bit.

4) Resource block assignment—Includes $\lceil \log_2(N_{RB}^{DL}(N_{RB}^{DL}+1)/2) \rceil$ bits.

Here, in case of a localized VRB, $\lceil \log_2(N_{RB}^{DL}(N_{RB}^{DL}+1)/2) \rceil$ bits are provided for resource assignment.

In case of a distributed VRB, if the number of downlink resource blocks indicating a downlink frequency bandwidth configuration is less than 50 ($N_{RB}^{DL}<50$) or DCI format 1A CRC is scrambled with random access (RA)-RNTI, paging (P)-RNTI or system information (SI)-RNTI, $\lceil \log_2(N_{RB}^{DL}(N_{RB}^{DL}+1)/2) \rceil$ bits are provided for resource assignment. In the other case, 1 bit, which is an MSB, indicates a gap value for distribution upon mapping VRBs to physical resource blocks. Here, if the value of this field is 0, this indicates $N_{gap}=N_{gap,1}$ and, if the value of this field is 1, this indicates $N_{gap}=N_{gap,2}$. In addition, $(\lceil \log_2(N_{RB}^{DL}(N_{RB}^{DL}+1)/2) \rceil - 1)$ bits are provided for resource assignment.

5) Modulation and coding scheme (MCS)—Includes 5 bits.

6) HARQ process number—Includes 3 bits in an FDD system and include four bits in a TDD system.

7) New data indicator—Includes 1 bit.

The new data indicator may be changed depending upon whether virtual DCI format 1A CRC is scrambled with the RA-RNTI, P-RNTI or SI-RNTI.

In the case in which the virtual DCI format 1A CRC is scrambled with the RA-RNTI, P-RNTI or SI-RNTI, if the number of downlink resource blocks is equal to or greater than 50 ($N_{RB}^{DL} \geq 50$) and the localized/distributed VRB assignment flag is set to 1, the new data indicator indicates a gap value. At this time, if the value of this field is 0, this indicates $N_{gap}=N_{gap,1}$ and, if this value of this field is 1, this indicates $N_{gap}=N_{gap,2}$. Otherwise, the new data indicator is reserved.

In contrast, in the case in which the virtual DCI format 1A CRC is not scrambled with the RA-RNTI, P-RNTI or SI-RNTI, the new data indicator may be configured in advance.

8) Redundancy version—Includes 2 bits.

9) TPC command for PUCCH—Includes 2 bits. Here, if DCI format 1A CRC is scrambled with the RA-RNTI, P-RNTI or SI-RNTI, the MSB of the TPC command is reserved and a least significant bit (LSB) of the TPC command indicates a column according to a value $N_{PRB}^{1A}$ in a table indicating a transport block size (TBS). At this time, if the LSB is 0, $N_{PRB}^{1A}$ is equal to 2 and, otherwise, $N_{PRB}^{1A}$ is equal to 3.

If DCI format 1A CRC is not scrambled with the RA-RNTI, P-RNTI or SI-RNTI, 2 bits including the MSB indicate a TPC command.

10) Downlink Assignment index—Includes 2 bits. The downlink assignment index is present in a TDD system for all uplink-downlink configurations but is only applied to TDD operation having uplink-downlink configurations 1 to 6. In an FDD system, this field is not present.

11) Sounding reference signal (SRS) request—Includes 0 or 1 bit. This field is present only in the case in which a scheduled PUSCH is mapped by the C-RNTI in a UE-specific manner.

If the number of information bits in DCI format 1A is less than the number of information bits in DCI format 0, a value of 0 may be appended to the information bits in DCI format 1A until the payload becomes equal to the number of information bits in DCI format 0. If the number of information bits in DCI format 1A belongs to the size set of Table 6 above, one 0-bit may be appended to DCI format 1A.

If DCI format 1A CRC is not scrambled with the RA-RNTI, P-RNTI or SI-RNTI, the HARQ process number and downlink assignment index fields among the above-described fields may be reserved.

In contrast, if DCI format 1A is scrambled with the C-RNTI, this is used for a random access procedure started by the PDCCH. At this time, DCI format 1A is configured as follows.

1) Localized/distributed VRB assignment flag—Includes 1 bit. The value of this field is set to 0.

2) Resource block assignment—Includes $\lceil \log_2(N_{RB}^{DL}(N_{RB}^{DL}+1)/2) \rceil$ bits. All bits are set to 1.

3) Preamble index—Includes 6 bits.

4) Physical random access channel (PRACH) mask index—Includes 4 bits.

All the remaining bits are set to 0.

1.3.1.4. DCI Format 1B

DCI format 1B is used for compact scheduling of one PDSCH codeword in one cell along with precoding information.

Hereinafter, information transmitted via DCI format 1B will be described.

1) Carrier indicator—Includes 0 or 3 bits.

2) Localized/Distributed virtual resource block (VRB) assignment flag—Includes 1 bit.

3) Resource block assignment—Include $\lceil \log_2(N_{RB}^{DL}(N_{RB}^{DL}+1)/2) \rceil$ bits.

Here, in case of a localized VRB, $\lceil \log_2(N_{RB}^{DL}(N_{RB}^{DL}+1)/2) \rceil$ bits are provided for resource assignment.

In case of a distributed VRB, if the number of downlink resource blocks indicating a downlink frequency bandwidth configuration is less than 50 ($N_{RB}^{DL}<50$), $\lceil \log_2(N_{RB}^{DL}(N_{RB}^{DL}+1)/2) \rceil$ bits are provided for resource assignment. In contrast, if the number of downlink resource blocks is equal to or greater than 50 ($N_{RB}^{DL} \geq 50$), 1 bit which is an MSB indicates a gap value for distribution upon mapping VRBs to physical resource blocks. Here, if the value of this field is 0, this indicates $N_{gap}=N_{gap,1}$ and, if the value of this field is 1, this indicates $N_{gap}=N_{gap,2}$. In addition, $\lceil \log_2(N_{RB}^{DL}(N_{RB}^{DL}+1)/2) \rceil$ bits are provided for resource assignment.

4) Modulation and coding scheme (MCS)—Includes 5 bits.

5) HARQ process number—Includes 3 bits in an FDD system and include four bits in a TDD system.

6) New data indicator—Includes 1 bit.

7) Redundancy version—Includes 2 bits.

8) TPC command for PUCCH—Includes 2 bits.

9) Downlink Assignment index—Includes 2 bits. The downlink assignment index is present in a TDD system for all uplink-downlink configurations but is only applied to TDD operation having uplink-downlink configurations 1 to 6. In an FDD system, this field is not present.

10) Transmitted precoding matrix indicator (TPMI) information for precoding—The number of bits is determined as shown in Table 7 below.

Table 7 shows the number of bits for TPMI information.

TABLE 7

| Number of antenna ports at eNodeB | Number of bits |
|---|---|
| 2 | 2 |
| 4 | 4 |

The TPMI information indicates a codebook index used in Table 26 or 27 below corresponding to single-layer transmission.

11) Precoding matrix indicator (PMI) confirmation for precoding—Includes 1 bit. The indicated message is shown in Table 8 below.

Table 8 shows content of PMI confirmation.

TABLE 8

| Bit field mapped to index | Message |
|---|---|
| 0 | Precoding according to the indicated TPMI in the TPMI information field |
| 1 | Precoding according to the latest PMI report on PUSCH using the precoder(s) indicated by the reported PMI(s) |

If a PMI confirmation field indicates that the base station applies precoding according to the PMI reported by the UE, precoding for the resource block at an n-th subframe does not follow the PUCCH at the corresponding subframe or an (n−4)-th subframe but follows last PMI at the PUSCH reported by the UE.

If the number of information bits in DCI format 1B belongs to one of the size set of Table 6 above, one 0-bit may be appended to DCI format 1B.

1.3.1.5. DCI Format 1C

DCI format 1C is used for very compact scheduling of one PDSCH codeword and is used to report change in multicast control channel (MCCH).

Hereinafter, information transmitted via DCI format 1C will be described.

First, the case in which DCI format 1C is used for very compact scheduling of one PDSCH codeword will be described.

1) 1 bit indicates a gap value for distribution upon mapping of virtual resource blocks to physical resource blocks. At this time, if the value of this bit is 0, this indicates $N_{gap}=N_{gap,1}$ and, if the value of this bit is 1, this indicates $N_{gap}=N_{gap,2}$.

2) If the number of downlink resource blocks is less than 50 ($N_{RB}^{DL}<50$), a bit for gap indication is not present.

3) Resource block assignment—Includes $\lceil \log_2(\lfloor N_{VRB,gap1}^{DL}/N_{RB}^{step} \rfloor \cdot (\lfloor N_{VRB,gap1}^{DL}/N_{RB}^{step} \rfloor +1)/2) \rceil$ bits.

4) MCS—Includes 5 bits.

Next, if DCI format 1C is used to report change in MCCH, information for reporting change in MCCH includes 8 bits and reserved information bits are appended until having the same size as when DCI format 1C is used for very compact scheduling of one PDSCH codeword.

1.3.1.6. DCI Format 1D

DCI format 1D is used for compact scheduling of one PDSCH codeword in one cell along with precoding information and power offset information.

Hereinafter, information transmitted via DCI format 1D will be described.

1) Carrier indicator—Includes 0 or 3 bits.
2) Localized/Distributed virtual resource block (VRB) assignment flag—Includes 1 bit.
3) Resource block assignment—Includes $\lceil \log_2(N_{RB}^{DL}(N_{RB}^{DL}+1)/2) \rceil$ bits.

Here, in case of a localized VRB, $\lceil \log_2(N_{RB}^{DL}(N_{RB}^{DL}+1)/2) \rceil$ bits are provided for resource assignment.

In case of a distributed VRB, if the number of downlink resource blocks indicating a downlink frequency bandwidth configuration is less than 50 ($N_{RB}^{DL}<50$), $\lceil \log_2(N_{RB}^{DL}(N_{RB}^{DL}+1)/2) \rceil$ bits are provided for resource assignment. In contrast, if the number of downlink resource blocks is equal to or greater than 50 ($N_{RB}^{DL} \geq 50$), 1 bit which is an MSB indicates a gap value for distribution upon mapping VRBs to physical resource blocks. Here, if the value of this field is 0, this indicates $N_{gap}=N_{gap,1}$ and, if the value of this field is 1, this indicates $N_{gap}=N_{gap,2}$. In addition, ($\lceil \log_2(N_{RB}^{DL}(N_{RB}^{DL}+1)/2) \rceil -1$) bits are provided for resource assignment.

4) Modulation and coding scheme (MCS)—Includes 5 bits.
5) HARQ process number—Includes 3 bits in an FDD system and include four bits in a TDD system.
6) New data indicator—Includes 1 bit.
7) Redundancy version—Includes 2 bits.
8) TPC command for PUCCH—Includes 2 bits.
9) Downlink Assignment index—Includes 2 bits. The downlink assignment index is present in a TDD system for all uplink-downlink configurations but is only applied to TDD operation having uplink-downlink configurations 1 to 6. In an FDD system, this field is not present.
10) Transmitted precoding matrix indicator (TPMI) information for precoding—The number of bits is determined as shown in Table 8 below.

Table 8 shows the number of bits for TPMI information.

TABLE 8

| Number of antenna ports at eNodeB | Number of bits |
|---|---|
| 2 | 2 |
| 4 | 4 |

The TPMI information indicates a codebook index used in Table 26 or 27 below corresponding to single-layer transmission.

11) Downlink power offset—Includes 1 bit.

If the number of information bits in DCI format 1D belongs to one of the size set of Table 6 above, one 0-bit may be appended to DCI format 1D.

1.3.1.7. DCI Format 2

DCI format 2 is used for PDSCH scheduling in a closed-loop spatial multiplexing mode.

Hereinafter, information transmitted via DCI format 2 will be described.

1) Carrier indicator—Includes 0 or 3 bits.
2) Resource allocation header—Indicate resource allocation type 0 or 1 and include 1 bit. If a downlink frequency bandwidth is equal to or less than 10 physical resource blocks (PRBs), the resource allocation header is not present and resource allocation type 0 is assumed.
3) Resource block assignment—if the resource assignment type is 0, $\lceil N_{RB}^{DL}/P \rceil$ bits are provided for resource assignment. If the resource assignment type is 1, $\lceil \log_2(P) \rceil$ bits of this field are used as a header specific to the resource assignment type indicating a selected resource block subset. 1 bit is used to indicate shift of resource assignment span. As a result, ($\lceil N_{RB}^{DL}/P \rceil - \lceil \log_2(P) \rceil -1$) bits provide resource assignment. At this time, the P value is determined by the number of downlink resource blocks.
4) TPC command for PUCCH—Includes 2 bits.
5) Downlink Assignment index—Includes 2 bits. The downlink assignment index is present in a TDD system for all uplink-downlink configurations but is only applied to TDD operation having uplink-downlink configurations 1 to 6. In an FDD system, this field is not present.
6) HARQ process number—Includes 3 bits in an FDD system and include four bits in a TDD system.
7) Swap flag to codeword of transport block—Includes 1 bit.
8) Modulation and coding scheme (MCS)—Includes 5 bits per transport block.
9) New data indicator—Includes 1 bit per transport block.
10) Redundancy version—Includes 2 bits per transport block.
11) Precoding information—The number of bits is determined as shown in Table 9 below.

TABLE 9

| Number of antenna ports at eNodeB | Number of bits for precoding information |
|---|---|
| 2 | 3 |
| 4 | 6 |

If two transport blocks are activated, mapping of the transport blocks to codewords is performed shown in Table 10 below and, if only one transport block is activated, mapping of the transport blocks to codewords is performed as shown in Table 11 below.

Table 10 shows mapping of the transport blocks to codewords if two transport blocks are activated.

TABLE 10

| transport block to codeword swap flag value | codeword 0 (enabled) | codeword 1 (enabled) |
|---|---|---|
| 0 | transport block 1 | transport block 2 |
| 1 | transport block 2 | transport block 1 |

Table 11 shows mapping of the transport blocks to codewords if only one transport block is activated.

TABLE 11

| transport block 1 | transport block 2 | codeword 0 (enabled) | codeword 1 (disabled) |
|---|---|---|---|
| enabled | disabled | transport block 1 | — |
| disabled | enabled | transport block 2 | — |

A precoding information field is shown in Table s12 and 13 below.

Table 12 shows content of a precoding information field for 2 antenna ports.

TABLE 12

| One codeword: Codeword 0 enabled, Codeword 1 disabled | | Two codewords: Codeword 0 enabled, Codeword 1 enabled | |
|---|---|---|---|
| Bit field mapped to index | Message | Bit field mapped to index | Message |
| 0 | 2 layers: Transmit diversity | 0 | 2 layers: Precoding corresponding to precoder matrix $\frac{1}{2}\begin{bmatrix} 1 & 1 \\ 1 & -1 \end{bmatrix}$ |
| 1 | 1 layer: Precoding corresponding to precoding vector $[1\ 1]^T/\sqrt{2}$ | 1 | 2 layers: Precoding corresponding to precoder matrix $\frac{1}{2}\begin{bmatrix} 1 & 1 \\ j & -j \end{bmatrix}$ |
| 2 | 1 layer: Precoding corresponding to precoder vector $[1\ -1]^T/\sqrt{2}$ | 2 | 2 layers: Precoding according to the latest PMI report in PUSCH, using the precoder(s) indicated by the reported PMI(s) |
| 3 | 1 layer: Precoding corresponding to precoder vector $[1\ j]^T/\sqrt{2}$ | 3 | reserved |
| 4 | 1 layer: Precoding corresponding to precoder vector $[1\ -j]^T/\sqrt{2}$ | 4 | reserved |
| 5 | 1 layer: Precoding according to the latest PMI report on PUSCH, using the precoder(s) indicated by the reported PMI(s), if RI = 2 was reported, using $1^{st}$ column multiplied by $\sqrt{2}$ of all precoders implied by the reported PMI(s) | 5 | reserved |
| 6 | 1 layer: Precoding according to the latest PMI report on PUSCH, using the precoder(s) indicated by the reported PMI(s), if RI = 2 was reported, using $2^{nd}$ column multiplied by $\sqrt{2}$ of all precoders implied by the reported PMI(s) | 6 | reserved |
| 7 | reserved | 7 | reserved |

Table 13 shows content of a precoding information field for four antenna ports.

TABLE 13

| One codeword: Codeword 0 enabled, Codeword 1 disabled | | Two codewords: Codeword 0 enabled, Codeword 1 enabled | |
|---|---|---|---|
| Bit field mapped to index | Message | Bit field mapped to index | Message |
| 0 | 4 layers: Transmit diversity | 0 | 2 layers: TPMI = 0 |
| 1 | 1 layer: TPMI = 0 | 1 | 2 layers: TPMI = 1 |
| 2 | 1 layer: TPMI = 1 | . | . |
| . | . | . | . |
| . | . | . | . |
| . | . | 15 | 2 layers: TPMI = 15 |
| 16 | 1 layer: TPMI = 15 | 16 | 2 layers: Precoding according to the latest PMI report on PUSCH using the precoder(s) indicated by the reported PMI(s) |
| 17 | 1 layer: Precoding according to the latest PMI report on PUSCH using the precoder(s) indicated by the reported PMI(s) | 17 | 3 layers: TPMI = 0 |

TABLE 13-continued

| One codeword: Codeword 0 enabled, Codeword 1 disabled | | Two codewords: Codeword 0 enabled, Codeword 1 enabled | |
|---|---|---|---|
| Bit field mapped to index | Message | Bit field mapped to index | Message |
| 18 | 2 layers: TPMI = 0 | 18 | 3 layers: TPMI = 1 |
| 19 | 2 layers: TPMI = 1 | . | . |
| . | . | . | . |
| . | . | 32 | 3 layers: TPMI = 15 |
| . | . | | |
| 33 | 2 layers: TPMI = 15 | 33 | 3 layers: Precoding according to the latest PMI report on PUSCH using the precoder(s) indicated by the reported PMI(s) |
| 34 | 2 layers: Precoding according to the latest PMI report on PUSCH using the precoder(s) indicated by the reported PMI(s) | 34 | 4 layers: TPMI = 0 |
| 35-63 | reserved | 35 | 4 layers: TPMI = 1 |
| | | . | . |
| | | . | . |
| | | 49 | 4 layers: TPMI = 15 |
| | | 50 | 4 layers: Precoding according to the latest PMI report on PUSCH using the precoder(s) indicated by the reported PMI(s) |
| | | 51-63 | Reserved |

The TPMI information indicates a codebook index used in Table 16 or 27 below corresponding to single-layer transmission.

In case of a single activated codeword, if previous transport blocks were transmitted using two layers via closed-loop spatial multiplexing, only indices 18 to 34 included in Table 13 are supported for retransmission of the transport blocks.

If the number of information bits in DCI format 2 belongs to one of the size set of Table 6 above, one 0-bit may be appended to DCI format 2.

Specific entries shown in Tables 12 and 13 above may be used to indicate that the base station applies precoding according to the PMI reported by the UE. In this case, precoding for the resource block at an n-th subframe does not follow the PUCCH at the corresponding subframe or an (n−4)-th subframe but follows a last PMI at the PUSCH reported by the UE.

1.3.1.8. DCI Format 2A

DCI format 2A is used for PDSCH scheduling in an open-loop spatial multiplexing mode.

Hereinafter, information transmitted via DCI format 2A will be described.

1) Carrier indicator—Includes 0 or 3 bits.

2) Resource allocation header—Indicates resource allocation type 0 or 1 and include 1 bit. If a downlink frequency bandwidth is equal to or less than 10 physical resource blocks (PRBs), the resource allocation header is not present and resource allocation type 0 is assumed.

3) Resource block assignment—if the resource assignment type is 0, $\lceil N_{RB}^{DL}/P \rceil$ bits are provided for resource assignment. If the resource assignment type is 1, $\lceil \log_2(P) \rceil$ bits of this field are used as a header specific to the resource assignment type indicating a selected resource block subset. 1 bit is used to indicate shift of resource assignment span. As a result, $(\lceil N_{RB}^{DL}/P \rceil - \lceil \log_2(P) \rceil - 1)$ bits provide resource assignment. At this time, the P value is determined by the number of downlink resource blocks.

4) TPC command for PUCCH—Includes 2 bits.

5) Downlink Assignment index—Includes 2 bits. The downlink assignment index is present in a TDD system for all uplink-downlink configurations but is only applied to TDD operation having uplink-downlink configurations 1 to 6. In an FDD system, this field is not present.

6) HARQ process number—Includes 3 bits in an FDD system and include four bits in a TDD system.

7) Swap flag to codeword of transport block—Includes 1 bit.

8) Modulation and coding scheme (MCS)—Includes 5 bits per transport block.

9) New data indicator—Includes 1 bit per transport block.

10) Redundancy version—Includes 2 bits per transport block.

11) Precoding information—The number of bits is determined as shown in Table 14 below.

TABLE 14

| Number of antenna ports at eNodeB | Number of bits for precoding information |
|---|---|
| 2 | 0 |
| 4 | 2 |

If two transport blocks are activated, mapping of the transport blocks to codewords is shown in Table 10 above and, if only one transport block is activated, mapping of the transport blocks to codewords is shown in Table 11 above.

A precoding information field is defined as shown in Table 15 below.

Table 15 shows content of the precoding information field for 4 antenna ports.

TABLE 15

| Bit field mapped to index | One codeword: Codeword 0 enabled, Codeword 1 disabled Message | Bit field mapped to index | Two codewords: Codeword 0 enabled, Codeword 1 enabled Message |
|---|---|---|---|
| 0 | 4 layers: Transmit diversity | 0 | 2 layers: precoder cycling with large delay CDD |
| 1 | 2 layers: precoder cycling with large delay CDD | 1 | 3 layers: precoder cycling with large delay CDD |
| 2 | reserved | 2 | 4 layers: precoder cycling with large delay CDD |
| 3 | reserved | 3 | reserved |

In case of a single activated codeword, if previous transport blocks were transmitted using two layers via cyclic delay diversity (CDD) having large delay, only an index 1 included in Table 15 is supported for retransmission of the transport blocks.

A precoding information field for two antenna ports is not present. If two codewords are activated, the number of transport layers is equal to 2 and, if codeword 1 is deactivated and codeword 0 is activated, transmit diversity is used.

If the number of information bits in DCI format 2A belongs to one of the size set of Table 6 above, one 0-bit may be appended to DCI format 2A.

1.3.1.9. DCI Format 2B

Hereinafter, information transmitted via DCI format 2B will be described.

1) Carrier indicator—Includes 0 or 3 bits.
2) Resource allocation header—Indicates resource allocation type 0 or 1 and include 1 bit. If a downlink frequency bandwidth is equal to or less than 10 physical resource blocks (PRBs), the resource allocation header is not present and resource allocation type 0 is assumed.
3) Resource block assignment—if the resource assignment type is 0, $\lceil N_{RB}^{DL}/P \rceil$ bits are provided for resource assignment. If the resource assignment type is 1, $\lceil \log_2(P) \rceil$ bits of this field are used as a header specific to the resource assignment type indicating a selected resource block subset. 1 bit is used to indicate shift of resource assignment span. As a result, $(\lceil N_{RB}^{DL}/P \rceil - \lceil \log_2(P) \rceil - 1)$ bits provide resource assignment. At this time, the P value is determined by the number of downlink resource blocks.
4) TPC command for PUCCH—Includes 2 bits.
5) Downlink Assignment index—Includes 2 bits. The downlink assignment index is present in a TDD system for all uplink-downlink configurations but is only applied to TDD operation having uplink-downlink configurations 1 to 6. In an FDD system, this field is not present.
6) HARQ process number—Includes 3 bits in an FDD system and include four bits in a TDD system.
7) Scrambling identity—Includes 1 bit.
8) Sounding reference signal (SRS) request—Includes 0 or 1 bit. This field may be present only in the TDD system.
9) Modulation and coding scheme (MCS)—Includes 5 bits per transport block.
10) New data indicator—Includes 1 bit per transport block.
11) Redundancy version—Includes 2 bits per transport block.

If two transport blocks are activated, the number of layers is equal to 2. Transport block 1 is mapped to codeword 0 and transport block 2 is mapped to codeword 1. Antenna ports 7 and 8 are used for spatial multiplexing.

If one transport block is deactivated, the number of layers is equal to 1. Mapping of the transport blocks to codewords is shown in Table 11 above. Antenna ports for single-antenna-port transmission are shown in Table 16 below.

Table 16 shows antenna ports for single-antenna-port transmission if one transport block is deactivated.

TABLE 16

| New data indicator of the disabled transport block | Antenna port |
|---|---|
| 0 | 7 |
| 1 | 8 |

If the number of information bits in DCI format 2B belongs to one of the size set of Table 6 above, one 0-bit may be appended to DCI format 2B.

1.3.1.10. DCI Format 2C

Hereinafter, information transmitted via DCI format 2C will be described.

1) Carrier indicator—Includes 0 or 3 bits.
2) Resource allocation header—Indicates resource allocation type 0 or 1 and include 1 bit. If a downlink frequency bandwidth is equal to or less than 10 physical resource blocks (PRBs), the resource allocation header is not present and resource allocation type 0 is assumed.
3) Resource block assignment—if the resource assignment type is 0, $\lceil N_{RB}^{DL}/P \rceil$ bits are provided for resource assignment. If the resource assignment type is 1, $\lceil \log_2(P) \rceil$ bits of this field are used as a header specific to the resource assignment type indicating a selected resource block subset. 1 bit is used to indicate shift of resource assignment span. As a result, $(\lceil N_{RB}^{DL}/P \rceil - \lceil \log_2(P) \rceil - 1)$ bits provide resource assignment. At this time, the P value is determined by the number of downlink resource blocks.
4) TPC command for PUCCH—Includes 2 bits.
5) Downlink Assignment index—Includes 2 bits. The downlink assignment index is present in a TDD system for all uplink-downlink configurations but is only applied to TDD operation having uplink-downlink configurations 1 to 6. In an FDD system, this field is not present.
6) HARQ process number—Includes 3 bits in an FDD system and include four bits in a TDD system.
7) Antenna port and scrambling identity—Includes 3 bits as shown in Table 17 below. Here, $n_{SCID}$ denotes a scrambling identity for antenna ports 7 and 8.

Table 17 shows the number of antenna ports, scrambling identities and layers.

TABLE 17

| One Codeword: Codeword 0 enabled, Codeword 1 disabled | | Two Codewords: Codeword 0 enabled, Codeword 1 enabled | |
| --- | --- | --- | --- |
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 3 layers, ports 7-9 |
| 3 | 1 layer, port 8, $n_{SCID} = 1$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

8) Sounding reference signal (SRS) request—Includes 0 bits or 1 bit. This field may be present only in the TDD system.

9) Modulation and coding scheme (MCS)—Includes 5 bits per transport block.

10) New data indicator—Includes 1 bit per transport block.

11) Redundancy version—Includes 2 bits per transport block.

If two transport blocks are activated, transport port 1 is mapped to codeword 0 and transport block 2 is mapped to codeword 1.

If one transport block is deactivated, the number of layers is equal to 1. Mapping of the transport blocks to codewords is shown in Table 11 above. If one codeword is activated, previous transport blocks were transmitted using layers 2, 3 and 4. In Table 17 above, only values 4, 5 and 6 are supported for retransmission of transport blocks.

If the number of information bits in DCI format 2C belongs to one of the size set of Table 6 above, one 0-bit may be appended to DCI format 2C.

1.3.1.11. DCI Format 3

DCI format 3 is used to transmit a TPC command for a PUCCH and PUSCH using 2-bit power adjustment.

Hereinafter, information transmitted via DCI format 3 will be described.

1) TPC command number 1, TPC command number 2, . . . , TPC command number N—Here, this is equal to $$N = \left\lfloor \frac{L_{format0}}{2} \right\rfloor.$$

$L_{format\ 0}$ is equal to the payload size of DCI format 0 before CRC attachment and appending of padding bits. A parameter "tpc-Index" provided by a higher layer determines an index of a TPC command for a UE. At this time, in case of $$\left\lfloor \frac{L_{format0}}{2} \right\rfloor < \frac{L_{format0}}{2},$$

a bit having a value of 0 may be appended to DCI format 3.

1.3.1.12. DCI Format 3A

DCI format 3A is used to transmit a TPC command for a PUCCH and PUSCH using 1-bit power adjustment.

Hereinafter, information transmitted via DCI format 3A will be described.

1) TPC command number 1, TPC command number 2, . . . , TPC command number N—Here, this is equal to $N=L_{format\ 0}$. $L_{format\ 0}$ is equal to the payload size of DCI format 0 before CRC attachment and appending of padding bits. A parameter "tpc-Index" provided by a higher layer determines an index of a TPC command for a UE.

1.3.1.13. DCI Format 4

DCI format 4 is used for scheduling of a PUSCH within one uplink cell in a multi-antenna-port transmission mode.

Hereinafter, information transmitted via DCI format 4 will be described.

1) Carrier indicator—Includes 0 or 3 bits.

2) Resource block assignment and hopping resource assignment—Includes $$\left\lceil \log_2\left(\binom{\lceil N_{RB}^{UL}/P + 1 \rceil}{4}\right) \right\rceil$$

bits. At this time, the P value is determined by the number of downlink resource blocks.

Here, given single-cluster allocation, ($\lceil \log_2(N_{RB}^{UL}(N_{RB}^{UL}+1)/2) \rceil$) LSBs are provided to resource allocation in an uplink subframe. In contrast, given multi-cluster allocation, all bits of this field are provided to resource allocation in an uplink subframe.

3) Transmit Power control (TPC) command for PUSCH

4) Index of orthogonal cover code (OCC) and cyclic shift for demodulation reference signal (DMRS)—Includes 3 bits.

5) Uplink Index—Includes 2 bits. This field is present only in TDD operation according to uplink-downlink configuration 0.

6) Downlink Assignment index (DAI)—Includes 2 bits. This field is present only in TDD operation according to uplink-downlink configurations 1 to 6.

7) Channel state information (CSI) request—Includes 1 or 2 bits. Here, a 2-bit field is only applied to a UE for which one or more downlink cells are configured.

8) Sounding reference signal (SRS) request—Includes 2 bits.

9) Multi-cluster flag—Includes 1 bit.

10) Modulation and coding scheme (MCS)—Includes 5 bits per transport block.

11) New data indicator—Includes 1 bit per transport block.

12) Precoding information and layer number—The number of bits is determined as shown in Table 18 below.

Table 18 shows the number of bits for precoding information.

TABLE 18

| Number of antenna ports at UE | Number of bits for precoding information |
| --- | --- |
| 2 | 3 |
| 4 | 6 |

Table 19 shows content of a precoding information field for two antenna ports.

TABLE 19

| One codeword: Codeword 0 enabled Codeword 1 disabled | | Two codewords: Codeword 0 enabled Codeword 1 enabled | |
| --- | --- | --- | --- |
| Bit field mapped to index | Message | Bit field mapped to index | Message |
| 0 | 1 layer: TPMI = 0 | 0 | 2 layers: TPMI = 0 |
| 1 | 1 layer: TPMI = 1 | 1-7 | reserved |
| 2 | 1 layer: TPMI = 2 | | |
| ... | ... | | |
| 5 | 1 layer: TPMI = 5 | | |
| 6-7 | reserved | | |

Table 20 shows content of a precoding information field for four antenna ports.

TABLE 20

| One codeword: Codeword 0 enabled Codeword 1 disabled | | Two codewords: Codeword 0 enabled Codeword 1 enabled | |
| --- | --- | --- | --- |
| Bit field mapped to index | Message | Bit field mapped to index | Message |
| 0 | 1 layer: TPMI = 0 | 0 | 2 layers: TPMI = 0 |
| 1 | 1 layer: TPMI = 1 | 1 | 2 layers: TPMI = 1 |
| ... | ... | ... | ... |
| 23 | 1 layer: TPMI = 23 | 15 | 2 layers: TPMI = 15 |
| 24 | 2 layers: TPMI = 0 | 16 | 3 layers: TPMI = 0 |
| 25 | 2 layers: TPMI = 1 | 17 | 3 layers: TPMI = 1 |
| ... | ... | ... | ... |
| 39 | 2 layers: TPMI = 15 | 27 | 3 layers: TPMI = 11 |
| 40-63 | reserved | 28 | 4 layers: TPMI = 0 |
| | | 29-63 | Reserved |

If two transport blocks are activated, transport port 1 is mapped to codeword 0 and transport block 2 is mapped to codeword 1. If one transport block is deactivated, mapping of the transport blocks to codewords is shown in Table 11 above.

If the number of information bits in DCI format 4 belongs to one of the size set of Table 6 above, one 0-bit may be appended to DCI format 4.

1.3.2. Cyclic Redundancy Check (CRC) Attachment

In the above-described DCI transmission, error detection is provided via CRC.

Overall PDCCH payload is used to calculate CRC parity bits. The bits of the PDCCH payload may be expressed by $a_0, a_1, a_2, a_3, \ldots, a_{A-1}$ and the parity bits may be expressed by $p_0, p_1, p_2, p_3, \ldots, p_{L-1}$. Here, A denotes the size of the PDCCH payload and L denotes the number of parity bits.

A sequence attached with parity bits may be expressed by $b_0, b_1, b_2, b_3, \ldots, b_{B-1}$. Here, B is equal to A+L.

If antenna selection transmitted by a UE is neither set nor applied, after CRC attachment, CRC parity bits are scrambled with RNTIs in $x_{rnti,0}, x_{rnti,1}, \ldots, x_{rnti,15}$ in order to form a bit sequence of $c_0, c_1, c_2, c_3, \ldots, c_{B-1}$. Here, $x_{rnti,0}$ corresponds to an MSB of an RNTI. A relationship between $c_k$ and $b_k$ is shown in Equation 3.

$$c_k = b_k \text{ for } k=0,1,2,\ldots,A-1$$

$$c_k = (b_k + x_{rnti,k-A}) \bmod 2 \text{ for } k=A, A+1, A+2, \ldots, A+15 \qquad \text{Equation 3}$$

In contrast, if antenna selection transmitted by a UE is set or applied, after CRC attachment, CRC parity bits of a PDCCH with DCI format 0 are scrambled with antenna selection masks $x_{AS,0}, x_{AS,1}, \ldots, x_{AS,15}$ and RNTIs $x_{rnti,0}$, $x_{rnti,1}, \ldots, x_{rnti,15}$ in order to form a bit sequence of $c_0, c_1, c_2, c_3, \ldots, c_{B-1}$. A relationship between $c_k$ and $b_k$ is shown in Equation 4.

$$c_k = b_k \text{ for } k=0,1,2,\ldots,A-1$$

$$c_k = (b_k + x_{rnti,k-A} + x_{AS,k-A}) \bmod 2 \text{ for } k=A, A+1, A+2, \ldots, A+15 \qquad \text{Equation 4}$$

Table 21 shows UE transmit antenna selection masks.

TABLE 21

| UE transmit antenna selection | Antenna selection mask $<x_{AS,0}, x_{AS,1}, \ldots, x_{AS,15}>$ |
| --- | --- |
| UE port 0 | <0, 0, 0, 0, 0, 0, 0, 0, 0, 0, 0, 0, 0, 0, 0, 0> |
| UE port 1 | <0, 0, 0, 0, 0, 0, 0, 0, 0, 0, 0, 0, 0, 0, 0, 1> |

1.3.3. Channel Coding

Information bits are delivered to a channel coding block and the delivered information bits may be expressed by $c_0, c_1, c_2, c_3, \ldots, c_{K-1}$. Here, K denotes the number of bits and the information bits are encoded using a tail-biting convolution encoding method.

The encoded bits may be expressed by $d_0^{(i)}, d_1^{(i)}, d_2^{(i)}, d_3^{(i)}, \ldots, d_{D-1}^{(i)}$. Here, i(i=0,1, and 2) denotes the index of an encoded stream and D denotes the number of bits of the encoded stream. For example, D=K.

1.3.4. Rate Matching

A tail-biting convolution encoded block is delivered to a rate matching block and may be expressed by $d_0^{(i)}, d_1^{(i)}, d_2^{(i)}, d_3^{(i)}, \ldots, d_{D-1}^{(i)}$. Here, i(i=0,1, and 2) denotes the index of an encoded stream and D denotes the number of bits of the i-th encoded stream.

Bits subjected to rate matching may be expressed by $e_0, e_1, e_2, e_3, \ldots, e_{E-1}$ and E denotes the number of bits subjected to rate matching.

1.4. Signal Processing Procedure for Transmitting Downlink Signal

Figure 6:
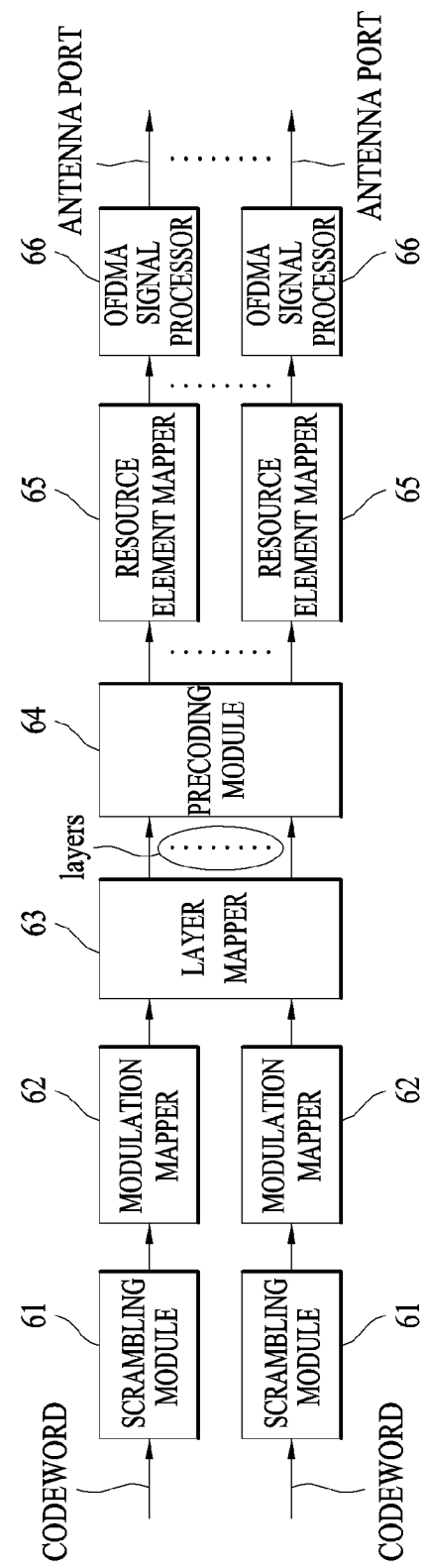
FIG. 6 is a diagram illustrating a signal processing procedure for transmitting a downlink signal at a base station (BS)

FIG. 6 is a diagram illustrating a signal processing procedure for transmitting a downlink signal at a base station (BS).

In a 3GPP LTE system, the BS may transmit one or more codewords (CWs) in downlink. The codewords may be processed into complex symbols via scrambling modules 61 and modulation mappers 62. The scrambling modules 61 may scramble transmitted signals using UE-specific scrambling signals. The scrambled signals are input to the modulation mappers 62 and are modulated into complex symbols using binary phase shift keying (BPSK), quadrature phase shift keying (QPSK) or 16QAM/64QAM (quadrature amplitude modulation). The modulated complex symbols are mapped to a plurality of layers by a layer mapper 63 and each layer may be multiplied with a precoding matrix by a precoding module 64 and allocated to each transmission antenna. The signals to be transmitted by antennas may be respectively mapped to time-frequency resource elements by resource element mappers 65 and transmitted via the antennas after passing through orthogonal frequency division multiple access (OFDMA) signal generators 66.

1.4.1. Scrambling

With respect to each codeword q, a bit block may be expressed by $b^{(q)}(0), \ldots, b^{(q)}(M_{bit}^{(q)}-1)$. Here, $M_{bit}^{(q)}$ indicates the number of bits at the codeword q transmitted via a physical channel in one subframe. As described above, the codeword is scrambled by a scrambling module before modulation as shown in Equation 5 and a block of scrambled bits may be expressed by $\tilde{b}^{(q)}(0), \ldots, \tilde{b}^{(q)}(M_{bit}^{(q)}-1)$.

$$\tilde{b}^{(q)}(i) = (b^{(q)}(i) + c^{(q)}(i)) \bmod 2 \quad \text{Equation 5}$$

where, $c^{(q)}(i)$ denotes a scrambling sequence. The scrambling sequence generator is initialized when each subframe starts and the initialized value $c_{init}$ is determined according to a transport channel type as shown in Equation 6.

$$c_{init} = \begin{cases} n_{RNTI} \cdot 2^{14} + q \cdot 2^{13} + \lfloor n_s/2 \rfloor \cdot 2^9 + N_{ID}^{cell} & \text{for PDSCH} \\ \lfloor n_s/2 \rfloor \cdot 2^9 + N_{ID}^{MBSFN} & \text{for PMCH} \end{cases} \quad \text{Equation 6}$$

In one subframe, up to two codewords may be transmitted. That is, $q \in \{0,1\}$. In the case in which a single codeword is transmitted, q is equal to 0.

1.4.2. Modulation

With respect to each codeword q, a block of scrambled bits $\tilde{b}^{(q)}(0), \ldots, \tilde{b}^{(q)}(M_{bit}^{(q)}-1)$ is modulated using one of modulation schemes according to Table 22 below by the modulation mapper. The block of the modulated complex-valued modulation symbols may be expressed by $d^{(q)}(0), \ldots, d^{(q)}(M_{symb}^{(q)}-1)$.

Table 22 shows modulation schemes.

TABLE 22

| Physical channel | Modulation schemes |
|---|---|
| PDSCH | QPSK, 16QAM, 64QAM |
| PMCH | QPSK, 16QAM, 64QAM |

1.4.2. Layer Mapping

The complex-valued modulation symbols according to each codeword are mapped to one or a plurality of layers by the layer mapper. The complex-valued modulation symbols $d^{(q)}(0), \ldots, d^{(q)}(M_{symb}^{(q)}-1)$ for the codeword q are mapped to the layer $x(i) = [x^{(0)}(i) \ldots x^{(v-1)}(i)]^T$. Here, $i = 0, 1, \ldots, M_{symb}^{layer}-1$. $M_{symb}^{layer}$ denotes the number of modulation symbols per layer and $v$ denotes the number of layers.

1.4.3.1. Layer Mapping for Transmission Via Single Antenna Port

For transmission via a single antenna port, a single layer is used ($v=1$) and layer mapping is defined as shown in Equation 7 below.

$$x^{(0)}(i) = d^{(0)}(i) \quad \text{Equation 7}$$

where, $M_{symb}^{layer} = M_{symb}^{(0)}$.

For spatial multiplexing, layer mapping is performed according to Table 23 below. Here, the number $v$ of layers is equal to or less than the number P of antenna ports used to transmit a physical channel. If the number of cell-specific reference signals is 4 or the number of UE-specific reference signals is two or more, a single codeword may be mapped to multiple layers.

Table 23 shows layer mapping of codewords for spatial multiplexing.

TABLE 23

| Number of layers | Number of codewords | Codeword-to-layer mapping $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 1 | $x^{(0)}(i) = d^{(0)}(2i)$ $x^{(1)}(i) = d^{(0)}(2i+1)$ | $M_{symb}^{layer} = M_{symb}^{(0)}/2$ |
| 2 | 2 | $x^{(0)}(i) = d^{(0)}(i)$ $x^{(1)}(i) = d^{(1)}(i)$ | $M_{symb}^{layer} = M_{symb}^{(0)} = M_{symb}^{(1)}$ |
| 3 | 1 | $x^{(0)}(i) = d^{(0)}(3i)$ $x^{(1)}(i) = d^{(0)}(3i+1)$ $x^{(2)}(i) = d^{(0)}(3i+2)$ | $M_{symb}^{layer} = M_{symb}^{(0)}/3$ |
| 3 | 2 | $x^{(0)}(i) = d^{(0)}(i)$ $x^{(1)}(i) = d^{(1)}(2i)$ $x^{(2)}(i) = d^{(1)}(2i+1)$ | $M_{symb}^{layer} = M_{symb}^{(0)} = M_{symb}^{(1)}/2$ |
| 4 | 1 | $x^{(0)}(i) = d^{(0)}(4i)$ $x^{(1)}(i) = d^{(0)}(4i+1)$ $x^{(2)}(i) = d^{(0)}(4i+2)$ $x^{(3)}(i) = d^{(0)}(4i+3)$ | $M_{symb}^{layer} = M_{symb}^{(0)}/4$ |
| 4 | 2 | $x^{(0)}(i) = d^{(0)}(2i)$ $x^{(1)}(i) = d^{(0)}(2i+1)$ $x^{(2)}(i) = d^{(1)}(2i)$ $x^{(3)}(i) = d^{(1)}(2i+1)$ | $M_{symb}^{layer} = M_{symb}^{(0)}/2 = M_{symb}^{(1)}/2$ |
| 5 | 2 | $x^{(0)}(i) = d^{(0)}(2i)$ $x^{(1)}(i) = d^{(0)}(2i+1)$ $x^{(2)}(i) = d^{(1)}(3i)$ $x^{(3)}(i) = d^{(1)}(3i+1)$ $x^{(4)}(i) = d^{(1)}(3i+2)$ | $M_{symb}^{layer} = M_{symb}^{(0)}/2 = M_{symb}^{(1)}/3$ |
| 6 | 2 | $x^{(0)}(i) = d^{(0)}(3i)$ $x^{(1)}(i) = d^{(0)}(3i+1)$ $x^{(2)}(i) = d^{(0)}(3i+2)$ $x^{(3)}(i) = d^{(1)}(3i)$ $x^{(4)}(i) = d^{(1)}(3i+1)$ $x^{(5)}(i) = d^{(1)}(3i+2)$ | $M_{symb}^{layer} = M_{symb}^{(0)}/3 = M_{symb}^{(1)}/3$ |
| 7 | 2 | $x^{(0)}(i) = d^{(0)}(3i)$ $x^{(1)}(i) = d^{(0)}(3i+1)$ $x^{(2)}(i) = d^{(0)}(3i+2)$ $x^{(3)}(i) = d^{(1)}(4i)$ $x^{(4)}(i) = d^{(1)}(4i+1)$ $x^{(5)}(i) = d^{(1)}(4i+2)$ $x^{(6)}(i) = d^{(1)}(4i+3)$ | $M_{symb}^{layer} = M_{symb}^{(0)}/3 = M_{symb}^{(1)}/4$ |
| 8 | 2 | $x^{(0)}(i) = d^{(0)}(4i)$ $x^{(1)}(i) = d^{(0)}(4i+1)$ $x^{(2)}(i) = d^{(0)}(4i+2)$ | $M_{symb}^{layer} = M_{symb}^{(0)}/4 = M_{symb}^{(1)}/4$ |

TABLE 23-continued

| Number of layers | Number of codewords | Codeword-to-layer mapping $i = 0, 1, \ldots, M_{symb}^{layer} - 1$ |
|---|---|---|
| | | $x^{(3)}(i) = d^{(0)}(4i + 3)$ |
| | | $x^{(4)}(i) = d^{(1)}(4i)$ |
| | | $x^{(5)}(i) = d^{(1)}(4i + 1)$ |
| | | $x^{(6)}(i) = d^{(1)}(4i + 2)$ |
| | | $x^{(7)}(i) = d^{(1)}(4i + 3)$ |

1.4.3.3. Layer Mapping for Transmit Diversity

For transmit diversity, layer mapping is performed according to Table 24 below. Here, only one codeword is present and the number $\upsilon$ of layers is equal to the number P of antenna ports used to transmit a physical channel.

Table 24 shows layer mapping of codewords for transmit diversity.

TABLE 24

| Number of layers | Number of codewords | Codeword-to-layer mapping $i = 0, 1, \ldots, M_{symb}^{layer} - 1$ | |
|---|---|---|---|
| 2 | 1 | $x^{(0)}(i) = d^{(0)}(2i)$ <br> $x^{(1)}(i) = d^{(0)}(2i + 1)$ | $M_{symb}^{layer} = M_{symb}^{(0)}/2$ |
| 4 | 1 | $x^{(0)}(i) = d^{(0)}(4i)$ <br> $x^{(1)}(i) = d^{(0)}(4i + 1)$ <br> $x^{(2)}(i) = d^{(0)}(4i + 2)$ <br> $x^{(3)}(i) = d^{(0)}(4i + 3)$ | $M_{symb}^{layer} = \begin{cases} M_{symb}^{(0)}/4 & \text{if } M_{symb}^{(0)} \bmod 4 = 0 \\ (M_{symb}^{(0)} + 2)/4 & \text{if } M_{symb}^{(0)} \bmod 4 \neq 0 \end{cases}$ |

If $M_{symb}^{(0)} \bmod 4 \neq 0$ two null symbols shall be appended to $d^{(0)}(M_{symb}^{(0)} - 1)$

1.4.4. Precoding

A precoding module receives a vector block $x(i)=[x^{(0)}(i) \ldots x^{(\upsilon-1)}(i)]^T$ ($i=0,1,\ldots, M_{symb}^{layer}-1$) from the layer mapper and outputs the vector block $y(i)=[\ldots y^{(p)}(i) \ldots]^T$ ($i=0,1,\ldots, M_{symb}^{ap}-1$) to be mapped to the resources of each antenna port. Here, $y^{(p)}(i)$ denotes a signal for an antenna port p.

1.4.4.1. Precoding for Transmission Via Single Antenna Port

For transmission of a single antenna port, precoding is defined as shown in Equation 8 below.

$$y^{(p)}(i) = x^{(0)}(i) \quad \text{Equation 8}$$

where, the numeral of the single antenna port used to transmit the physical channel is equal to and $p \in \{0,4,5,7,8\}$, $i=0,1,\ldots, M_{symb}^{ap}-1$ and $M_{symb}^{ap}=M_{symb}^{layer}$.

1.4.4.2. Precoding for Spatial Multiplexing Based Cell-Specific Reference Signal Precoding for spatial multiplexing based on a cell-specific reference signal is used in combination with layer mapping for spatial multiplexing described in 1.4.3.2. The spatial multiplexing based on the cell-specific reference signal supports two or four antenna ports and the set of antenna ports $p \in \{0,1\}$ or $p \in \{0,1,2,3\}$ is used.

1.4.4.2.1. Precoding in the Case in which Cyclic Delay Diversity (CDD) is not Used If CDD is not used, precoding for spatial multiplexing is defined as shown in Equation 9 below.

$$\begin{bmatrix} y^{(0)}(i) \\ \vdots \\ y^{(P-1)}(i) \end{bmatrix} = W(i) \begin{bmatrix} x^{(0)}(i) \\ \vdots \\ x^{(\upsilon-1)}(i) \end{bmatrix} \quad \text{Equation 9}$$

where, the precoding matrix $W(i)$ has a size of $P \times \upsilon$, $i=0,1,\ldots, M_{symb}^{ap}-1$ and $M_{symb}^{ap}=M_{symb}^{layer}$.

For spatial multiplexing, the value of the precoding matrix $W(i)$ is selected from among precoder elements in a codebook set by the BS and the UE. The BS may restrict precoder selection at the UE to a subset of elements in the codebook using codebook subset restriction. The codebook may be selected from Table 26 or Table 27 below.

1.4.4.2.2. Precoding Based on Cyclic Delay Diversity (CDD) Having Large Delay Precoding for spatial multiplexing based on CDD having large delay is defined as shown in Equation 10 below.

$$\begin{bmatrix} y^{(0)}(i) \\ \vdots \\ y^{(P-1)}(i) \end{bmatrix} = W(i)D(i)U \begin{bmatrix} x^{(0)}(i) \\ \vdots \\ x^{(\upsilon-1)}(i) \end{bmatrix} \quad \text{Equation 10}$$

where, the precoding matrix $W(i)$ has a size of $P \times \upsilon$, $i=0,1,\ldots, M_{symb}^{ap}-1$ and $M_{symb}^{ap}=M_{symb}^{layer}$.

A diagonal matrix $D(i)$ having a size $\upsilon \times \upsilon$ supporting CDD according to the number $\upsilon$ of layers and a matrix U having a size $\upsilon \times \upsilon$ are shown in Table 25 below.

Table 25 shows CDD having large delay.

TABLE 25

| Number of layers $\upsilon$ | U | D(i) |
|---|---|---|
| 2 | $\frac{1}{\sqrt{2}} \begin{bmatrix} 1 & 1 \\ 1 & e^{-j2\pi/2} \end{bmatrix}$ | $\begin{bmatrix} 1 & 0 \\ 0 & e^{-j2\pi i/2} \end{bmatrix}$ |
| 3 | $\frac{1}{\sqrt{3}} \begin{bmatrix} 1 & 1 & 1 \\ 1 & e^{-j2\pi/3} & e^{-j4\pi/3} \\ 1 & e^{-j4\pi/3} & e^{-j8\pi/3} \end{bmatrix}$ | $\begin{bmatrix} 1 & 0 & 0 \\ 0 & e^{-j2\pi i/3} & 0 \\ 0 & 0 & e^{-j4\pi i/3} \end{bmatrix}$ |

TABLE 25-continued

| Number of layers v | U | D(i) |
|---|---|---|
| 4 | $\frac{1}{2}\begin{bmatrix} 1 & 1 & 1 & 1 \\ 1 & e^{-j2\pi/4} & e^{-j4\pi/4} & e^{-j6\pi/4} \\ 1 & e^{-j4\pi/4} & e^{-j8\pi/4} & e^{-j12\pi/4} \\ 1 & e^{-j6\pi/4} & e^{-j12\pi/4} & e^{-j18\pi/4} \end{bmatrix}$ | $\begin{bmatrix} 1 & 0 & 0 & 0 \\ 0 & e^{-j2\pi/4} & 0 & 0 \\ 0 & 0 & e^{-j4\pi/4} & 0 \\ 0 & 0 & 0 & e^{-j6\pi/4} \end{bmatrix}$ |

The value of the precoding matrix W(i) is selected from among precoder elements in a codebook set by the BS and the UE. The BS may restrict precoder selection at the UE to a subset of elements in the codebook using codebook subset restriction. The codebook may be selected from Table 26 or Table 27 below.

In case of two antenna ports, the precoder may be selected according to $W(i)=C_1$. Here, $C_1$ defines a precoding matrix according to precoder index 0 in Table 26 below.

In case of two antenna ports, the UE may assume that the BS periodically allocates different precoders to different vectors $[x^{(0)}(i) \ldots x^{(\upsilon-1)}(i)]^T$ at a PDSCH. In different precoders, a υ vector may always be used. Here, υ denotes the number of transport layers upon spatial multiplexing. In particular, the precoder may be selected according to $W(i)=C_1$. Here, k denotes a precoder index determined as $$k = \left(\left\lfloor \frac{i}{\upsilon} \right\rfloor \bmod 4\right) + 1 \in \{1, 2, 3, 4\}$$

and $C_1$, $C_2$, $C_3$, $C_4$ denotes precoder matrices respectively corresponding to precoder indices 12, 13, 14 and 15 in Table 27 below.

1.4.4.2.3. Codebook and Channel State Information (CSI) Report for Precoding

For transmission via two antenna ports $p \in \{0,1\}$, the precoding matrix W(i) may be selected from Table 26 below or the subset of Table 26. In case of a closed-loop spatial multiplexing transmission mode, if the number of layers is υ=2 codebook index 0 is not used.

Table 26 shows a codebook for transmission via antenna ports {0,1}.

TABLE 26

| Codebook Index | Number of layers v | |
|---|---|---|
| | 1 | 2 |
| 0 | $\frac{1}{\sqrt{2}}\begin{bmatrix} 1 \\ 1 \end{bmatrix}$ | $\frac{1}{\sqrt{2}}\begin{bmatrix} 1 & 0 \\ 0 & 1 \end{bmatrix}$ |
| 1 | $\frac{1}{\sqrt{2}}\begin{bmatrix} 1 \\ -1 \end{bmatrix}$ | $\frac{1}{2}\begin{bmatrix} 1 & 1 \\ 1 & -1 \end{bmatrix}$ |
| 2 | $\frac{1}{\sqrt{2}}\begin{bmatrix} 1 \\ j \end{bmatrix}$ | $\frac{1}{2}\begin{bmatrix} 1 & 1 \\ j & -j \end{bmatrix}$ |
| 3 | $\frac{1}{\sqrt{2}}\begin{bmatrix} 1 \\ -j \end{bmatrix}$ | — |

For transmission via four antenna ports $p \in \{0,1,2,3\}$, the precoding matrix W(i) may be selected from Table 27 below or the subset of Table 27. $W_n^{\{s\}}$ denotes a matrix defined by columns decided by a set $\{s\}$ at $W_n = I - 2u_n u_n^H / u_n^H u_n$. Here, I denotes a 4×4 identity matrix and $u_n$ is determined by Table 27 below.

Table 27 shows a codebook for transmission via antenna ports {0,1,2,3}

TABLE 27

| Codebook index | $u_n$ | Number of layers v | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

A codebook for a CSI report for eight CSI reference signals is shown in Tables 28 to 35 below. Here, $\phi_n$ and $v_m$ are determined by Equation 11 below.

$$\phi_n = e^{j\pi n/2}$$

$$v_m = [1\ e^{j2\pi m/32}\ e^{j4\pi m/32}\ e^{j6\pi m/32}]^T \quad \text{Equation 11}$$

Table 28 shows a codebook for a 1-layer CSI report using antenna ports 15 to 22.

TABLE 28

| $i_1$ | $i_2$ | | | | | | | |
|---|---|---|---|---|---|---|---|---|
| | 0 | 1 | 2 | 3 | 4 | 5 | 6 | 7 |
| 0-15 | $W_{2i_1,0}^{(1)}$ | $W_{2i_1,1}^{(1)}$ | $W_{2i_1,2}^{(1)}$ | $W_{2i_1,3}^{(1)}$ | $W_{2i_1+1,0}^{(1)}$ | $W_{2i_1+1,1}^{(1)}$ | $W_{2i_1+1,2}^{(1)}$ | $W_{2i_1+1,3}^{(1)}$ |

| $i_1$ | $i_2$ | | | | | | | |
|---|---|---|---|---|---|---|---|---|
| | 8 | 9 | 10 | 11 | 12 | 13 | 14 | 15 |
| 0-15 | $W_{2i_1+2,0}^{(1)}$ | $W_{2i_1+2,1}^{(1)}$ | $W_{2i_1+2,2}^{(1)}$ | $W_{2i_1+2,3}^{(1)}$ | $W_{2i_1+3,0}^{(1)}$ | $W_{2i_1+3,1}^{(1)}$ | $W_{2i_1+3,2}^{(1)}$ | $W_{2i_1+3,3}^{(1)}$ | where $W_{m,n}^{(1)} = \frac{1}{\sqrt{8}}\begin{bmatrix} v_m \\ \varphi_n v_m \end{bmatrix}$ Table 29 shows a codebook for a 2-layer CSI report using antenna ports 15 to 22.

TABLE 29

| $i_1$ | $i_2$ | | | |
|---|---|---|---|---|
| | 0 | 1 | 2 | 3 |
| 0-15 | $W_{2i_1,2i_1,0}^{(2)}$ | $W_{2i_1,2i_1,1}^{(2)}$ | $W_{2i_1+1,2i_1+1,0}^{(2)}$ | $W_{2i_1+1,2i_1+1,1}^{(2)}$ |

| $i_1$ | $i_2$ | | | |
|---|---|---|---|---|
| | 4 | 5 | 6 | 7 |
| 0-15 | $W_{2i_1+2,2i_1+2,0}^{(2)}$ | $W_{2i_1+2,2i_1+2,1}^{(2)}$ | $W_{2i_1+3,2i_1+3,0}^{(2)}$ | $W_{2i_1+3,2i_1+3,1}^{(2)}$ |

TABLE 29-continued

| $i_1$ | $i_2$ | | | |
|---|---|---|---|---|
| | 8 | 9 | 10 | 11 |
| 0-15 | $W_{2i_1,2i_1+1,0}^{(2)}$ | $W_{2i_1,2i_1+1,1}^{(2)}$ | $W_{2i_1+1,2i_1+2,0}^{(2)}$ | $W_{2i_1+1,2i_1+2,1}^{(2)}$ |

| $i_1$ | $i_2$ | | | |
|---|---|---|---|---|
| | 12 | 13 | 14 | 15 |
| 0-15 | $W_{2i_1,2i_1+3,0}^{(2)}$ | $W_{2i_1,2i_1+3,1}^{(2)}$ | $W_{2i_1+1,2i_1+3,0}^{(2)}$ | $W_{2i_1+1,2i_1+3,1}^{(2)}$ | where $W_{m,m',n}^{(2)} = \frac{1}{4}\begin{bmatrix} v_m & v_{m'} \\ \varphi_n v_m & -\varphi_n v_{m'} \end{bmatrix}$ Table 30 shows a codebook for a 3-layer CSI report using antenna ports 15 to 22.

TABLE 30

| $i_1$ | $i_2$ | | | |
|---|---|---|---|---|
| | 0 | 1 | 2 | 3 |
| 0-3 | $W_{8i_1,8i_1,8i_1+8}^{(3)}$ | $W_{8i_1+8,8i_1,8i_1+8}^{(3)}$ | $\tilde{W}_{8i_1,8i_1+8,8i_1+8}^{(3)}$ | $\tilde{W}_{8i_1+8,8i_1,8i_1}^{(3)}$ |

| $i_1$ | $i_2$ | | | |
|---|---|---|---|---|
| | 4 | 5 | 6 | 7 |
| 0-3 | $W_{8i_1+2,8i_1+2,8i_1+10}^{(3)}$ | $W_{8i_1+10,8i_1+2,8i_1+10}^{(3)}$ | $\tilde{W}_{8i_1+2,8i_1+10,8i_1+10}^{(3)}$ | $\tilde{W}_{8i_1+10,8i_1+2,8i_1+2}^{(3)}$ |

| $i_1$ | $i_2$ | | | |
|---|---|---|---|---|
| | 8 | 9 | 10 | 11 |
| 0-3 | $W_{8i_1+4,8i_1+4,8i_1+12}^{(3)}$ | $W_{8i_1+12,8i_1+4,8i_1+12}^{(3)}$ | $\tilde{W}_{8i_1+4,8i_1+12,8i_1+12}^{(3)}$ | $\tilde{W}_{8i_1+12,8i_1+4,8i_1+4}^{(3)}$ |

| $i_1$ | $i_2$ | | | |
|---|---|---|---|---|
| | 12 | 13 | 14 | 15 |
| 0-3 | $W_{8i_1+6,8i_1+6,8i_1+14}^{(3)}$ | $W_{8i_1+14,8i_1+6,8i_1+14}^{(3)}$ | $\tilde{W}_{8i_1+6,8i_1+14,8i_1+14}^{(3)}$ | $\tilde{W}_{8i_1+14,8i_1+6,8i_1+6}^{(3)}$ | where $W_{m,m',m''}^{(3)} = \frac{1}{\sqrt{24}}\begin{bmatrix} v_m & v_{m'} & v_{m''} \\ v_m & -v_{m'} & -v_{m''} \end{bmatrix}$, $\tilde{W}_{m,m',m''}^{(3)} = \frac{1}{\sqrt{24}}\begin{bmatrix} v_m & v_{m'} & v_{m''} \\ v_m & v_{m'} & -v_{m''} \end{bmatrix}$ Table 31 shows a codebook for a 4-layer CSI report using antenna ports 15 to 22.

TABLE 31

| $i_1$ | $i_2$ | | | |
|---|---|---|---|---|
| | 0 | 1 | 2 | 3 |
| 0-3 | $W_{8i_1,8i_1+8,0}^{(4)}$ | $W_{8i_1,8i_1+8,1}^{(4)}$ | $W_{8i_1+2,8i_1+10,0}^{(4)}$ | $W_{8i_1+2,8i_1+10,1}^{(4)}$ |

| $i_1$ | $i_2$ | | | |
|---|---|---|---|---|
| | 4 | 5 | 6 | 7 |
| 0-3 | $W_{8i_1+4,8i_1+12,0}^{(4)}$ | $W_{8i_1+4,8i_1+12,1}^{(4)}$ | $W_{8i_1+6,8i_1+14,0}^{(4)}$ | $W_{8i_1+6,8i_1+14,1}^{(4)}$ | where $W_{m,m',n}^{(4)} = \frac{1}{\sqrt{32}} \begin{bmatrix} v_m & v_{m'} & v_m & v_{m'} \\ \varphi_n v_m & \varphi_n v_{m'} & -\varphi_n v_m & -\varphi_n v_{m'} \end{bmatrix}$ Table 32 shows a codebook for a 5-layer CSI report using antenna ports 15 to 22.

TABLE 32

| $i_1$ | $i_2$ |
|---|---|
| | 0 |
| 0-3 | $W_{i_1}^{(5)} = \frac{1}{\sqrt{40}} \begin{bmatrix} v_{2i_1} & v_{2i_1} & v_{2i_1+8} & v_{2i_1+8} & v_{2i_1+16} \\ v_{2i_1} & -v_{2i_1} & v_{2i_1+8} & -v_{2i_1+8} & v_{2i_1+16} \end{bmatrix}$ |

Table 33 shows a codebook for a 6-layer CSI report using antenna ports 15 to 22.

TABLE 33

| $i_1$ | $i_2$ |
|---|---|
| | 0 |
| 0-3 | $W_{i_1}^{(6)} = \frac{1}{\sqrt{48}} \begin{bmatrix} v_{2i_1} & v_{2i_1} & v_{2i_1+8} & v_{2i_1+8} & v_{2i_1+16} & v_{2i_1+16} \\ v_{2i_1} & -v_{2i_1} & v_{2i_1+8} & -v_{2i_1+8} & v_{2i_1+16} & -v_{2i_1+16} \end{bmatrix}$ |

Table 34 shows a codebook for a 7-layer CSI report using antenna ports 15 to 22.

TABLE 34

| $i_1$ | $i_2$ |
|---|---|
| | 0 |
| 0-3 | $W_{i_1}^{(7)} = \frac{1}{\sqrt{56}} \begin{bmatrix} v_{2i_1} & v_{2i_1} & v_{2i_1+8} & v_{2i_1+8} & v_{2i_1+16} & v_{2i_1+16} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} \end{bmatrix}$ |

Table 35 shows a codebook for an 8-layer CSI report using antenna ports 15 to 22.

TABLE 35

| $i_1$ | $i_2$ |
|---|---|
| | 0 |
| 0 | $W_{i_1}^{(8)} = \frac{1}{8} \begin{bmatrix} v_{2i_1} & v_{2i_1} & v_{2i_1+8} & v_{2i_1+8} & v_{2i_1+16} & v_{2i_1+16} & v_{2i_1+24} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} & -v_{2i_1+24} \end{bmatrix}$ |

1.4.4.3. Precoding Transmit Diversity

Precoding for transmit diversity is used in combination with layer mapping for transmit diversity described in 1.4.3.3. A precoding operation for transmit diversity is divided into the case of using two antenna ports and the case of using four antenna ports.

For transmission via two antenna ports $p \in \{0,1\}$, an output $y(i) = [\ldots y^{(p)}(i) \ldots]^T$ ($i = 0, 1, \ldots, M_{symb}^{ap} - 1$) according to the precoding operation is shown in Equation 12 below.

$$\begin{bmatrix} y^{(0)}(2i) \\ y^{(1)}(2i) \\ y^{(0)}(2i+1) \\ y^{(1)}(2i+1) \end{bmatrix} = \frac{1}{\sqrt{2}} \begin{bmatrix} 1 & 0 & j & 0 \\ 0 & -1 & 0 & j \\ 0 & 1 & 0 & j \\ 1 & 0 & -j & 0 \end{bmatrix} \begin{bmatrix} \text{Re}(x^{(0)}(i)) \\ \text{Re}(x^{(1)}(i)) \\ \text{Im}(x^{(0)}(i)) \\ \text{Im}(x^{(1)}(i)) \end{bmatrix} \quad \text{Equation 12}$$

where, $i = 0, 1, \ldots, M_{symb}^{layer} - 1$ and $M_{symb}^{ap} = 2M_{symb}^{layer}$.

For transmission via four antenna ports $p \in \{0,1,2,3\}$, and output $y(i) = [\ldots y^{(p)}(i) \ldots]^T$ ($i = 0, 1, \ldots, M_{symb}^{ap} - 1$) according to a precoding operation is shown in Equation 13 below.

$$\begin{bmatrix} y^{(0)}(4i) \\ y^{(1)}(4i) \\ y^{(2)}(4i) \\ y^{(3)}(4i) \\ y^{(0)}(4i+1) \\ y^{(1)}(4i+1) \\ y^{(2)}(4i+1) \\ y^{(3)}(4i+1) \\ y^{(0)}(4i+2) \\ y^{(1)}(4i+2) \\ y^{(2)}(4i+2) \\ y^{(3)}(4i+2) \\ y^{(0)}(4i+3) \\ y^{(1)}(4i+3) \\ y^{(2)}(4i+3) \\ y^{(3)}(4i+3) \end{bmatrix} =$$

Equation 13

$$\frac{1}{\sqrt{2}} \begin{bmatrix} 1 & 0 & 0 & 0 & j & 0 & 0 & 0 \\ 0 & 0 & 0 & 0 & 0 & 0 & 0 & 0 \\ 0 & -1 & 0 & 0 & 0 & j & 0 & 0 \\ 0 & 0 & 0 & 0 & 0 & 0 & 0 & 0 \\ 0 & 1 & 0 & 0 & 0 & j & 0 & 0 \\ 1 & 0 & 0 & 0 & -j & 0 & 0 & 0 \\ 1 & 0 & 0 & 0 & -j & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 1 & 0 & 0 & 0 & j & 0 \\ 0 & 0 & 0 & 0 & 0 & 0 & 0 & 0 \\ 0 & 0 & 0 & -1 & 0 & 0 & 0 & j \\ 0 & 0 & 0 & 0 & 0 & 0 & 0 & 0 \\ 0 & 0 & 0 & 1 & 0 & 0 & 0 & j \\ 0 & 0 & 0 & 0 & 0 & 0 & 0 & 0 \\ 0 & 0 & 1 & 0 & 0 & 0 & -j & 0 \end{bmatrix} \begin{bmatrix} \mathrm{Re}(x^{(0)}(i)) \\ \mathrm{Re}(x^{(1)}(i)) \\ \mathrm{Re}(x^{(2)}(i)) \\ \mathrm{Re}(x^{(3)}(i)) \\ \mathrm{Im}(x^{(0)}(i)) \\ \mathrm{Im}(x^{(1)}(i)) \\ \mathrm{Im}(x^{(2)}(i)) \\ \mathrm{Im}(x^{(3)}(i)) \end{bmatrix}$$

where, $i = 0, 1, \ldots, M_{symb}^{layer} - 1$ and $$M_{symb}^{ap} = \begin{cases} 4 M_{symb}^{layer} & \text{if } M_{symb}^{(0)} \bmod 4 = 0 \\ (4 M_{symb}^{layer}) - 2 & \text{if } M_{symb}^{(0)} \bmod 4 \neq 0. \end{cases}$$

1.4.4.4. Precoding for Spatial Multiplexing Based on UE-Specific Reference Signal Precoding for spatial multiplexing based on a UE-specific reference signal is used in combination with layer mapping for spatial multiplexing described in 1.4.3.2. Spatial multiplexing for the UE-specific reference signal supports up to eight antenna ports and the set of antenna ports p=7,8, . . . , υ+6 is used.

For transmission via antenna ports υ, a precoding operation is shown in Equation 14 below.

$$\begin{bmatrix} y^{(7)}(i) \\ y^{(8)}(i) \\ \vdots \\ y^{(6+v)}(i) \end{bmatrix} = \begin{bmatrix} x^{(0)}(i) \\ x^{(1)}(i) \\ \vdots \\ x^{(v-1)}(i) \end{bmatrix}$$

Equation 14 where, i=0,1, . . . , $M_{symb}^{ap}$−1 and $M_{symb}^{ap}=M_{symb}^{layer}$.

1.4.5. Mapping to Resource Elements

For antenna ports used to transmit the physical channel, complex symbol blocks $y^{(p)}(0)$, . . . , $y^{(p)}$ ($M_{symb}^{ap}$−1) is mapped to a sequence starting from $y^{(p)}(0)$ in resource element (k, l) satisfying the following criteria. That is, they are physical resource blocks according to virtual resource blocks allocated for transmission, physical resources which are not used to transmit physical broadcast channels (PBCHs), synchronization signals, cell-specific reference signals, multicast broadcast single frequency network (MB-SFN) reference signals or UE-specific reference signals, or physical resources which are not used to transmit DCI and CSI reference signals related to downlink transmission using C-RNTI or semi-persistent C-RNTI, and an index l at a first slot of a subframe should satisfy l≥$l_{DataStart}$.

If transmit diversity of 1.4.4.2 is used, resource elements in OFDM symbols including CSI-RSs may be used for mapping only when the following criteria are satisfied.

An even number of resource elements for OFDM symbols in each resource block for transmission should be present and a plurality of symbols $y^{(p)}(i)$ and $y^{(p)}(i+1)$ (i is an even number) should be mapped to resource elements (k, l) and (k+n, l) within the same OFDM symbol with n<3.

Mapping to the resource element (k, l) on the antenna port P which is not reserved for another purpose is performed starting from a first slot of a subframe in ascending order of the index k allocated to the physical resource block and then is performed in ascending order of the index l.

2. Carrier Aggregation Environment 2.1. General Carrier Aggregation

Communication environments considered in the embodiment of the present invention include all multi-carrier supporting environments. That is, a multi-carrier system or carrier aggregation (CA) system used in the present invention refers to a system for aggregating and utilizing one or more component carriers with bandwidth less than a target bandwidth when configuring the wide target bandwidth.

In the present invention, multi-carrier means carrier aggregation. At this time, carrier aggregation means contiguous carrier aggregation or non-contiguous carrier aggregation. In addition, the number of aggregated component carriers may be changed according to downlink and uplink. The case in which the number of downlink component carriers (DL CCs) and the number of uplink component carriers (UL CCs) are the same is referred to as symmetric aggregation and the case in which the number of downlink component carriers (DL CCs) and the number of uplink component carriers (UL CCs) are different is referred to as asymmetric aggregation. Such carrier aggregation may be used interchangeably with bandwidth aggregation or spectrum aggregation.

Carrier aggregation composed of two or more component carriers aims at supporting a bandwidth of 100 MHz in an LTE-A system. When one or more carriers with bandwidth less than a target bandwidth are aggregated, the bandwidths of the aggregated carriers may be restricted to the bandwidth used in an existing system for backward compatibility with an existing IMT system. For example, an existing 3GPP LTE system supports bandwidth of {1.4, 3, 5, 10, 15, 20} and a 3GPP LTE-advanced system (that is, LTE-A) supports bandwidth greater than 20 MHz using the above-described bandwidths, for backward compatibility with the existing system. In addition, the CA system used in the present invention may define new bandwidth to support CA regardless of the bandwidth used in an existing system.

The LTE-A system uses the concept of a cell in order to manage radio resources. The above-described CA environment may be referred to as a multi-cell environment. The cell is defined as a combination of downlink resources (DL CC) and uplink resources (UL CC) but the uplink resource are not mandatory. Accordingly, the cell may be composed of downlink resources alone or downlink resources and uplink resources. If a specific UE has only one configured serving cell, one DL CC and one UL CC may be used. However, if a specific UE has two or more configured serving cells, the number of DL CCs may be equal to the number of cells and the number of UL CCs may be equal to or less than the number of DL CCs, and vice versa. That is, if a specific UE has a plurality of configured serving cells, a CA environment in which the number UL CCs is greater than the number of DL CCs may be supported. That is, CA may be understood as an aggregate of two or more cells having different carrier frequencies (center frequencies of the cell). Here, the term cell used herein is distinguished from the term "cell" generally used as an area covered by a BS.

The cell used in the LTE-A system includes a primary cell (PCell) and a secondary cell (SCell). The PCell and the SCell may be used as a serving cell. In case of a UE which is in an RRC_CONNECTED state but in which CA is not configured or CA is not supported, only one serving cell including only a PCell is present. In contrast, in case of a UE which is in an RRC_CONNECTED state and in which CA is configured, one or more serving cells are present and all serving cells include the PCell and one or more SCell.

The serving cell (PCell and SCell) may be configured via RRC parameters. PhysCellID is a physical layer identifier of a cell and has an integer value from 0 to 503. ScellIndex is a short identifier used to identify the SCell and has an integer value from 1 to 7. A value of 0 is applied to the PCell and ScellIndex is applied to the SCell in advance. That is, a cell having a smallest cell ID (or cell index) in ServCellIndex becomes a PCell.

The PCell means a cell which operates on a primary frequency (or a primary CC). The PCell may be used to perform an initial connection establishment process or a connection re-establishment process at the UE or may be a cell indicated in a handover process. In addition, the PCell refers to a cell which becomes a center of control related communication among the serving cells configured in the CA environment. That is, the UE may be allocated a PUCCH from only the PCell thereof to perform transmission and may utilize only the PCell to acquire system information or to change a monitoring procedure. An evolved UMTS terrestrial radio access network (E-UTRAN) may change only the PCell for a handover procedure using an RRCConnectionreConfiguration message of a higher layer including mobilityControlInfo with respect to a UE supporting a CA environment.

The SCell means a cell which operates on a secondary frequency (or a secondary CC). Only one PCell may be allocated and one or more Scells may be allocated to a specific UE. The SCell may be configured after RRC connection configuration and used to provide additional radio resources. Among the serving cells configured in the CA environments, a PUCCH is not present in cells other than the PCell, that is, the Scells. The E-UTRAN may provide all system information related to the operation of the cell in the RRC_CONNECTED state via a dedicated signal when the SCell is added to the UE supporting the CA environment. Change in system information may be controlled by release and addition of the related SCell. At this time, an RRCConnectionReconfiguration message of a higher layer may be used. In the E-UTRAN, broadcast is not performed within the related SCell and dedicated signaling having parameters changed according to UEs may be performed.

After an initial security activation process starts, the E-UTRAN may add an initially configured PCell in a connection configuration process to configure a network including one or more Scells. In the CA environment, the PCell and the SCell may operate as respective component carriers. In the following embodiments, a primary component carrier (PCC) may have the same meaning as the PCell and a secondary component carrier (SCC) may have the same meaning as the SCell.

Figure 7:
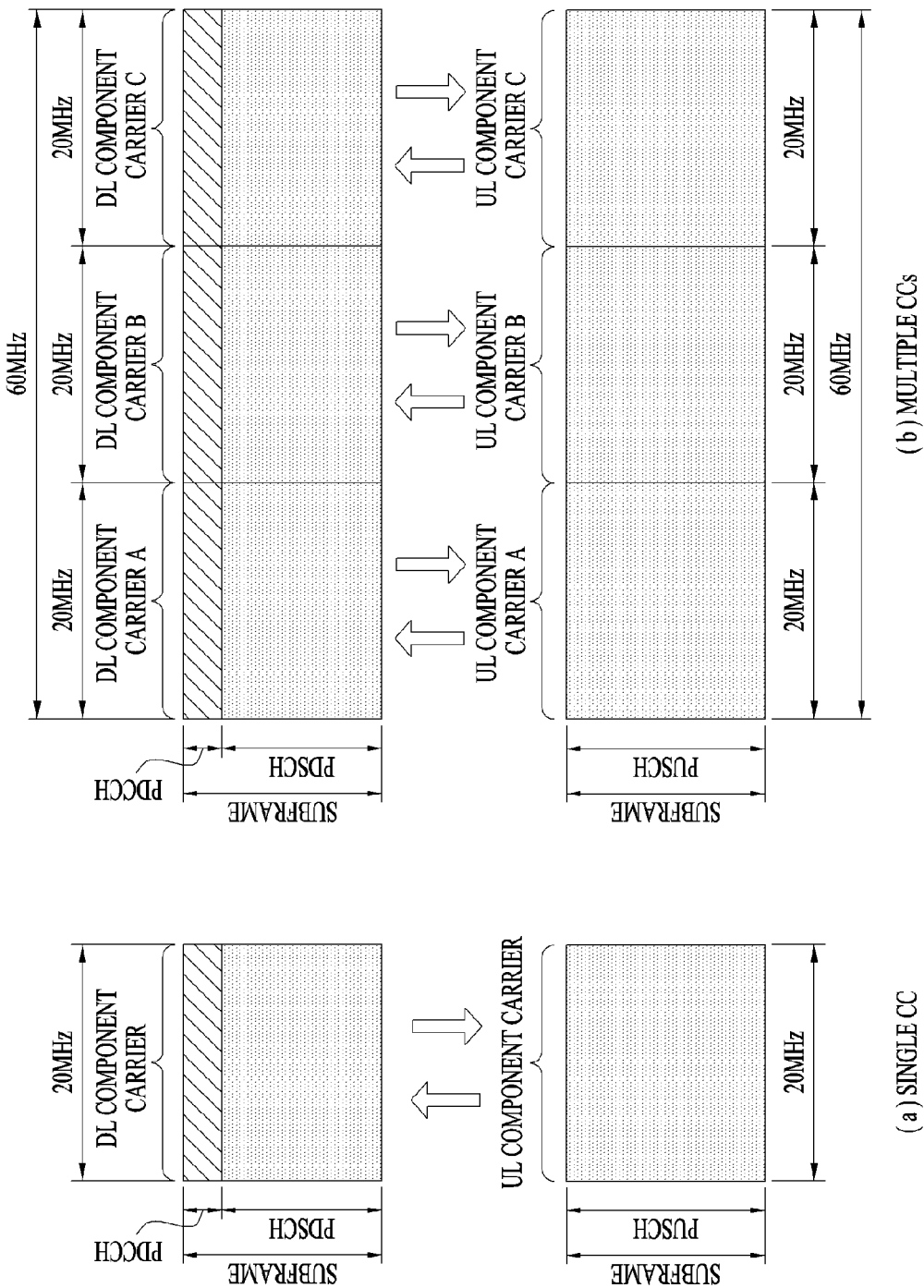
FIG. 7 is a diagram showing an example of a component carrier (CC) of an LTE system and carrier aggregation (CA) used in an LTE-A system.

FIG. 7 is a diagram showing an example of a component carrier (CC) of an LTE system and carrier aggregation (CA) used in an LTE-A system.

FIG. 7(a) shows a single carrier structure used in the LTE system. The component carrier includes a DL CC and a UL CC. One component carrier may have a frequency range of 20 MHz.

FIG. 7(b) shows a CA structure used in the LTE_A system. In case of FIG. 7(b), three component carriers each having a frequency size of 20 MHz are aggregated.

Although three DL CCs and three UL CCs are included, the number of DL CCs and ULCCs are not limited. In case of CA, the UE may simultaneously monitor the three CCs, receive downlink signals/data and transmit uplink signals/data.

If N DL CCs are managed in a specific cell, the network may allocate M (M≤N) DL CCs to the UE. At this time, the UE may monitor only a restricted number (M) of DL CCs and receive a DL signal. In addition, the network may assign priority to L (L≤M≤N) DL CCs to allocate DL CCs to the UE. In this case, the UE should necessarily monitor the L DL CCs. This method may be equally applied to uplink transmission.

Linkage between a carrier frequency (or DL CC) of downlink resources and carrier frequency (or UL CC) of uplink resources may be indicated by a higher layer message such as an RRC message or system information. For example, a combination of DL resources and UL resources may be configured by linkage defined by system information block type 2 (SIB2). More specifically, linkage may mean a mapping relationship between DL CCs, via which a PDCCH carrying UL grant is transmitted, and UL CCs using the UL grant or a mapping relationship between a DL CC (or UL CC), in which data for HARQ is transmitted, and a UL CC (or DL CC), via which a HARQ ACK/NACK signal is transmitted.

2.2. Cross Carrier Scheduling

In a CA system, there are two methods, that is, a self-scheduling method and a cross carrier scheduling method, in terms of scheduling a carrier or a serving cell. Cross carrier scheduling may be referred to as cross component carrier scheduling or cross cell scheduling.

Self-scheduling means that a PDCCH (DL grant) and a PDSCH are transmitted via the same DL CC or a PUSCH transmitted by a PDCCH (UL grant) transmitted via a DL CC is transmitted via a UL CC linked with the DL CC via which the UL grant is received.

Cross carrier scheduling means that a PDCCH (DL grant) and a PDSCH are transmitted via different DL CCs or a PUSCH transmitted by a PDCCH (UL grant) transmitted via a DL CC is transmitted via a UL CC other than a UL CC linked with the DL CC via which the UL grant is received.

Cross carrier scheduling may be activated or deactivated in a UE-specific manner and may be semi-statically signaled to each UE via higher layer signaling (e.g., RRC signaling).

If cross carrier scheduling is activated, a carrier indicator field (CIF) indicating via which DL/UL CC a PDSCH/PUSCH indicated by a PDCCH is transmitted is necessary in the PDCCH. For example, the PDCCH may allocate PDSCH resources or PUSCH resources to one of a plurality of component carriers using the CIF. That is, if the PDCCH on the DL CC allocates PDSCH or PUSCH resources to one of multiple aggregated DL/UL CCs, the CIF is set. In this case, the DCI format of LTE-A Release-8 may be extended according to the CIF. At this time, the set CIF may be fixed to a 3-bit field or the location of the set CIF may be fixed regardless of the DCI format size. In addition, the PDCCH structure (resource mapping based on the same coding and the same CCE) of LTE-A Release-8 may be reused.

In contrast, if the PDCCH on the DL CC allocates PDSCH resources on the same DL CC or PUSCH resources on a single linked UL CC, the CIF is not set. In this case, the same PDCCH structure (resource mapping based on the same coding and the same CCE) and DCI format as LTE-A Release-8 may be used.

When cross carrier scheduling is possible, the UE needs to monitor the PDCCH for a plurality of pieces of DCI in a control region of a monitoring CC according to a per-CC transmission mode and/or bandwidth. Accordingly, there is a need for PDCCH monitoring and a configuration of a search space supporting the same.

In the CA system, a UE DL CC set indicates a set of DL CCs scheduled to enable the UE to receive a PDSCH and a UE UL CC set indicates a set of UL CCs scheduled to enable the UE to transmit a PUSCH. In addition, a PDCCH monitoring set indicates a set of at least one DL CC for performing PDCCH monitoring. The PDCCH monitoring set may be a UE DL CC set or a subset of a UE DL CC set. The PDCCH monitoring set may include at least one DL CC in the UE DL CC set. Alternatively, the PDCCH monitoring set may be defined independently of the UE DL CC set. The DL CCs included in the PDCCH monitoring set may be set to always perform self-scheduling of linked UL CCs. The UE DL CC set, the UE UL CC set and the PDCCH monitoring set may be set in a UE-specific, UE group-specific or cell-specific manner.

If cross carrier scheduling is deactivated, this means that the PDCCH monitoring set is always equal to the UE DL CC. In this case, an indication such as separate signaling of the PDCCH monitoring set is not necessary. However, if cross carrier scheduling is activated, the PDCCH monitoring set is preferably defined within the UE DL CC set. That is, the BS transmits a PDCCH only via a PDCCH monitoring set in order to schedule a PDSCH or a PUSCH with respect to the UE.

Figure 8:
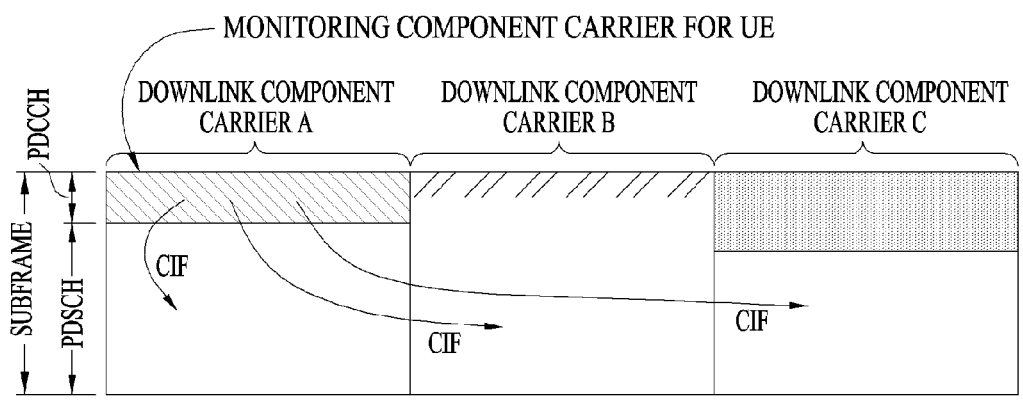
FIG. 8 is a diagram showing the structure of a subframe of an LTE-A system according to cross carrier scheduling.

FIG. 8 is a diagram showing the structure of a subframe of an LTE-A system according to cross carrier scheduling.

Referring to FIG. 8, a DL subframe for an LTE-A UE includes an aggregate of three DL CCs and DL CC "A" is set as a PDCCH monitoring DL CC. If the CIF is not used, each DL CC may transmit a PDCCH scheduling a PDSCH thereof. In contrast, if the CIF is used via higher layer signaling, only one DL CC "A" may transmit a PDCCH scheduling a PDSCH thereof or a PDSCH of another CC using the CIF. At this time, DL CCs "B" and "C" which are not set as the PDCCH monitoring DL CC do not transmit the PDCCH.

3. General Uplink/Downlink Scheduling in TDD System 3.1. Uplink-Downlink Configuration in TDD System In frame structure type 2, an uplink-downlink configuration indicates by which rule all subframes are allocated (reserved) in uplink and downlink. Table 36 shows the uplink-downlink configuration.

TABLE 36

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 36, in each subframe of a radio frame, "D" indicates a subframe for downlink transmission, "U" indicates a subframe for uplink transmission, "S" indicates a special subframe including three fields, that is, DwPTS, GP and UpPTS. The uplink-downlink configuration may be divided into seven types and the locations or number of downlink subframes, special frames and uplink subframes may be changed according to configuration.

A point at which downlink is switched to uplink or a point at which uplink is switched to downlink is referred to as a switching point. Switch-point periodicity means periodicity with which switching of an uplink subframe and a downlink subframe is equally repeated and may be 5 ms or 10 ms. If the downlink-uplink switch-point periodicity is 5 ms, the special subframe S is present in every half frame and, if the downlink-uplink switch-point periodicity is 5 ms, the special subframe is present only in a first half-frame.

In all configurations, $0^{th}$ and $5^{th}$ subframes and DwPTS are used only for downlink transmission. A subframe subsequent to UpPTS and the special subframe is always used for uplink transmission.

Such an uplink-downlink configuration is system information, which is known to both the BS and the UE. The BS may transmit only the index of the configuration information whenever the uplink-downlink configuration information is changed, thereby notifying the UE of change in uplink-downlink allocation state of the radio frame. In addition, the configuration information may be transmitted as downlink control information via a physical downlink control channel (HDCCH), which is a downlink control channel, similarly to other scheduling information or may be transmitted to all UE in the cell via a broadcast channel as broadcast information. In the TDD system, the number of half frames included in the radio frame, the number of subframes included in the half frame, and a combination of downlink subframes and uplink subframes are only exemplary.

3.2. Uplink/Downlink Scheduling in TDD System

Since downlink/uplink subframe configurations in a TDD system differ between uplink-downlink configurations, a PUSCH and PHICH transmission time are differently set according to the configuration and a PUSCH and PHICH transmission time may be differently configured according to the index (number) of the subframe.

In an LTE system, an uplink/downlink timing relationship among a PUSCH, a preceding PDCCH thereof and a PHICH, via which downlink HARQ ACK/NACK corresponding to the PUSCH is transmitted, is determined in advance.

Table 37 shows a transmission timing relationship between a PUSCH and a PHICH corresponding thereto according to the uplink-downlink configuration.

TABLE 37

| TDD UL/DL Configuration | \multicolumn{10}{c}{subframe number i} |
|---|---|---|---|---|---|---|---|---|---|---|
| | 0 | 1 | 2 | 3 | 4 | 5 | 6 | 7 | 8 | 9 |
| 0 | | 7 | 4 | | | | 7 | 4 | | |
| 1 | | | 4 | | | 6 | | | 4 | 6 |
| 2 | | | 6 | | | | | 6 | | |
| 3 | 6 | | | | | | | 6 | 6 | |
| 4 | | | | | | | | 6 | 6 | |
| 5 | | | | | | | 6 | | | |
| 6 | 6 | 4 | | | | 7 | 4 | | | 6 |

In case of uplink-downlink configurations 1 to 6 or in the case in which an uplink-downlink configuration is 0 and $I_{PHICH}=0$, if the UE receives a PHICH for transmitting HARQ-ACK from the BS in a subframe i, the PHICH corresponds to the PUSCH transmitted by the UE in a subframe i-k. In contrast, in the case in which an uplink-downlink configuration is 0 and $I_{PHICH}=1$, if the UE receives a PHICH for transmitting HARQ-ACK from the BS in a subframe i, the PHICH corresponds to the PUSCH transmitted by the UE in a subframe i-6.

After the UE transmits a transport block via a PUSCH subframe corresponding to a downlink subframe i, if a PHICH corresponding to the transport block is received at a downlink subframe i to decode ACK or if the transport block is disabled by the PDCCH transmitted in the downlink subframe i, the UE delivers ACK for the transport block to a higher layer. Otherwise, the UE delivers NACK for the transport block to a higher layer.

From the viewpoint of the UE, ACK/NACK response (or PHICH) to uplink transmission via the PUSCH of the UE is transmitted from the BS in an (n+k)-th downlink subframe corresponding thereto according to the uplink subframe index. In case of subframe bundling, the PHICH corresponds to a last subframe of the bundle. The UE predicts that the PHICH response to the PUSCH will be transmitted from the BS in the (n+k)-th downlink subframe and searches for/detects/demodulates the PHICH. At this time, the value k is shown in Table 38.

Table 38 shows a transmission timing relationship between the PUSCH and the PHICH corresponding thereto according to the uplink-downlink configuration.

TABLE 38

| TDD UL/DL Configuration | \multicolumn{10}{c}{subframe index n} |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

PHICH resources are identified by an index pair such as $(n_{PHICH}^{group}, n_{PHICH}^{seq})$. $n_{PHICH}^{group}$ denotes a PHICH group number and $n_{PHICH}^{seq}$ denotes an orthogonal sequence index in the PHICH group. $n_{PHICH}^{group}$ and $n_{PHICH}^{seq}$ may be obtained by Equation 15.

$$n_{PHICH}^{group} = (I_{PRB\_RA} + n_{DMRS}) \bmod N_{PHICH}^{group} + I_{PHICH} N_{PHICH}^{group}$$

$$n_{PHICH}^{seq} = (\lfloor I_{PRB\_RA} / N_{PHICH}^{group} \rfloor + n_{DMRS}) \bmod 2N_{SF}^{PHICH}$$

Equation 15 where, $n_{DMRS}$ is mapped from cyclic shift for a demodulation reference signal (DMRS) field in a most recent PDCCH with an uplink DCI format for a transport block related to corresponding PUSCH transmission. In contrast, if a PDCCH with an uplink DCI format for the same transport block is not present, an initial PUSCH for the same transport block is scheduled semi-persistently or by a random access response grant signal, $n_{DMRS}$ is set to 0.

$N_{SF}^{PHICH}$ denotes the level of a spreading factor used for PHICH modulation.

$I_{PRB\_RA}$ is equal to $I_{PRB\_RA}^{lowest\_index}$ in case of a first transport block of a PUSCH related to a PDCCH or if the number of manually recognized transport blocks is not equal to the number of transport blocks indicated at a most recent PDCCH related to the PUSCH when no PDCCH related thereto is present. In contrast, $I_{PRB\_RA}$ is equal to $I_{PRB\_RA}^{lowest\_index}+1$ in case of a second transport block of a PUSCH related to a PDCCH. Here, $I_{PRB\_RA}^{lowest\_index}$ corresponds to a lowest PRB index of a first slot of corresponding PUSCH transmission.

$N_{PHICH}^{group}$ denotes the number of a PHICH group configured by a higher layer.

$I_{PHICH}$ has a value of 1 if a PUSCH is transmitted in a subframe index 4 or 9 in the uplink-downlink configuration 0 of the TDD system and otherwise has a value of 0.

Table 39 shows a mapping relationship between cyclic shift for a DMRS field used to determine PHICH resources in the PDCCH with an uplink DCI format and $n_{DMRS}$.

TABLE 39

| Cyclic Shift for DMRS Field in PDCCH with uplink DCI format | $n_{DMRS}$ |
|---|---|
| 000 | 0 |
| 001 | 1 |
| 010 | 2 |
| 011 | 3 |
| 100 | 4 |
| 101 | 5 |
| 110 | 6 |
| 111 | 7 |

4. Downlink Control Information Transmission Method

In order to reduce inter-BS interference, in an LTE/LTE-A system, an almost blank subframe (ABS) for reducing interference of a data channel (PDSCH) may be allocated to enable a victim cell to receive a signal without interference.

In addition to such a method, frequency regions allocated to UEs located at cell edge may be orthogonally allocated using inter-BS scheduling information.

Figure 9:
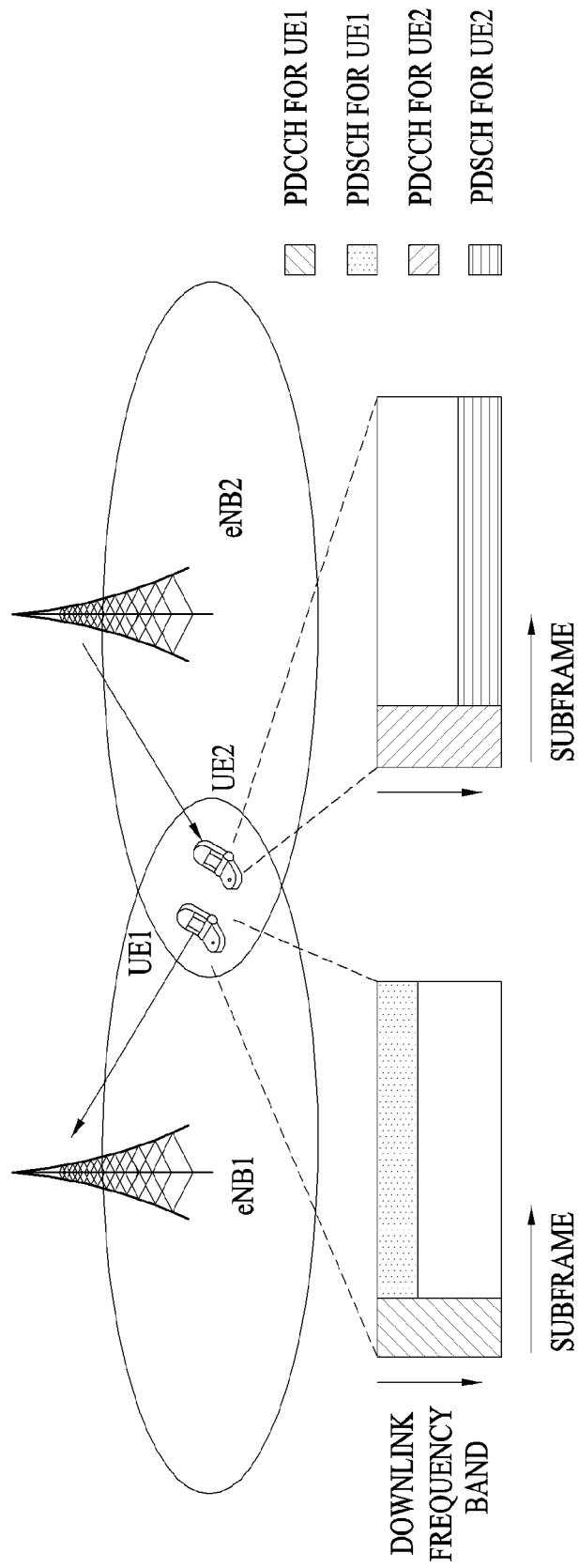
FIG. 9 is a diagram showing a method of exchanging scheduling information between eNBs to reduce interference.

FIG. 9 is a diagram showing a method of exchanging scheduling information between BS s to reduce interference.

Referring to FIG. 9, a BS 1 (eNB 1) transmits a PDCCH and a PDSCH to a UE 1 and a BS 2 (eNB 2) transmits a PDCCH and a PDSCH to a UE 2. At this time, the eNB 1 and the eNB2 may exchange scheduling information such that the eNB 1 and the eNB2 allocate PDSCHs to the UEs 1 and 2 located at the cell edge in the orthogonal frequency region, thereby reducing interference. However, since the PDCCHs for the UEs 1 and 2 are transmitted using the entire downlink frequency bandwidth, interference may not be reduced even using the method of exchanging the scheduling information between eNBs.

In addition, even when eNBs have different uplink-downlink configurations, interference may occur.

A HARQ processing time may differ between an FDD system and a TDD system. In case of the FDD system, when a UE receives a PDSCH in an (n−4)-th subframe, ACK/NACK is transmitted in an n-th subframe. However, in the case of the TDD system, when a UE receives a PDSCH in an (n−k)-th subframe, ACK/NACK is transmitted in an n-th subframe. At this time, the value k is changed according to the uplink-downlink configuration as shown in Table 40 below.

Table 40 shows a transmission timing relationship between a PDSCH and ACK corresponding thereto according to the uplink-downlink configuration.

TABLE 40

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Figure 10:
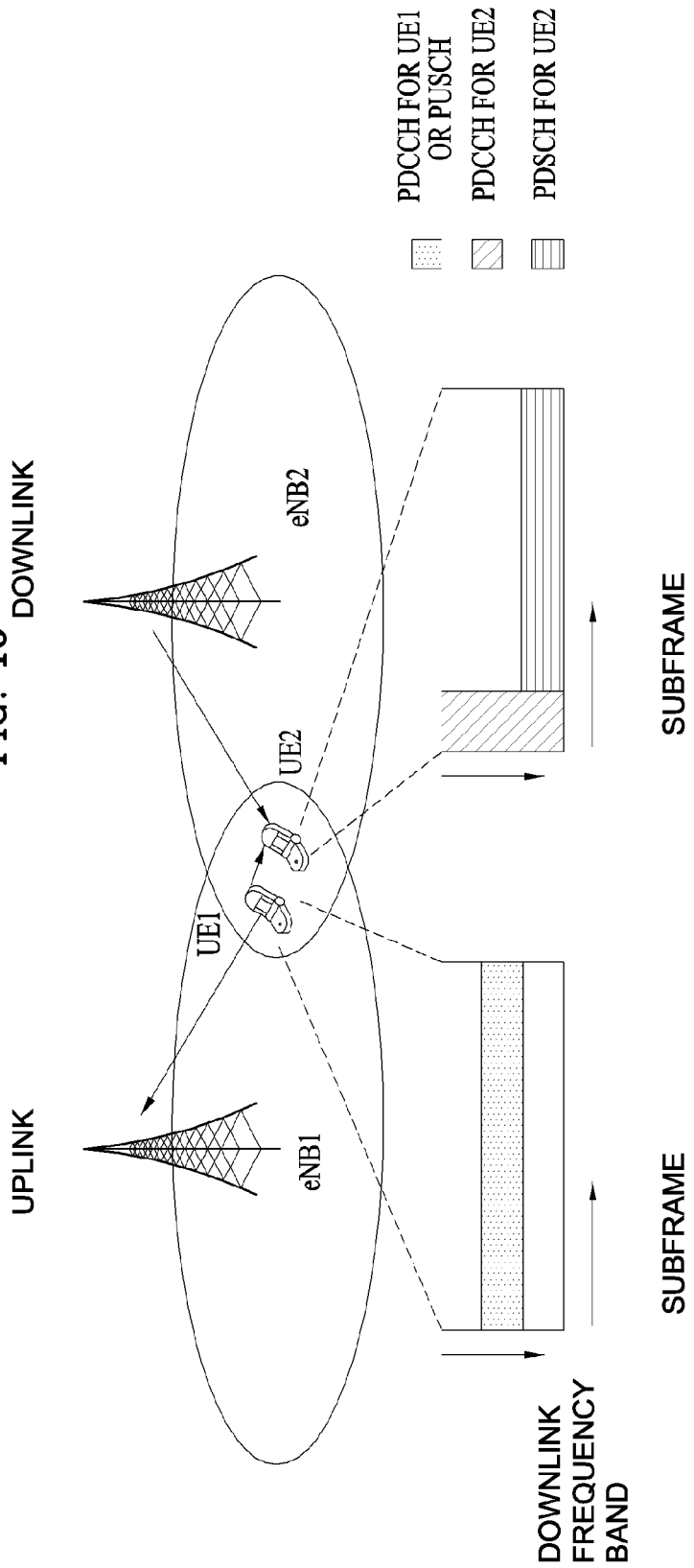
FIG. 10 is a diagram showing a method of exchanging scheduling information between BSs to reduce interference if downlink-uplink configurations differ between eNBs.

FIG. 10 is a diagram showing a method of exchanging scheduling information between eNBs to reduce interference if downlink-uplink configurations differ between eNBs.

Referring to FIG. 10, the eNB 1 receives a PUCCH or a PUSCH from the UE 1 and the eNB 2 transmits a PDCCH and a PDSCH to the UE 2. At this time, the PUSCH or PUSCH transmitted by the UE 1 may interfere with the PDCCH and the PDSCH received by the adjacent UE 2. Even in this case, if scheduling information is exchanged between the eNBs 1 and 2, interference applied to the PDSCH transmitted to the UE 2 may be reduced by allocating the UEs 1 and 2 to an orthogonal frequency region. That is, the PUCCH or PUSCH transmitted from the UE 1 to the eNB and the PDSCH transmitted from the eNB 2 to the UE may be allocated to the orthogonal frequency region, thereby reducing interference. However, as described above, since the PDCCH transmitted to the UE 2 is transmitted using the entire downlink frequency bandwidth, the PDCCH is influenced by interference with the PUCCH or PUSCH transmitted by the UE 1.

Since the control channel (PDCCH, PCFICH or PHICH) may be transmitted in all subframes and are allocated to the entire downlink frequency bandwidth, it is difficult to avoid interference. Accordingly, there is a need for technology for reducing or avoiding interference of the control channel.

In the present patent, in order to solve the above-described problem, a fast detectable enhanced PDCCH (FD-ePDCCH) transmission method is proposed. The FD-ePDCCH is a control channel for improving a PDCCH which is a control channel in a conventional 3GPP LTE system and an FD-ePDCCH transmission method refers to a method of pre-coding a PDCCH and transmitting the PDCCH via a PDSCH using multiple antennas in order to protect the PDCCH of a victim cell or increase reliability. Such an FD-ePDCCH may be referred to as an enhanced PDCCH (ePDCCH). In addition, in the present specification, unless stated otherwise, the FD-ePDCCH may include a relay-physical downlink control channel (R-PDCCH) which is a control channel for a relay.

Since the UE should complete preparation for ACK/NACK transmission within a minimum HARQ processing time for compatibility between an FDD system and a TDD system or for compatibility among various uplink-downlink configurations in a TDD system, HARQ ACK/NACK information should be generated within four subframe time intervals after receiving a PDSCH. In order to enable the UE to generate HARQ ACK/NACK information within four subframe time intervals, a PDCCH for transmitting resource assignment/grant information of the PDSCH should be decoded as fast as possible. Accordingly, assume that the below-proposed FD-ePDCCH is transmitted only using the PDSCH in a first slot of a subframe.

Figure 11:
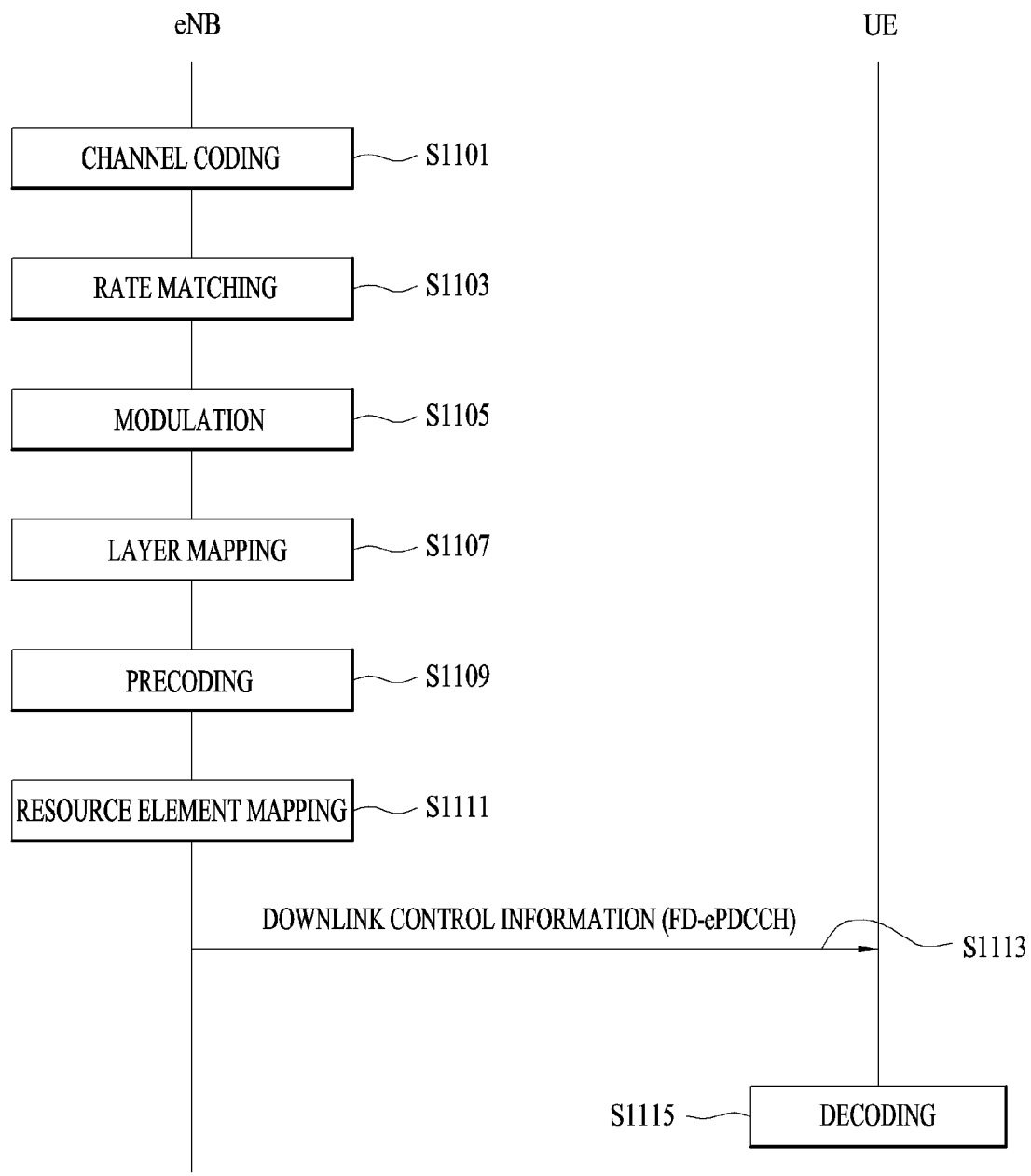
FIG. 11 is a diagram showing a method of transmitting downlink control information according to an embodiment of the present invention.

FIG. 11 is a diagram showing a method of transmitting downlink control information (DCI) according to an embodiment of the present invention. FIG. 11 is a flowchart shown for convenience of description of the present invention, to which additional steps (not shown) may be added.

Referring to FIG. 11, an eNB allocates, to a codeword, DCI for transmission to a UE and performs channel coding with respect to the codeword, to which the DCI is allocated (S1101). At this time, the eNB may allocate one pieces of DCI to one codeword, allocate a plurality of pieces of DCI to a plurality of codewords, or allocate a plurality of pieces of DCI to one codeword.

The eNB, which has performed channel coding with respect to the codeword to which the DCI is allocated, performs rate matching of encoded codeword bits (S1103).

The eNB, which has performed rate matching of the codeword bits, modulates the codeword bits to complex symbols (S1105). The eNB may use BPSK, QPSK, 16QAM or 64QAM. At this time, a modulation and coding scheme (MCS) of a PDCCH, an MCS of a PDSCH or a new MCS may be used.

The eNB may perform bit size matching of the codeword before mapping a plurality of codewords to a plurality of layers. As the bit size matching method, the eNB may perform bit size matching with respect to the codeword bits before channel coding, that is, before step S1101, or perform rate matching in step S1103, thereby performing bit size matching. Alternatively, the eNB may perform symbol size matching in symbol units after modulating the complex symbols, that is, after step S1105.

The eNB, which has modulated the codeword bits to the complex symbols, maps the complex symbols to a plurality of layers (S1107).

The eNB, which has mapped the complex symbols to the layers, multiplies the layers by a precoding matrix and allocates the multiplied results to the transmit antennas (S1109).

Subsequently, the eNB maps the transmitted signals of the antennas to time-frequency resource elements (S1111). As described above, the signals of the antennas are mapped to the resource elements of the PDSCH region of a first slot of a subframe. Here, the frequency region (resource block number or index), in which the FD-ePDCCH is transmitted, or the index of the transmitted subframe may be indicated or triggered using a higher layer signal or a PDCCH. Although the frequency region, in which the FD-ePDCCH is transmitted, or the index of the subframe may be fixed, the present invention is not limited thereto.

The eNB, which has mapped the transmitted signals to the time-frequency resource elements, transmits the DCI via the FD-ePDCCH using the antennas (S1113) and the UE performs decoding in order to acquire the DCI transmitted from the eNB (S1115). The UE may perform blind decoding or explicit decoding based on scheduling (downlink resource assignment information (DL grant or DL assignment)) as in the case in which the PDSCH is received in order to acquire the FD-ePDCCH transmitted via the PDSCH. Here, blind decoding may mean that decoding is performed with respect to all CCEs transmitted by the eNB and a DCI format transmitted to the UE is detected via CRC. However, the present invention is not limited thereto and a detection method similar thereto may be included.

As described above, since the FD-ePDCCH may be precoded and transmitted via the PDSCH, beamforming transmission (closed-loop MIMO transmission) may be performed using a cell-specific reference signal (CRS) or a UE-specific reference signal (DMRS) in a UE-specific manner. The beamformed FD-ePDCCH may increase a reception signal to noise ratio (SNR) as compared to an existing PDCCH and UEs may receive DCI formats with high reliability from the FD-ePDCCH.

Figure 12:
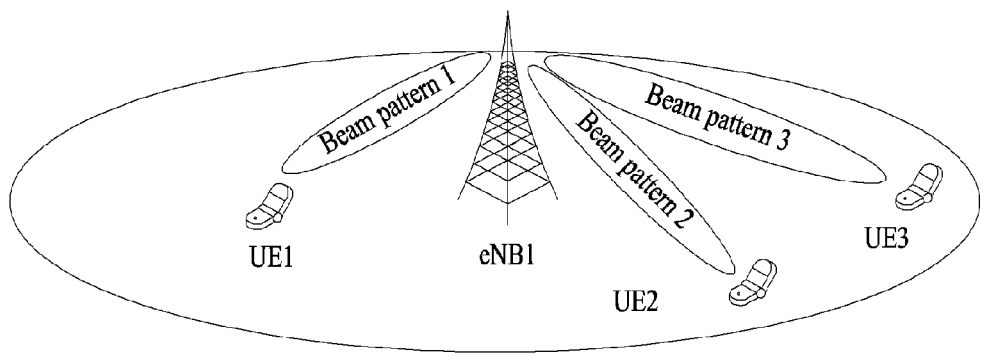
FIG. 12 is a diagram showing a method of transmitting an FD-ePDCCH according to an embodiment of the present invention using a beamforming scheme.
Figure 13:
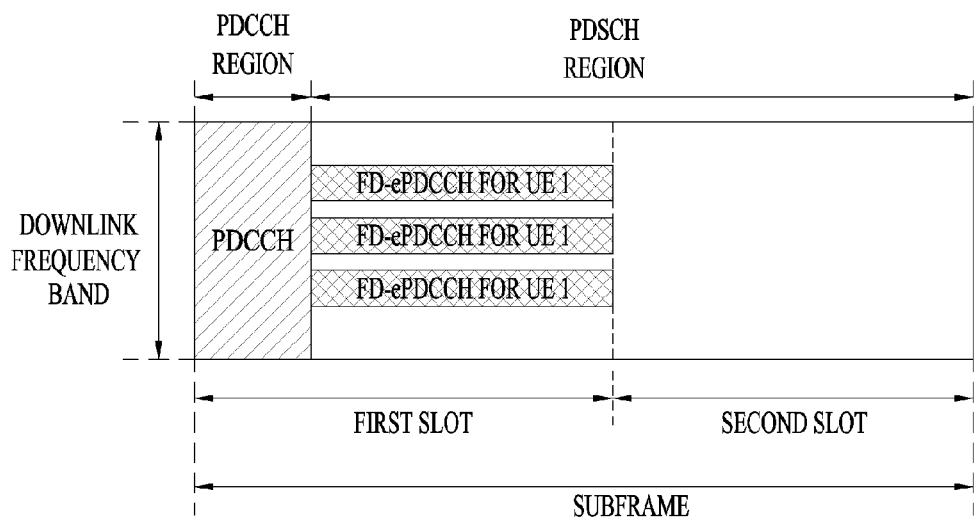
FIGS. 13 to 15 are diagrams showing the structure of a subframe, to which an FD-ePDCCH according to an embodiment of the present invention is allocated.
Figure 14:
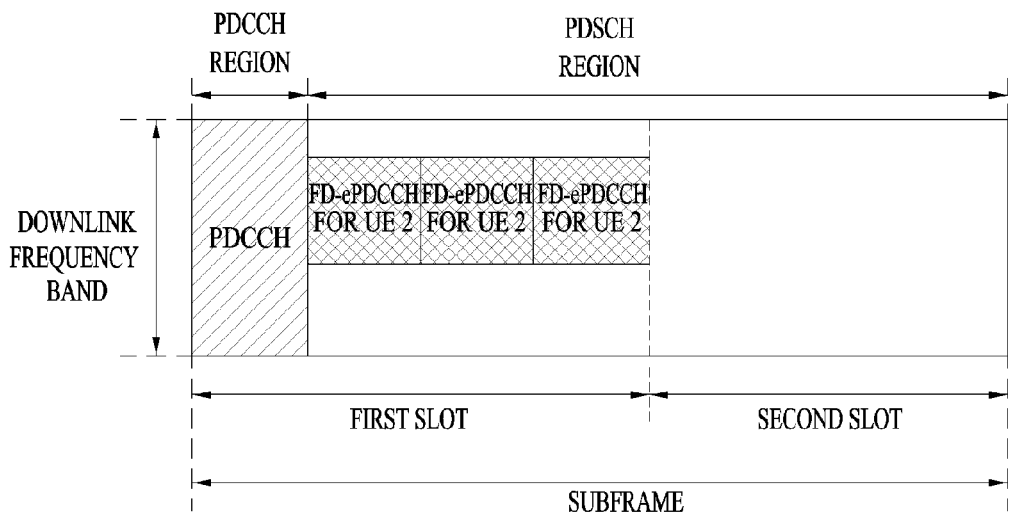
Figure 15:
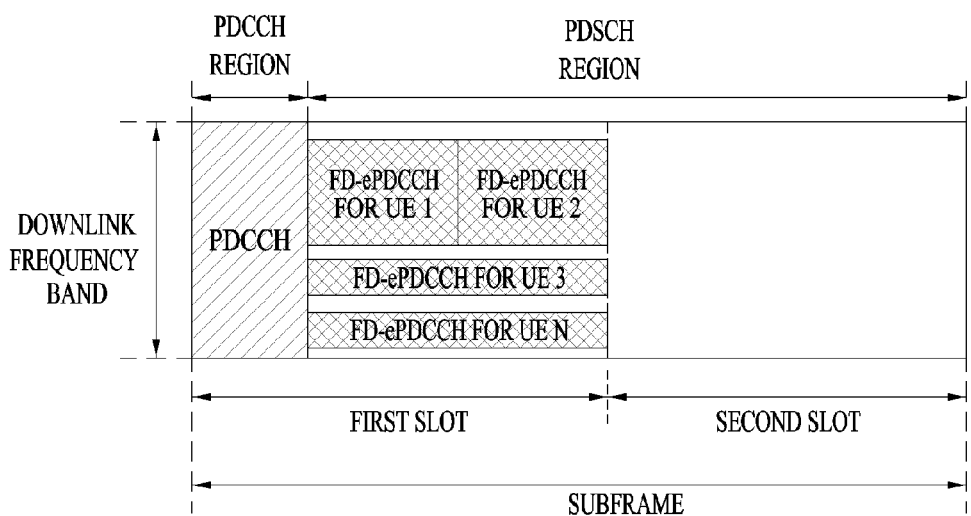

FIG. 12 is a diagram showing a method of transmitting an FD-ePDCCH according to an embodiment of the present invention using a beamforming scheme. FIGS. 13 to 15 are diagrams showing the structure of a subframe, to which an FD-ePDCCH according to an embodiment of the present invention is allocated.

Referring to FIGS. 12 to 15, an eNB 1 transmits the FD-ePDCCH to UEs 1, 2 and 3 using a beamforming scheme. Accordingly, the eNB may increase a reception SNR and control interference.

At this time, if the FD-ePDCCH is transmitted to N UEs, as shown in FIG. 13, UE multiplexing may be performed using one or more resource blocks (RBs). That is, the FD-ePDCCH for the UEs 1, 2 and 3 may be subjected to frequency division multiplexing (FDM) and transmitted. In addition, as shown in FIG. 14, within a fixed number of resource blocks (RBs), UE multiplexing may be performed using OFDM symbols of a time region. That is, the FD-ePDCCH for the UEs 1, 2 and 3 may be subjected to time division multiplexing (TDM) and transmitted. In addition, as shown in FIG. 15, UE multiplexing may be performed using one or more RBs and OFDM symbols.

FIGS. 13 to 15 show not only an example of actual transmission at a physical layer but also the case in which a DCI format for one UE uses one or more RBs or one or more OFDM symbols by channel coding and interleaving. That is, in FIGS. 13 to 15, distribution of DCI formats for each UE is expressed in a logical domain.

In a radio resource region used for FD-ePDCCH transmission, a frequency and/or subframe index and/or an OFDM symbol index in which the FD-ePDCCH may be transmitted via RRC signaling may be set as described above. In this case, the UE may perform blind decoding in order to detect the DCI format transmitted thereto in the region in which the FD-ePDCCH may be transmitted. Alternatively, if the frequency and subframe index and the OFDM symbol index for the UE are configured via RRC signaling or if downlink resource assignment information (DL grant or DL assignment) for the FD-ePDCCH is received via the PDCCH, the UE may perform explicit decoding or direct decoding.

Figure 16:
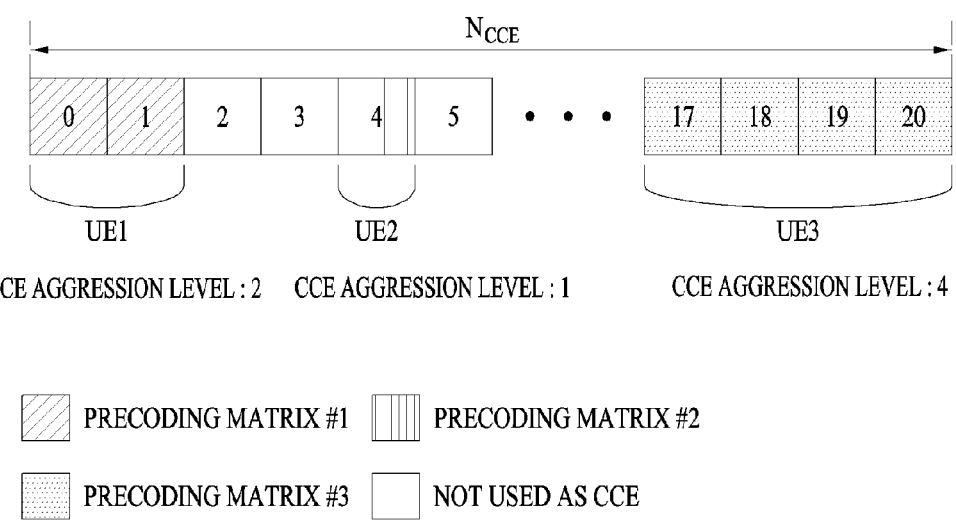
FIG. 16 is a diagram showing an example of precoding FD-ePDCCH according to an embodiment of the present invention in a UE-specific manner.

FIG. 16 is a diagram showing an example of precoding FD-ePDCCH according to an embodiment of the present invention in a UE-specific manner.

Referring to FIG. 16, the FD-ePDCCH transmitted by the eNB is configured in CCE units and DCI formats for three UEs 1, 2 and 3 are transmitted with aggregation levels of 2, 1 and 4. However, the DCI formats for the UEs are not configured in CCE units but may be configured in RE or RB or OFDM symbol units. In the present invention, the DCI format is applicable without limitation.

Since the CCE for the UE 1 is transmitted to the UE in a state of being multiplied by a precoding matrix #1 for beamforming, the UE 1 may detect a DCI format with high reliability due to reception SNR gain. In addition, since CCEs for UEs 2 and 3 are respectively transmitted to the UE in a state of being multiplied by precoding matrices #2 and 3 for beamforming, the UEs 2 and 3 may detect DCI formats with high reliability due to reception SNR gain. Since the DCI formats precoded in the UE-specific manner are oriented to the UEs, the UEs may perform blind decoding on the assumption that the DCI formats transmitted via the FD-ePDCCH may be transmitted in a UE-specific search space.

In addition, if precoding is not performed in the DCI format or if precoding is performed using a precoding matrix which may be known to all UEs in a cell, the DCI formats may be transmitted in a common search space and the UEs in the cell may detect the DCI formats in the common search space.

By transmitting the DCI formats using multiple antennas, the FD-ePDCCH may be transmitted. Accordingly, there is a need for a layer mapping scheme and a precoding scheme. Hereinafter, the structure of data carried on the FD-ePDCCH, layer mapping, precoding scheme and a series of processes therefor will be described in detail.

4.1. Mapping to Layers According to Usage of DCI Format

When the DCI formats are transmitted to the UE, the eNB may map the DCI formats to the layers according to usage of the DCI formats. Here, classification according to the usage of the DCI formats may be classification depending upon whether the DCI formats are used as downlink resource assignment information (DL grant/assignment) or uplink resource assignment information (UL grant), classification according to the search space in which the DCI formats are transmitted or classification according to the DCI format number (e.g., DCI formats 0, 1, 1a, 1b, 1c, 2, . . . , etc.).

More specifically, the PDCCH may be classified into DCI formats 0 and 4 in which uplink resource assignment information (UL grant) is transmitted, DCI formats 1, 1A, 1B, 1C, 1D, 2A, 2B and 2C in which downlink resource assignment information (DL grant/assignment) and DCI formats 3 and 3A in which a PUSCH and a TPC command for the PUCCH are transmitted. In addition, since the DCI formats 3 and 3A are commands related to an uplink signal, the DCI formats 3 and 3A may be classified as a set of DCI formats 0 and 4, in which the uplink resource allocation information is transmitted, a set, in which downlink resource assignment information (DL grant/assignment) is transmitted, or a new set. Alternatively, the PDCCH may be classified into DCI formats 0, 1A, 1C, 3 and 3A which may be transmitted in the common search space and DCI formats 0, 1A, 1, 2A, 2, 1D, 1B, 2B, 2C and 4 which may be transmitted in the UE-specific search space. Such a classification scheme is only exemplary and the DCI formats may be subjected to spatial multiplexing and transmitted via multiple antennas regardless of the types of the DCI formats without classification.

Hereinafter, for convenience of description, the classification method based on the uplink resource assignment information (UL grant) and the downlink resource assignment information (DL grant/assignment) will be described. That is, DCI formats 3 and 3A in which the TPC command is transmitted are classified as the same set as the DCI formats in which the uplink resource assignment information is transmitted and all the DCI formats are classified to two sets, that is, a set of DCI formats in which the uplink resource assignment information is transmitted and a set of DCI formats in which the downlink resource assignment information is transmitted.

Hereinafter, as described above, assume that the DCI formats are classified, the DCI formats 1, 1A, 1B, 1C, 1D, 2A, 2B and 2C, in which the downlink resource assignment information (DL grant/assignment) is transmitted, are allocated to a codeword 0 and the DCI formats 0, 3, 3A and 4, in which uplink resource assignment information (UL grant) is transmitted or which are related to an uplink signal, are allocated to a codeword 1. This is only an example for convenience of description. Alternatively, DCI formats, in which downlink resource assignment information is transmitted, may be allocated to a codeword 1, and CIs, in which uplink resource assignment information is transmitted or which are related to an uplink signal, may be allocated to a codeword 0.

When the DCI formats are allocated to codewords according to the type of the DCI format, if the bit sizes of the codewords are not equal, the following methods may be applied.

4.1.1. Bit Size Matching

If the bit sizes of the codewords, to which the DCI formats are allocated, are not equal, the eNB compares the bit sizes of codewords 0 and 1 and performs bit padding with a value of 0 or 1 until the bit size of a codeword having a smaller bit size becomes equal to the bit size of a codeword having a larger bit size.

Figure 17:
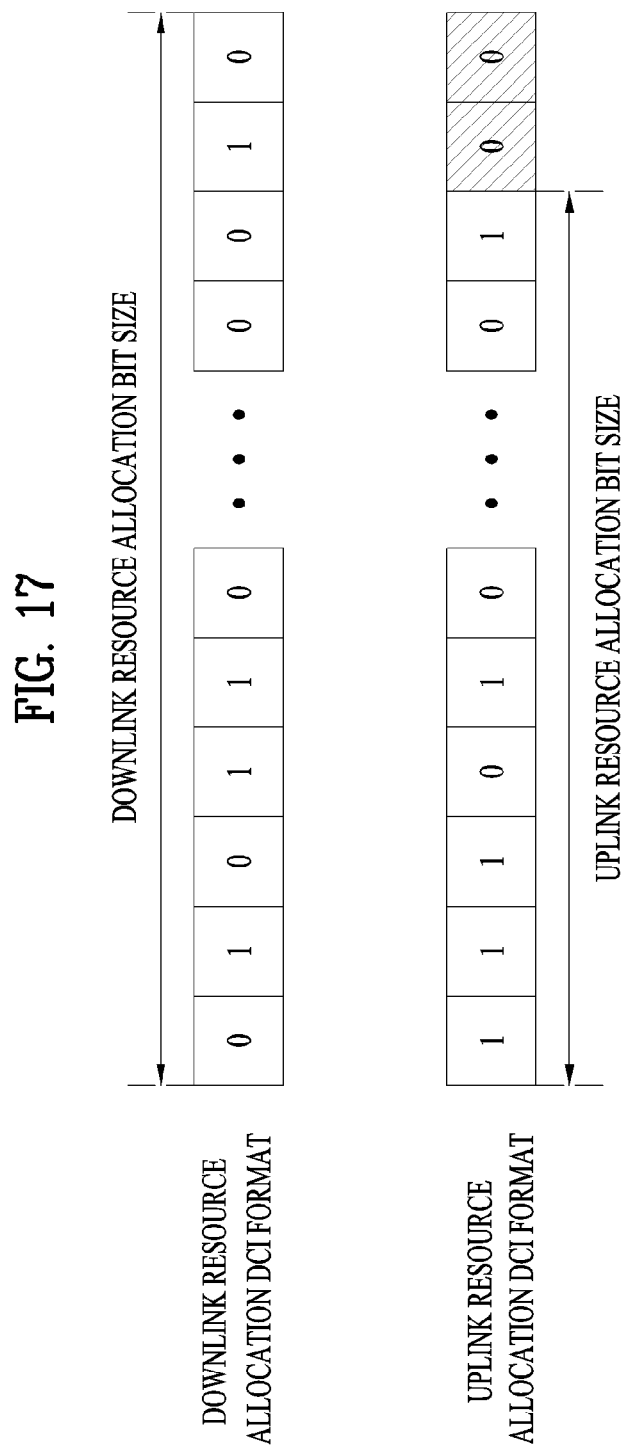
FIG. 17 is a diagram showing bit size matching of each codeword according to an embodiment of the present invention.

FIG. 17 is a diagram showing bit size matching of each codeword according to an embodiment of the present invention. Referring to FIG. 17, a DCI format for downlink resource assignment information and a DCI format for uplink resource assignment information are allocated to codewords 0 and 1. Since the bit size of the DCI format, in which the downlink resource assignment information is transmitted, is greater than the DCI format, in which the uplink resource assignment information is transmitted, by 2 bits, the eNB pads 2 bits having a value of 0 to the DCI format, in which the uplink resource assignment information is transmitted, such that the bit sizes of the codewords match.

Unlike the above-described embodiment, the eNB may perform rate matching with respected to the coded bits obtained by performing channel coding with respect to the codewords or change a channel coding rate to perform bit size matching. At this time, as channel coding, channel coding for the PDCCH, channel coding for the PDSCH or a new channel coding scheme may be used. In addition, rate matching may include puncturing, cyclic extension and repetition, 0/1 padding and may include all processes for bit size matching without limitation.

Figure 18:
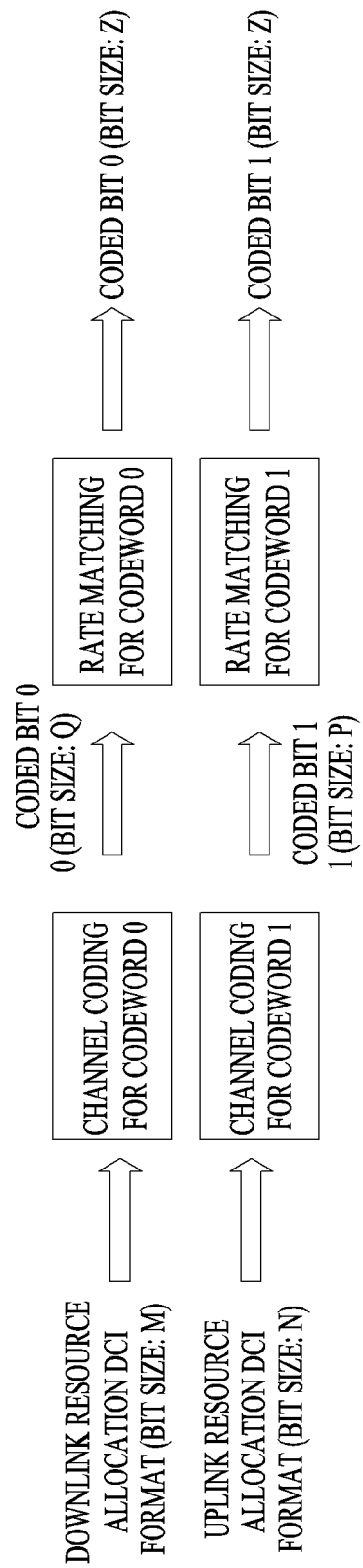
FIGS. 18 and 19 are diagrams showing bit size matching of each codeword via rate matching according to an embodiment of the present invention.
Figure 19:
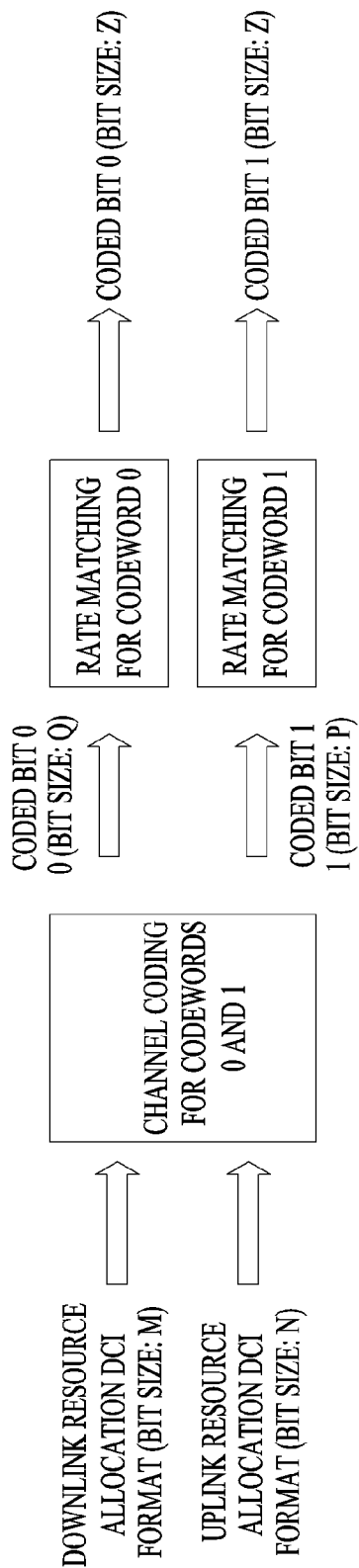

FIGS. 18 and 19 are diagrams showing bit size matching of each codeword via rate matching according to an embodiment of the present invention. FIG. 18 shows the case in which a channel coding block is not shared and FIG. 19 shows the case in which a channel coding block is shared.

Referring to FIGS. 18 and 19, DCI formats in which downlink resource assignment information is transmitted is allocated to a codeword 0 and DCI formats in which uplink downlink resource assignment information is transmitted is allocated to a codeword 1. When the bit size of the DCI formats in which downlink resource assignment information is transmitted is M and the bit size of the DCI formats in which uplink downlink resource assignment information is transmitted is N, these DCI formats may have respective bit sizes of Q and P after passing through a channel coding block and may have the same bit size z if rate matching is performed with respect to the channel-coded codewords. As shown in FIG. 19, if the channel coding block is shared, the same channel coding rate is applied to the codewords. In contrast, as shown in FIG. 18, if the channel coding rate is not shared, different channel coding rates are applied to the channel coding blocks and channel coding may be performed according to channel coding rates which differ between codewords.

4.1.2. Symbol Size Matching

As in the above-described embodiment, the eNB may perform symbol size matching and then perform layer mapping without performing bit size matching. The DCI formats, which are not subjected to bit size matching, may be subjected to constellation mapping according to BPSK, QPSK, 16QAM or 64QAM and mapped to modulation symbols. The modulation symbols are subjected to layer mapping and transmitted.

Figure 20:
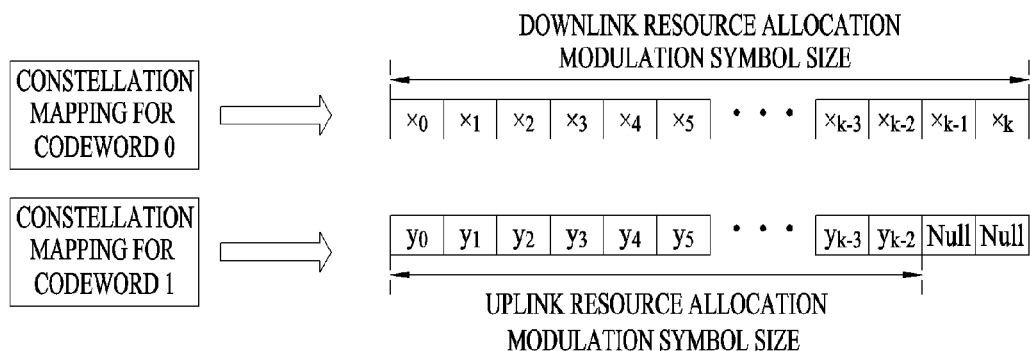
FIG. 20 is a diagram showing symbol size matching of each codeword according to an embodiment of the present invention.

FIG. 20 is a diagram showing symbol size matching of each codeword according to an embodiment of the present invention.

Referring to FIG. 20, a DCI format in which downlink resource assignment information is transmitted configures a coded bit 0, modulation symbols subjected to constellation mapping have a length of k, DCI formats in which uplink resource assignment information is transmitted configure a coded bit 1, and modulation symbols subjected to constellation mapping have a length of k−2. The eNB may perform symbol size matching before mapping the modulation symbols to the layers. That is, a null symbol may be inserted after a modulation symbol having a short length among the modulation symbols according to the codewords or a reference modulation symbol previously determined between the eNB and the UE may be inserted. Such a null symbol may be expressed by 0 without a signal or may be expressed by a +1, −1, +j or j value. A constant point of a constellation used for a modulation symbol having a short length may be used.

4.2. Mapping to Layers Regardless of Usage of DCI Format

Unlike the embodiment described in 4.1, the DCI formats may be mapped to the layers regardless of the usage of the DCI format.

The eNB may perform joint channel coding and rate matching with respect to the DCI formats in which downlink resource assignment information (DL grant/assignment) for the UE is transmitted and the DCI formats in which uplink resource assignment information is transmitted and then perform layer mapping. Here, joint channel coding means that the DCI formats in which downlink resource assignment information is transmitted and the DCI formats in which uplink resource assignment information is transmitted share one channel coding block to configure coded bits. In addition, different channel coding blocks may be used or one coded bit may be configured.

Figure 21:
FIG. 21 is a diagram showing an example in which a codeword subjected to joint channel coding according to an embodiment of the present invention is subjected to rate matching.

FIG. 21 is a diagram showing an example in which a codeword subjected to joint channel coding according to an embodiment of the present invention is subjected to rate matching.

Referring to FIG. 21, the eNB performs joint channel coding with respect to the DCI formats in which downlink resource assignment information is transmitted and the DCI formats in which uplink resource assignment information is transmitted. Thus, the joint channel coded bits have a bit size of z. Subsequently, the eNB may perform rate matching in order to configure the joint channel coded bits by modulation symbols corresponding in number to an integer multiple of the number of layers according to the multi-antenna transmission mode. As described above, rate matching may include puncturing, cyclic extension, repetition and 0/1 padding and may include all processes for bit size matching without limitation.

4.3. One DCI Format

The eNB may perform channel coding and rate matching with respect to one DCI format and perform layer mapping.

In this case, the DCI format may be an existing DCI format or a DCI format newly defined in order to increase capacity of a control channel and the DCI format may be transmitted in a UE-specific search space without increasing an aggregation level of the DCI format.

Figure 22:
FIG. 22 is a diagram showing an example in which channel coding and rate matching are performed with respect to one DCI according to an embodiment of the present invention.

FIG. 22 is a diagram showing an example in which channel coding and rate matching are performed with respect to one DCI according to an embodiment of the present invention.

Referring to FIG. 22, the eNB performs channel coding with respect to one DCI format and the channel coded bits have a bit size of z. One DCI format may be an existing DCI format or a DCI format k newly defined in order to increase capacity of a control channel. For example, k may be composed of a combination of an alphabetical character and an integer which is not used for an existing DCI format, such as 5, 4a or 4b. Subsequently, the eNB may perform rate matching in order to configure the channel coded bits using modulation symbols corresponding in number to an integer multiple of the number of layers according to the multi-antenna transmission mode. As described above, rate matching may include puncturing, cyclic extension, repetition and 0/1 padding and may include all processes for bit size matching without limitation. Subsequently, since the number of layers is 4, the eNB performs rate matching with respect to the channel coded bits by an integer multiple (4*N) of 4 which is the number of layers.

4.4. Signal Processing Procedure for FD-ePDCCH Transmission

Modulation symbols subjected to bit or symbol size matching, which are described in 4.1 to 4.3, may be transmitted using multiple antennas via the layer mapper and the precoding module. Hereinafter, the method of transmitting the DCI format at the eNB using the multiple antennas may use the signal processing procedure of the eNB described in 1.4 or another signal processing procedure.

Figure 23:
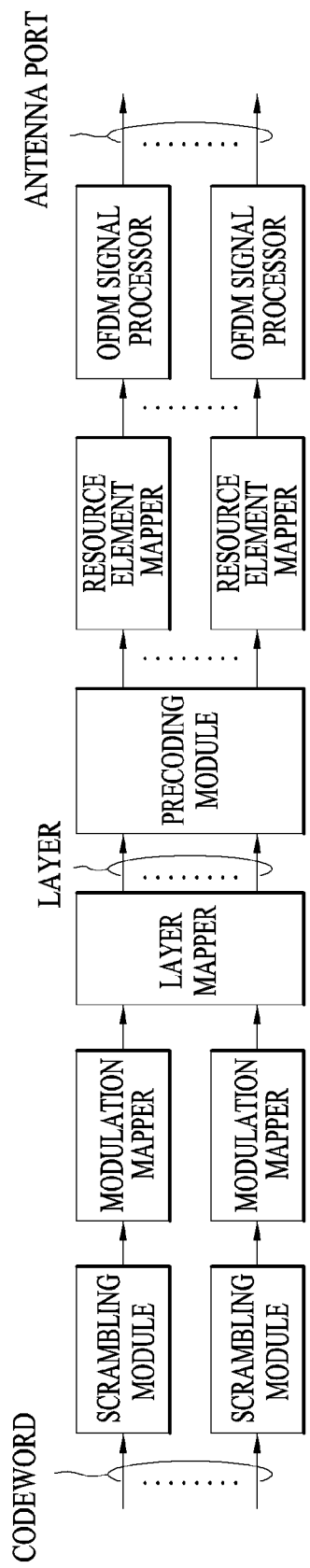
FIG. 23 is a diagram showing a signal processing procedure for transmitting a downlink signal at a BS according to an embodiment of the present invention.

FIG. 23 is a diagram showing a signal processing procedure for transmitting a downlink signal at a BS according to an embodiment of the present invention. The codeword of FIG. 23 may mean coded bits obtained by performing bit size matching with respect to the DCI formats classified according to usage thereof via channel coding and rate matching or coded bits obtained by performing bit size matching with respect to DCI formats via channel coding and rate matching regardless of usage of the DCI format.

Referring to FIG. 23, the codewords (coded bits) may be scrambled for security or noise randomization. A scrambling procedure may be performed by Equation 16 below.

$$\tilde{b}^{(q)}(i)=(b^{(q)}(i)+c^{(q)}(i)) \bmod 2 \qquad \text{Equation 16}$$

where, $b^{(q)}(i)$ denotes coded bits, $c^{(q)}(i)$ denotes a scrambling sequence and $\tilde{b}^{(q)}(i)$ denotes scrambled bits. q denotes the number of codeword types, that is, the number of coded bit types, and may have a value of 0 or 1. In addition, definition of a generation polynomial 3GPP LTE system for generating scrambling is used. Although $c_{init}=\lfloor n_s/2 \rfloor 2^9 + N_{ID}^{cell}$ for generating a PDCCH or $c_{init}=n_{RNTI} \cdot 2^{14}+q \cdot 2^{13}+\lfloor n_s/2 \rfloor \cdot 2^9 + N_{ID}^{cell}$ for generating a PDSCH may be used as an initial value $c^{init}$, a new cell-specific or UE-specific initial value may be used.

Subsequently, the scrambled bits may be input to the modulation mapper to be modulated to complex symbols using BPSK, QPSK, 16QAM or 64QAM according to transmitted signal type and/or channel state.

Subsequently, the modulated complex symbols are mapped to the plurality of layers by the layer mapper. Layer mapping may be configured according to the number of codewords and the number of layers as shown in Table 41 below. Here, $d^{(0)}(i)$ denotes modulated symbols, $x^{(0)}(i)$ denotes the result of generating modulation symbols via the layer mapper, $M_{symb}^{(0)}$ and $M_{symb}^{(1)}$ denote total numbers of modulation symbols generated via codewords 0 and 1, and $M_{symb}^{layer}$ denotes the total number of modulation symbols generated at each layer.

Table 41 shows codeword-to-layer mapping.

| Number of layers | Number of codewords | Codeword-to-layer mapping $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 1 | $x^{(0)}(i) = d^{(0)}(2i)$ $x^{(1)}(i) = d^{(0)}(2i+1)$ | $M_{symb}^{layer} = M_{symb}^{(0)}/2$ |
| 2 | 2 | $x^{(0)}(i) = d^{(0)}(i)$ $x^{(1)}(i) = d^{(1)}(i)$ | $M_{symb}^{layer} = M_{symb}^{(0)} = M_{symb}^{(1)}$ |

-continued

| Number of layers | Number of codewords | Codeword-to-layer mapping $i = 0, 1, \ldots, M_{symb}^{layer} - 1$ | |
|---|---|---|---|
| 3 | 1 | $x^{(0)}(i) = d^{(0)}(3i)$<br>$x^{(1)}(i) = d^{(0)}(3i + 1)$<br>$x^{(2)}(i) = d^{(0)}(3i + 2)$ | $M_{symb}^{layer} = M_{symb}^{(0)}/3$ |
| 3 | 2 | $x^{(0)}(i) = d^{(0)}(i)$<br>$x^{(1)}(i) = d^{(1)}(2i)$<br>$x^{(2)}(i) = d^{(1)}(2i + 1)$ | $M_{symb}^{layer} = M_{symb}^{(0)} = M_{symb}^{(1)}/2$ |
| 4 | 1 | $x^{(0)}(i) = d^{(0)}(4i)$<br>$x^{(1)}(i) = d^{(0)}(4i + 1)$<br>$x^{(2)}(i) = d^{(0)}(4i + 2)$<br>$x^{(3)}(i) = d^{(0)}(4i + 3)$ | $M_{symb}^{layer} = M_{symb}^{(0)}/4$ |
| 4 | 2 | $x^{(0)}(i) = d^{(0)}(2i)$<br>$x^{(1)}(i) = d^{(0)}(2i + 1)$<br>$x^{(2)}(i) = d^{(1)}(2i)$<br>$x^{(3)}(i) = d^{(1)}(2i + 1)$ | $M_{symb}^{layer} = M_{symb}^{(0)}/2 = M_{symb}^{(1)}/2$ |
| 5 | 2 | $x^{(0)}(i) = d^{(0)}(2i)$<br>$x^{(1)}(i) = d^{(0)}(2i + 1)$<br>$x^{(2)}(i) = d^{(1)}(3i)$<br>$x^{(3)}(i) = d^{(1)}(3i + 1)$<br>$x^{(4)}(i) = d^{(1)}(3i + 2)$ | $M_{symb}^{layer} = M_{symb}^{(0)}/2 = M_{symb}^{(1)}/3$ |
| 6 | 2 | $x^{(0)}(i) = d^{(0)}(3i)$<br>$x^{(1)}(i) = d^{(0)}(3i + 1)$<br>$x^{(2)}(i) = d^{(0)}(3i + 2)$<br>$x^{(3)}(i) = d^{(1)}(3i)$<br>$x^{(4)}(i) = d^{(1)}(3i + 1)$<br>$x^{(5)}(i) = d^{(1)}(3i + 2)$ | $M_{symb}^{layer} = M_{symb}^{(0)}/3 = M_{symb}^{(1)}/3$ |
| 7 | 2 | $x^{(0)}(i) = d^{(0)}(3i)$<br>$x^{(1)}(i) = d^{(0)}(3i + 1)$<br>$x^{(2)}(i) = d^{(0)}(3i + 2)$<br>$x^{(3)}(i) = d^{(1)}(4i)$<br>$x^{(4)}(i) = d^{(1)}(4i + 1)$<br>$x^{(5)}(i) = d^{(1)}(4i + 2)$<br>$x^{(6)}(i) = d^{(1)}(4i + 3)$ | $M_{symb}^{layer} = M_{symb}^{(0)}/3 = M_{symb}^{(1)}/4$ |
| 8 | 2 | $x^{(0)}(i) = d^{(0)}(4i)$<br>$x^{(1)}(i) = d^{(0)}(4i + 1)$<br>$x^{(2)}(i) = d^{(0)}(4i + 2)$<br>$x^{(3)}(i) = d^{(0)}(4i + 3)$<br>$x^{(4)}(i) = d^{(1)}(4i)$<br>$x^{(5)}(i) = d^{(1)}(4i + 1)$<br>$x^{(6)}(i) = d^{(1)}(4i + 2)$<br>$x^{(7)}(i) = d^{(1)}(4i + 3)$ | $M_{symb}^{layer} = M_{symb}^{(0)}/4 = M_{symb}^{(1)}/4$ |

In addition, if one codeword is configured, layer mapping may be performed as shown in Table 42 below in order to obtain spatial diversity or transmit diversity.

Table 42 shows codeword-to-layer mapping for transmit diversity.

TABLE 42

| Number of layers | number of codewords | Codeword-to-layer-mapping $i = 0, 1, \ldots, M_{symb}^{layer} - 1$ | |
|---|---|---|---|
| 2 | 1 | $x^{(0)}(i) = d^{(0)}(2i)$<br>$x^{(1)}(i) = d^{(0)}(2i + 1)$ | $M_{symb}^{layer} = M_{symb}^{(0)}/2$ |
| 4 | 1 | $x^{(0)}(i) = d^{(0)}(4i)$<br>$x^{(1)}(i) = d^{(0)}(4i + 1)$<br>$x^{(2)}(i) = d^{(0)}(4i + 2)$<br>$x^{(3)}(i) = d^{(0)}(4i + 3)$ | $M_{symb}^{layer} = \begin{cases} M_{symb}^{(0)}/4 & \text{if } M_{symb}^{(0)} \bmod 4 = 0 \\ (M_{symb}^{(0)} + 2)/4 & \text{if } M_{symb} \bmod 4 \neq 0 \end{cases}$ |

If $M_{symb}^{(0)} \bmod 4 \neq 0$ two null symbols shall be appended to $d^{(0)}(M_{symb}^{(0)} - 1)$ The modulation symbols generated via the layer mapper may be multiplied by a precoding matrix by a precoding module and allocated to the transmit antennas. The precoding procedure performed by the precoding module will be described in detail below. The transmitted signals of the antennas are respectively mapped to time-frequency resource elements by the resource element mappers and then are transmitted via antennas after passing through OFDM signal generators.

Figure 24:
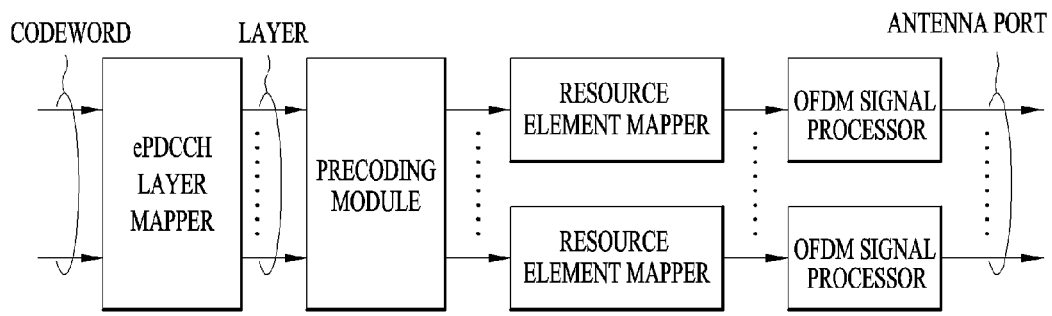
FIG. 24 is a diagram showing a signal processing procedure for transmitting a downlink signal at a BS according to another embodiment of the present invention.

FIG. 24 is a diagram showing a signal processing procedure for transmitting a downlink signal at a BS according to another embodiment of the present invention.

Referring to FIG. 24, the modulation symbols subjected to bit size matching or symbol size matching may be transmitted via the multiple antennas after passing through the FD-ePDCCH layer mappers and the precoding module. The codeword of FIG. 24 may mean modulated symbols obtained by performing channel coding and rate matching with respect to the DCI formats classified according to the usage of the DCI or modulated symbols obtained by performing channel coding and rate matching with respect to the DCI formats regardless of the usage of the DCI format.

The codewords (modulated symbols) are transmitted to the layer mappers and mapped to the plurality of layers by the layer mappers. Layer mapping may be configured according to the number of codewords and the number of layers as shown in)) Table 41 above. Here, $d^{(0)}(i)$ denotes modulation symbols, $x^{(0)}(i)$ denotes the result of generating modulation symbols via the layer mapper, $M_{symb}^{(0)}$ and $M_{symb}^{(1)}$ denote total numbers of modulation symbols generated via codewords 0 and 1, and $M_{symb}^{layer}$ denotes the total number of modulation symbols generated at each layer.

In addition, if one codeword is configured, layer mapping may be performed as shown in Table 42 below in order to obtain spatial diversity or transmit diversity.

Although the number of layers used in the FD-ePDCCH may be 1 to 8, the number of layers which may be maximally used in order to solve reliability problems occurring due to physical antenna property for multi-antenna transmission and RF chain property may be fixed to 2 or 4.

Hereinafter, the precoding procedure performed by the precoding module will be described in detail.

4.4.1. Precoding for Spatial Multiplexing Based on Cell-Specific Reference Signal (CRS)

The modulation symbols generated by the layer mappers may be precoded based on the CRS. CRS based precoding is performed as shown in Equation 17 below.

$$\begin{bmatrix} y^{(0)}(i) \\ \vdots \\ y^{(P-1)}(i) \end{bmatrix} = W(i) \begin{bmatrix} x^{(0)}(i) \\ \vdots \\ x^{(\upsilon-1)}(i) \end{bmatrix} \quad \text{Equation 17}$$

where, $\upsilon$ denotes the total number of layers and P denotes the total number of antenna ports. The precoding matrix W(i) has a size of P×$\upsilon$, i=0,1, . . . , $M_{symb}^{ap}$−1 and $M_{symb}^{ap}=M_{symb}^{layer}$.

At this time, the antenna port does not mean a physical antenna used for actual transmission but means a virtual antenna via which modulation symbols subjected to layer mapping are transmitted. Accordingly, the antenna port may be mapped to the physical antenna or may be mapped using another mapping method.

For spatial multiplexing, the value of the precoding matrix W(i) is selected from the precoder elements in the codebook set in the eNB and the UE. The eNB may restrict precoder selection at the UE to a subset of elements in the codebook using codebook subset restriction. The codebook may be selected from Table 43 or Table 27.

For transmission via two antenna ports p∈{0,1}, the precoding matrix W(i) may be selected from table 43 below or a subset of Table 43 may be selected. In case of a closed-loop spatial multiplexing transmission mode, when the number of layers is $\upsilon$=2, codebook index 0 is not used.

Table 43 shows a codebook for transmission via antenna ports {0,1}.

TABLE 43

| Codebook | Number of layers $\upsilon$ | |
| --- | --- | --- |
| index | 1 | 2 |
| 0 | $\frac{1}{\sqrt{2}}\begin{bmatrix}1\\1\end{bmatrix}$ | $\frac{1}{\sqrt{2}}\begin{bmatrix}1&0\\0&1\end{bmatrix}$ |
| 1 | $\frac{1}{\sqrt{2}}\begin{bmatrix}1\\-1\end{bmatrix}$ | $\frac{1}{2}\begin{bmatrix}1&1\\1&-1\end{bmatrix}$ |
| 2 | $\frac{1}{\sqrt{2}}\begin{bmatrix}1\\j\end{bmatrix}$ | $\frac{1}{2}\begin{bmatrix}1&1\\j&-j\end{bmatrix}$ |
| 3 | $\frac{1}{\sqrt{2}}\begin{bmatrix}1\\-j\end{bmatrix}$ | — |

For transmission via four antenna ports p∈{0,1,2,3}, the precoding matrix W(i) may be selected from Table 44 below or a subset of Table 44 may be selected. $W_n^{\{s\}}$ denotes a matrix by columns determined by a set {s} in $W_n=I-2u_n u_n^H/u_n^H u_n$. Here, I denotes a 4×4 identity matrix and $u_n$ is determined by Table 44 below.

Table 44 shows a codebook for transmission via antenna ports {0,1,2,3}

TABLE 44

| Codebook index | $u_n$ | Number of layers v | | | |
| --- | --- | --- | --- | --- | --- |
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

A codebook for a CSI report for eight CSI reference signals is shown in Tables 45 to 52 below. Here, $\phi_n$ and $v_m$ are determined by Equation 18 below.

$$\phi_n = e^{j\pi n/2}$$

$$v_m = [1\ e^{j2\pi m/32}\ e^{j4\pi m/32}\ e^{j6\pi m/32}]^T \quad \text{Equation 18}$$

Table 45 shows a codebook for a 1-layer CSI report using antenna ports 15 to 22.

TABLE 45

| | $i_2$ | | | |
|---|---|---|---|---|
| $i_1$ | 0 | 1 | 2 | 3 |
| 0-15 | $W_{2i_1,0}^{(1)}$ | $W_{2i_1,1}^{(1)}$ | $W_{2i_1,2}^{(1)}$ | $W_{2i_1,3}^{(1)}$ |

TABLE 45-continued

| | $i_2$ | | | |
|---|---|---|---|---|
| $i_1$ | 4 | 5 | 6 | 7 |
| 0-15 | $W_{2i_1+1,0}^{(1)}$ | $W_{2i_1+1,1}^{(1)}$ | $W_{2i_1+1,2}^{(1)}$ | $W_{2i_1+1,3}^{(1)}$ |
| | $i_2$ | | | |
| $i_1$ | 8 | 9 | 10 | 11 |
| 0-15 | $W_{2i_1+2,0}^{(1)}$ | $W_{2i_1+2,1}^{(1)}$ | $W_{2i_1+2,2}^{(1)}$ | $W_{2i_1+2,3}^{(1)}$ |
| | $i_2$ | | | |
| $i_1$ | 12 | 13 | 14 | 15 |
| 0-15 | $W_{2i_1+3,0}^{(1)}$ | $W_{2i_1+3,1}^{(1)}$ | $W_{2i_1+3,2}^{(1)}$ | $W_{2i_1+3,3}^{(1)}$ | where $W_{m,n}^{(1)} = \dfrac{1}{\sqrt{8}} \begin{bmatrix} v_m \\ \varphi_n v_m \end{bmatrix}$ Table 46 shows a codebook for a 2-layer CSI report using antenna ports 15 to 22.

TABLE 46

| | $i_2$ | | | |
|---|---|---|---|---|
| $i_1$ | 0 | 1 | 2 | 3 |
| 0-15 | $W_{2i_1,2i_1,0}^{(2)}$ | $W_{2i_1,2i_1,1}^{(2)}$ | $W_{2i_1+1,2i_1+1,0}^{(2)}$ | $W_{2i_1+1,2i_1+1,1}^{(2)}$ |
| | $i_2$ | | | |
| $i_1$ | 4 | 5 | 6 | 7 |
| 0-15 | $W_{2i_1+2,2i_1+2,0}^{(2)}$ | $W_{2i_1+2,2i_1+2,1}^{(2)}$ | $W_{2i_1+3,2i_1+3,0}^{(2)}$ | $W_{2i_1+3,2i_1+3,1}^{(2)}$ |
| | $i_2$ | | | |
| $i_1$ | 8 | 9 | 10 | 11 |
| 0-15 | $W_{2i_1,2i_1+1,0}^{(2)}$ | $W_{2i_1,2i_1+1,1}^{(2)}$ | $W_{2i_1+1,2i_1+2,0}^{(2)}$ | $W_{2i_1+1,2i_1+2,1}^{(2)}$ |
| | $i_2$ | | | |
| $i_1$ | 12 | 13 | 14 | 15 |
| 0-15 | $W_{2i_1,2i_1+3,0}^{(2)}$ | $W_{2i_1,2i_1+3,1}^{(2)}$ | $W_{2i_1+1,2i_1+3,0}^{(2)}$ | $W_{2i_1+1,2i_1+3,1}^{(2)}$ | where $W_{m,m',n}^{(2)} = \dfrac{1}{4} \begin{bmatrix} v_m & v_{m'} \\ \varphi_n v_m & -\varphi_n v_{m'} \end{bmatrix}$ Table 47 shows a codebook for a 3-layer CSI report using antenna ports 15 to 22.

TABLE 47

| | $i_2$ | | | |
|---|---|---|---|---|
| $i_1$ | 0 | 1 | 2 | 3 |
| 0-3 | $W_{8i_1,8i_1,8i_1+8}^{(3)}$ | $W_{8i_1+8,8i_1,8i_1+8}^{(3)}$ | $\tilde{W}_{8i_1,8i_1+8,8i_1+8}^{(3)}$ | $\tilde{W}_{8i_1+8,8i_1,8i_1}^{(3)}$ |
| | $i_2$ | | | |
| $i_1$ | 4 | 5 | 6 | 7 |
| 0-3 | $W_{8i_1+2,8i_1+2,8i_1+10}^{(3)}$ | $W_{8i_1+10,8i_1+2,8i_1+10}^{(3)}$ | $\tilde{W}_{8i_1+2,8i_1+10,8i_1+10}^{(3)}$ | $\tilde{W}_{8i_1+10,8i_1+2,8i_1+2}^{(3)}$ |
| | $i_2$ | | | |
| $i_i$ | 8 | 9 | 10 | 11 |

TABLE 47-continued

| | | | | |
|---|---|---|---|---|
| 0-3 | $W^{(3)}_{8i_1+4,8i_1+4,8i_1+12}$ | $W^{(3)}_{8i_1+12,8i_1+4,8i_1+12}$ | $\tilde{W}^{(3)}_{8i_1+4,8i_1+12,8i_1+12}$ | $\tilde{W}^{(3)}_{8i_1+12,8i_1+4,8i_1+4}$ |

| | $i_2$ | | | |
|---|---|---|---|---|
| $i_1$ | 12 | 13 | 14 | 15 |
| 0-3 | $W^{(3)}_{8i_1+6,8i_1+6,8i_1+14}$ | $W^{(3)}_{8i_1+14,8i_1+6,8i_1+14}$ | $\tilde{W}^{(3)}_{8i_1+6,8i_1+14,8i_1+14}$ | $\tilde{W}^{(3)}_{8i_1+14,8i_1+6,8i_1+6}$ | where $W^{(3)}_{m,m',m''} = \frac{1}{\sqrt{24}}\begin{bmatrix} v_m & v_{m'} & v_{m''} \\ v_m & -v_{m'} & -v_{m''} \end{bmatrix}$, $\tilde{W}^{(3)}_{m,m',m''} = \frac{1}{\sqrt{24}}\begin{bmatrix} v_m & v_{m'} & v_{m''} \\ v_m & v_{m'} & -v_{m''} \end{bmatrix}$ Table 48 shows a codebook for a 4-layer CSI report using antenna ports 15 to 22.

TABLE 48

| | $i_2$ | | | |
|---|---|---|---|---|
| $i_1$ | 0 | 1 | 2 | 3 |
| 0-3 | $W^{(4)}_{8i_1,8i_1+8,0}$ | $W^{(4)}_{8i_1,8i_1+8,1}$ | $W^{(4)}_{8i_1+2,8i_1+10,0}$ | $W^{(4)}_{8i_1+2,8i_1+10,1}$ |

| | $i_2$ | | | |
|---|---|---|---|---|
| $i_1$ | 4 | 5 | 6 | 7 |
| 0-3 | $W^{(4)}_{8i_1+4,8i_1+12,0}$ | $W^{(4)}_{8i_1+4,8i_1+12,1}$ | $W^{(4)}_{8i_1+6,8i_1+14,0}$ | $W^{(4)}_{8i_1+6,8i_1+14,1}$ | where $W^{(4)}_{m,m',n} = \frac{1}{\sqrt{32}}\begin{bmatrix} v_m & v_{m'} & v_m & v_{m'} \\ \varphi_n v_m & \varphi_n v_{m'} & -\varphi_n v_m & -\varphi_n v_{m'} \end{bmatrix}$ Table 49 shows a codebook for a 5-layer CSI report using antenna ports 15 to 22.

TABLE 49

| | $i_2$ |
|---|---|
| $i_1$ | 0 |
| 0-3 | $W^{(5)}_{i_1} = \frac{1}{\sqrt{40}}\begin{bmatrix} v_{2i_1} & v_{2i_1} & v_{2i_1+8} & v_{2i_1+8} & v_{2i_1+16} \\ v_{2i_1} & -v_{2i_1} & v_{2i_1+8} & -v_{2i_1+8} & v_{2i_1+16} \end{bmatrix}$ |

Table 50 shows a codebook for a 6-layer CSI report using antenna ports 15 to 22.

TABLE 50

| | $i_2$ |
|---|---|
| $i_1$ | 0 |
| 0-3 | $W^{(6)}_{i_1} = \frac{1}{\sqrt{48}}\begin{bmatrix} v_{2i_1} & v_{2i_1} & v_{2i_1+8} & v_{2i_1+8} & v_{2i_1+16} & v_{2i_1+16} \\ v_{2i_1} & -v_{2i_1} & v_{2i_1+8} & -v_{2i_1+8} & v_{2i_1+16} & -v_{2i_1+16} \end{bmatrix}$ |

Table 51 shows a codebook for a 7-layer CSI report using antenna ports 15 to 22.

TABLE 51

| | $i_2$ |
|---|---|
| $i_1$ | 0 |
| 0-3 | $W^{(7)}_{i_1} = \frac{1}{\sqrt{56}}\begin{bmatrix} v_{2i_1} & v_{2i_1} & v_{2i_1+8} & v_{2i_1+8} & v_{2i_1+16} & v_{2i_1+16} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} \end{bmatrix}$ |

Table 52 shows a codebook for an 8-layer CSI report using antenna ports 15 to 22.

TABLE 52

| | $i_2$ |
|---|---|
| $i_1$ | 0 |
| 0 | $W^{(8)}_{i_1} = \frac{1}{\sqrt{8}}\begin{bmatrix} v_{2i_1} & v_{2i_1} & v_{2i_1+8} & v_{2i_1+8} & v_{2i_1+16} & v_{2i_1+16} & v_{2i_1+24} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} & -v_{2i_1+24} \end{bmatrix}$ |

If the eNB transmits the FD-ePDCCH based on CRS, information about the above-described precoding matrix should be transmitted to the UE. At this time, a legacy zone may be reused as the transmitted PDCCH region.

At this time, if the FD-ePDCCH is explicitly transmitted based on scheduling using downlink resource assignment information (DL grant/assignment) of the PDCCH, the eNB may send a precoding information field in a DCI format to the UE. In contrast, if the FD-ePDCCH is transmitted based on blind decoding, the UE does not receive a DCI format of an existing PDCCH but receives the FD-ePDCCH. Alternatively, if an existing PDCCH cannot be received by the UE due to interference, since the FD-ePDCCH should be received, the eNB implicitly transmits information about a precoding matrix to the UE. A method of implicitly acquiring precoding matrix information of the CRS-precoded FD-ePDCCH at the UE will now be described.

1) The eNB precodes and transmits the FD-ePDCCH using a precoding matrix used in a most recently transmitted PDSCH among PDSCHs transmitted to the UE or PDCCH. Accordingly, the UE may acquire the precoding matrix using the precoding information field within the most recently acquired DCI format and decode the FD-ePDCCH transmitted thereto using the precoding matrix to acquire DCI formats transmitted thereto.

2) In addition, the eNB may transmit, to the UE, information about the precoding matrix used to transmit the FD-ePDCCH using RRC signaling or a media access control (MAC) message. If the information about the precoding matrix is transmitted using the RRC or MAC message, it may be difficult to apply an instantaneous channel state. In this case, the information about the precoding matrix may become information about the precoding matrix used for a long term. In particular, since a channel state of a fixed UE is not changed, such a method is applicable.

4.4.2. Precoding Spatial Diversity

Precoding for a spatial diversity or transmit diversity scheme is used in combination with layer mapping for spatial diversity or transmit diversity described in 4.4. The precoding operation for transmit diversity is divided into the case of two antenna ports or the case of four antenna ports as described below.

For transmission via two antenna ports $p \in \{0,1\}$, an output $y(i)=[y^{(0)}(i)\ y^{(1)}(i)]^T$ ($i=0,1,\ldots,M_{symb}^{ap}-1$) according to the precoding operation is determined as shown in Equation 19 below.

$$\begin{bmatrix} y^{(0)}(2i) \\ y^{(1)}(2i) \\ y^{(0)}(2i+1) \\ y^{(1)}(2i+1) \end{bmatrix} = \frac{1}{\sqrt{2}} \begin{bmatrix} 1 & 0 & j & 0 \\ 0 & -1 & 0 & j \\ 0 & 1 & 0 & j \\ 1 & 0 & -j & 0 \end{bmatrix} \begin{bmatrix} \mathrm{Re}(x^{(0)}(i)) \\ \mathrm{Re}(x^{(1)}(i)) \\ \mathrm{Im}(x^{(0)}(i)) \\ \mathrm{Im}(x^{(1)}(i)) \end{bmatrix} \quad \text{Equation 19}$$

where, $i=0,1,\ldots,M_{symb}^{layer}-1$ and $M_{symb}^{ap}=2M_{symb}^{layer}$.

For transmission via four antenna ports $p \in \{0,1,2,3\}$, an output $y(i)=[y^{(0)}(i)\ y^{(1)}(i)\ y^{(2)}(i)\ y^{(3)}(i)]^T$ ($i=0,1,\ldots,M_{symb}^{ap}-1$) according to the precoding operation is determined as shown in Equation 20 below.

$$\begin{bmatrix} y^{(0)}(4i) \\ y^{(1)}(4i) \\ y^{(2)}(4i) \\ y^{(3)}(4i) \\ y^{(0)}(4i+1) \\ y^{(1)}(4i+1) \\ y^{(2)}(4i+1) \\ y^{(3)}(4i+1) \\ y^{(0)}(4i+2) \\ y^{(1)}(4i+2) \\ y^{(2)}(4i+2) \\ y^{(3)}(4i+2) \\ y^{(0)}(4i+3) \\ y^{(1)}(4i+3) \\ y^{(2)}(4i+3) \\ y^{(3)}(4i+3) \end{bmatrix} = \frac{1}{\sqrt{2}} \begin{bmatrix} 1 & 0 & 0 & 0 & j & 0 & 0 & 0 \\ 0 & 0 & 0 & 0 & 0 & 0 & 0 & 0 \\ 0 & -1 & 0 & 0 & 0 & j & 0 & 0 \\ 0 & 0 & 0 & 0 & 0 & 0 & 0 & 0 \\ 0 & 1 & 0 & 0 & 0 & j & 0 & 0 \\ 1 & 0 & 0 & 0 & -j & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 1 & 0 & 0 & 0 & j & 0 \\ 0 & 0 & 0 & 0 & 0 & 0 & 0 & 0 \\ 0 & 0 & 0 & -1 & 0 & 0 & 0 & j \\ 0 & 0 & 0 & 0 & 0 & 0 & 0 & 0 \\ 0 & 0 & 0 & 1 & 0 & 0 & 0 & j \\ 0 & 0 & 0 & 0 & 0 & 0 & 0 & 0 \\ 0 & 0 & 1 & 0 & 0 & 0 & -j & 0 \end{bmatrix} \begin{bmatrix} \mathrm{Re}(x^{(0)}(i)) \\ \mathrm{Re}(x^{(1)}(i)) \\ \mathrm{Re}(x^{(2)}(i)) \\ \mathrm{Re}(x^{(3)}(i)) \\ \mathrm{Im}(x^{(0)}(i)) \\ \mathrm{Im}(x^{(1)}(i)) \\ \mathrm{Im}(x^{(2)}(i)) \\ \mathrm{Im}(x^{(3)}(i)) \end{bmatrix} \quad \text{Equation 20}$$

where, $i = 0, 1, \ldots, M_{symb}^{layer} - 1$ and $$M_{symb}^{ap} = \begin{cases} 4M_{symb}^{layer} & \text{if } M_{symb}^{(0)} \bmod 4 = 0 \\ (4M_{symb}^{layer}) - 2 & \text{if } M_{symb}^{(0)} \bmod 4 \neq 0. \end{cases}$$

4.4.3. Precoding for Spatial Multiplexing Based on UE-Specific Reference Signal (DMRS)

If the eNB uses precoding based on DMRS (UE-specific reference signal) instead of the CRS, the UE may receive the FD-ePDCCH without information about the precoding matrix index using the DMRS defined in the 3GPP LTE system. That is, since the DMRS is multiplied by a precoding matrix and then transmitted unlike the CRS, the UE may estimate an ECML equivalent channel matrix which is a product of a channel matrix indicating a radio channel experienced by a signal transmitted by the eNB in the form of a matrix and a precoding matrix and receive an FD-ePDCCH without information about the precoding matrix using the equivalent channel matrix.

4.5 PDSCH Resource Allocation

In a PDSCH region of a second slot of a subframe corresponding to a frequency region in which an FD-ePDCCH is transmitted, the eNB may equally reuse or modify a resource allocation scheme of an existing PDSCH to transmit a PDSCH. That is, the size of a transport block transmitted using the PDSCH is not one subframe but resource allocation is performed in units of one slot. Thus, the following transmission schemes may be used.

4.5.1. Case of Controlling Transport Block Size

The transport block may be determined by a transmission mode, an MCS level and the number of physical resource blocks based on definition of the 3GPP LTE system. Accordingly, the transport block may be newly determined in order to allocate data to the PDSCH region of the second slot of the subframe corresponding to the frequency region in which the FD-ePDCCH is transmitted. That is, (existing transport block size)—(bit size of the FD-ePDCCH) may be determined. At this time, the bit size of the FD-ePDCCH means the bit size lost by the FD-ePDCCH in the transport block size determined by the transmission mode, the MCS level and the number of physical resource blocks.

Alternatively, since the size of the transport block is set to half the existing transport block or up to 3 OFDM symbols of a legacy PDCH may be transmitted in a first slot, the bit size of the FD-ePDCCH may be set to (4/11)*(transport block size).

Alternatively, in order to perform resource allocation in units of one slot, the size of the transport block closet (most similar) to the size of the transport block of the PDSCH in a second slot of the transport block may be set to perform transmission.

4.5.1. Case in which Transport Block Size is not Controlled

The eNB may perform resource allocation of the transport block by controlling the MCS level without controlling the transport block size. At this time, the MCS level may include a modulation order or a coding rate. That is, the eNB may modify a modulation order to be greater than a legacy modulation order (for example, QPSK is changed to 16QAM) or increase the coding rate to control the modulation symbol size. Alternatively, using both the above-described methods, the size of the actually transmitted modulation symbol may be controlled to transmit the PDSCH in the second slot.

In the above description, a series of processes of transmitting the FD-ePDCCH to the UE using multiple antennas in order to increase reliability of the PDCCH of the eNB has been described. The proposed methods can provide a downlink control channel with high reliability to each UE, achieve fast decoding, and achieve efficient cell deployment and throughput. By a low SNR for enabling the UE to receive the downlink control channel, it is possible to reduce complexity in implementation of the UE. Due to gain in HARQ processing time, it is possible to reduce burden on implementation of the UE.

5. General Apparatus in which the Present Invention is Implemented

Figure 25:
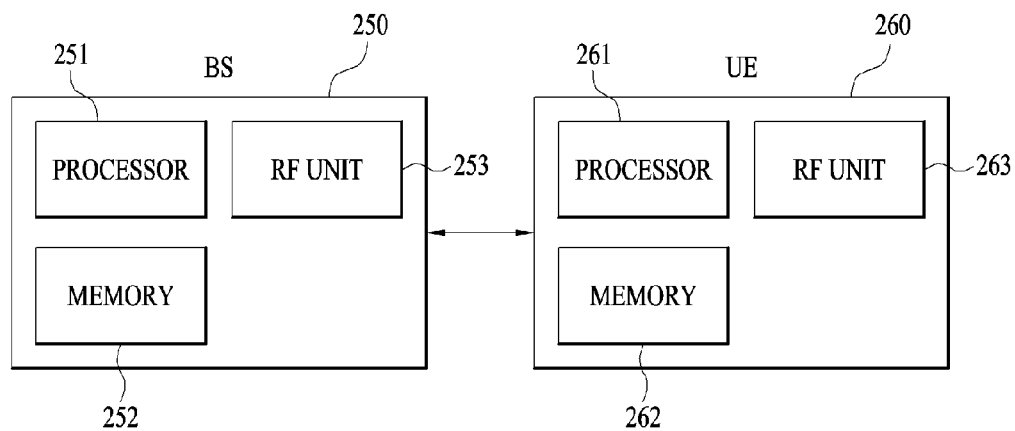
FIG. 25 is a block diagram showing a wireless communication apparatus according to an embodiment of the present invention.

FIG. 25 is a block diagram showing a wireless communication apparatus according to an embodiment of the present invention.

Referring to FIG. 25, a wireless communication system includes a BS 250 and a plurality of UEs 260 located in an area of the BS 250.

The BS 250 includes a processor 251, a memory 252, and a Radio Frequency (RF) unit 253. The processor 251 may be configured so as to implement the proposed functions, procedures and/or methods. Layers of a radio interface protocol may be implemented by the processor 251. The memory 252 is connected to the processor 251 and stores various pieces of information related to operations of the processor 251. The RF unit 253 is connected to the processor 251 and transmits and/or receives RF signals.

The UE 2600 includes a processor 261, a memory 262, and an RF unit 263. The processor 261 may be configured so as to implement the proposed functions, procedures and/or methods. Layers of a radio interface protocol may be implemented by the processor 261. The memory 262 is connected to the processor 261 and stores various pieces of information related to operations of the processor 261. The RF unit 263 is connected to the processor 261 and transmits and/or receives RF signals.

The memories 252 and 262 may be located inside or outside the processor 251 and 261 and may be connected to the processors 251 and 261 by well-known means, respectively. In addition, the BS 250 and/or the UE 260 may have a single antenna or multiple antennas.

The embodiments of the present invention described hereinabove are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in the embodiments of the present invention may be rearranged. Some constructions of any one embodiment may be included in another embodiment and may be replaced with corresponding constructions of another embodiment. It is obvious that claims that are not explicitly cited in each other in the appended claims may be presented in combination as an embodiment of the present invention or included as a new claim by subsequent amendment after the application is filed.

The embodiments of the present invention may be achieved by various means, for example, hardware, firmware, software, or a combination thereof. In a hardware configuration, the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although an example of applying a data transmission and reception method in a radio access system to a 3GPP LTE system has been described, the present invention is applicable to various radio access systems in addition to the 3GPP LTE system.

The invention claimed is:

1. A method of transmitting downlink control information by a base station in a radio access system supporting an enhanced physical downlink control channel (e-PDCCH) transmitted in a state of being multiplexed with a physical downlink shared channel (PDSCH), the method comprising:
   precoding the downlink control information using a precoding matrix set in a user equipment (UE);
   transmitting the precoded downlink control information to the UE via the e-PDCCH which is multiplexed with the PDSCH in a first slot of a subframe, and
   transmitting to the UE a second slot of the subframe with a greater modulation and coding scheme (MCS) level than a MCS level of the first slot,
   wherein a first codeword is allocated to the downlink control information when the downlink control information includes information related to uplink,
   wherein a second codeword is allocated to the downlink control information when the downlink control information includes information related to downlink, and
   wherein a null symbol or a predetermined reference modulation symbol is inserted to a modulation symbol having a smaller symbol length such that modulation symbols from the first codeword and the second codeword have equal bit sizes before the precoding.

2. The method of claim 1, further comprising performing joint channel coding with respect to a plurality of pieces of downlink control information to generate one coded bit.

3. The method of claim 1, wherein the downlink control information is precoded based on a cell-specific reference signal (CRS) or a demodulation reference signal (DMRS).

4. The method of claim 3, further comprising transmitting the information regarding the precoding matrix to the UE when the downlink control information is precoded based on the CRS.

5. The method of claim 3, wherein, when the downlink control information is precoded based on the DMRS, the downlink control information is precoded using a precoding matrix used in a most recent PDSCH or physical downlink control channel (PDCCH) transmitted to the UE.

6. A method of receiving downlink control information in a radio access system supporting an enhanced physical downlink control channel (e-PDCCH) transmitted in a state of being multiplexed with a physical downlink shared channel (PDSCH), the method comprising:
   receiving downlink control information precoded using a precoding matrix set in a user equipment (UE) from a base station via the e-PDCCH which is multiplexed with the PDSCH in a first slot of a subframe; and
   performing decoding in order to detect the downlink control information,
   receiving a second slot of the subframe which is transmitted by the base station with a greater modulation and coding scheme (MCS) level than a MCS level of the first slot,
   wherein a first codeword is allocated to the downlink control information when the downlink control information includes information related to uplink,
   wherein a second codeword is allocated to the downlink control information when the downlink control information includes information related to downlink, and
   wherein a null symbol or a predetermined reference modulation symbol is inserted to a modulation symbol having a smaller symbol length such that modulation symbols from the first codeword and the second codeword have equal bit sizes.

7. The method of claim 6, wherein the downlink control information is precoded based on a cell-specific reference signal (CRS) or a demodulation reference signal (DMRS).

8. The method of claim 7, further comprising receiving the information regarding the precoding matrix from the base station when the downlink control information is precoded based on the CRS,
   wherein the decoding is performed using the information regarding the precoding matrix.

9. The method of claim 7, wherein, when the downlink control information is precoded based on the DMRS, the decoding is performed using a precoding matrix used in a most recent PDSCH or physical downlink control channel (PDCCH) transmitted from the base station.

* * * * *